United States Patent [19]
Kinser, Jr. et al.

[11] Patent Number: 5,790,634
[45] Date of Patent: Aug. 4, 1998

[54] COMBINATION SYSTEM FOR PROACTIVELY AND REACTIVELY MAINTAINING TELEPHONE NETWORK FACILITIES IN A PUBLIC SWITCHED TELEPHONE SYSTEM

[75] Inventors: James C. Kinser, Jr., Bel Air, Md.; William C. Casey, Chantilly, Va.; Frederick D. Blum; Mary A. Youngs, both of Springfield, Va.

[73] Assignee: Bell Atlantic Network Services, Inc., Arlington, Va.

[21] Appl. No.: 757,682

[22] Filed: Nov. 29, 1996

Related U.S. Application Data

[63] Continuation-in-part of Ser. No. 506,655, Jul. 25, 1995, and Ser. No. 551,622, Nov. 1, 1995, Pat. No. 5,687,212.

[51] Int. Cl.[6] .................. H04M 3/08; H04M 3/22
[52] U.S. Cl. ................. 379/29; 379/10; 379/15; 379/34
[58] Field of Search ................. 379/1, 2, 5, 97, 379/17, 27, 28, 29, 30, 34; 370/241, 242, 248, 250, 251, 261; 371/4, 11.2, 11.3, 20.1

[56] References Cited

U.S. PATENT DOCUMENTS

| | | |
|---|---|---|
| 4,232,199 | 11/1980 | Boatwright et al. |
| 4,574,167 | 3/1986 | Olek . |
| 4,782,517 | 11/1988 | Bernardis et al. |
| 4,782,519 | 11/1988 | Patel et al. |
| 4,922,514 | 5/1990 | Bergeron et al. |
| 4,972,453 | 11/1990 | Daniel, III et al. |
| 4,991,105 | 2/1991 | Pimental . |
| 5,012,511 | 4/1991 | Hanle et al. |
| 5,054,050 | 10/1991 | Burke et al. |
| 5,067,099 | 11/1991 | McCown et al. |
| 5,086,461 | 2/1992 | Thorn et al. |
| 5,099,436 | 3/1992 | McCown et al. |
| 5,121,420 | 6/1992 | Marr et al. |
| 5,222,125 | 6/1993 | Creswell et al. |
| 5,224,149 | 6/1993 | Garcia . |
| 5,247,571 | 9/1993 | Kay et al. |
| 5,343,461 | 8/1994 | Barton et al. |
| 5,347,564 | 9/1994 | Davis et al. |
| 5,359,646 | 10/1994 | Johnson et al. |
| 5,375,159 | 12/1994 | Williams . |
| 5,388,189 | 2/1995 | Kung . |
| 5,392,328 | 2/1995 | Schmidt et al. |
| 5,404,389 | 4/1995 | Fukada et al. |
| 5,416,833 | 5/1995 | Harper et al. |
| 5,438,606 | 8/1995 | Cerulli . |
| 5,528,660 | 6/1996 | Heins et al. ............ 379/27 |
| 5,644,619 | 7/1997 | Farris et al. ............ 379/27 |

*Primary Examiner*—Paul Loomis
*Attorney, Agent, or Firm*—McDermott, Will & Emery

[57] ABSTRACT

In an administration system for a public switched telephone network, a combination proactive and reactive maintenance system analyzes the working status of customer network facilities in response to a customer request reporting a customer trouble. The combined maintenance system includes an attendant station receiving the customer request representing a reactively determined trouble, and building a first trouble report, and first and second test systems. The first test system tests a second communication line in the communication cable representing a potentially proactively determined trouble, and builds a second trouble report. The second test system tests at least one of the first and second communication lines and determines whether at least one of the first and second trouble reports should be dispatched to a customer work group together with existing related proactive and reactive trouble reports to the customer work group using trouble routing criteria. The combination system also includes a data processor that generates an end to end description of the first and second communication lines to be tested, and a dispatch system that groups related open work requests with at least one of the first and second trouble reports and the existing related reactive and proactive trouble reports based on grouping rules.

24 Claims, 35 Drawing Sheets

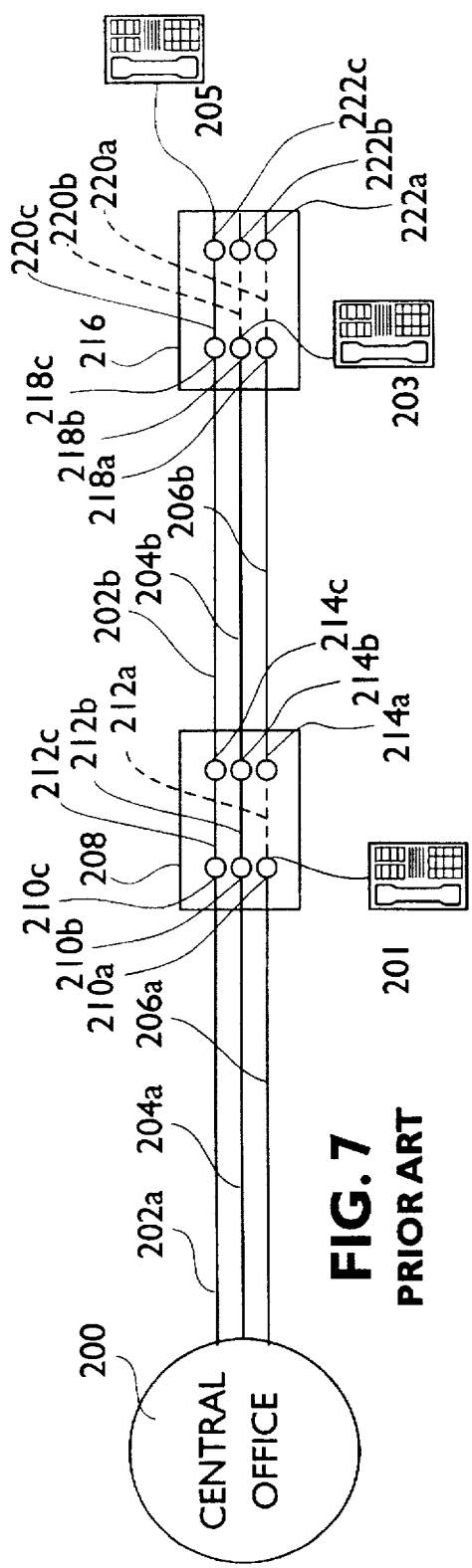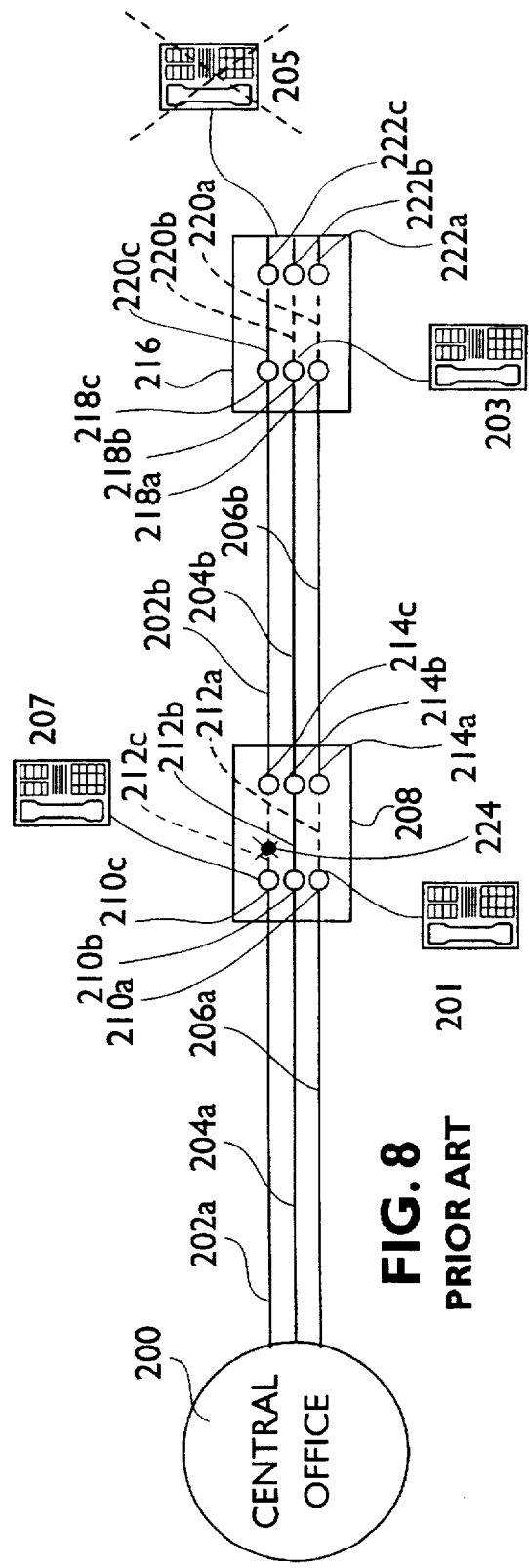

| SERVICE ANALYSIS STANDARD RESULT | SWITCH VENDOR | | | |
|---|---|---|---|---|
| | 1A | 5E | DMS | EWSD |
| CROSS BATTERY-FOREIGN POTENTIAL ON TIP OR RING-USUALLY INDICATES PROBLEMS IN THE CABLE | | | | |
| FEF-F<br>MEANING "FULL FAILURE" | FEF 0 | FFP<br>FHP<br>FQP<br>FFF<br>FFH<br>FFQ<br>FHF<br>FHH<br>FHQ<br>FQF<br>FQH<br>FQQ | TIP DC FEMF<br>TIP AC FEMF<br>RING DC FEMF<br>RING AC FEMF<br><br>>20V<br><br>(REFERS TO MAGNITUDE OF VOLTAGE) | DRG OR DTG ≤-20V |
| FEF H<br>MEANING "HALF FAILURE" | FEF 1 | HFP<br>HHP<br>HQP<br>HFF<br>HFH<br>HFQ<br>HHF<br>HHH<br>HHQ<br>HQF<br>HQH<br>HQQ | TIP DC FEMF<br>TIP AC FEMF<br>RING DC FEMF<br>RING AC FEMF<br><br>12V≤FEF≤20V | DRG OR DTG >-20V<br>≤-12V |
| FEF-Q<br>MEANING "QUARTER FAILURE" | FEF 2 | QFP<br>QHP<br>QQP<br>QFF<br>QFH<br>QFQ<br>QHF<br>QHH<br>QHQ<br>QQF<br>QQH<br>QQQ | TIP DC FEMF<br>TIP AC FEMF<br>RING DC FEMF<br>RING AC FEMF<br><br><12V | DRG OR DTG >-12V<br>≤-5V |
| TIP & RING GROUND - USUALLY INDICATES TROUBLE IN CABLE TERMINALS AND CABLE SHEATHS | | | | |
| TRG-F<br>MEANING "FULL FAILURE" | TRG 2 | PPF | TIP LEAKAGE<br>RING LEAKAGE<br>>160000 | RRG OR RTG >160K<br>≤ 350K |
| TRG-H<br>MEANING "HALF FAILURE" | TRG 1 | PPH | TIP LEAKAGE<br>RING LEAKAGE<br>8000<TRG≤160,000 | RRG OR RTG > 80K<br>≤ 160K |
| TRG-Q<br>MEANING "QUARTER FAILURE" | TRG 0 | PPQ | TIP LEAKAGE<br>RING LEAKAGE<br><=80000 | RRG OR RTG > 0K<br>≤ 80K |
| SHORT CIRCUIT & RING GROUND-USUALLY INDICATES TROUBLE IN DROP AND INSIDE WIRING | | | | |
| SRG-F<br>MEANING "FULL FAILURE" | SRG 2 | PFP<br>PFF<br>PFH<br>PFQ | TIP-RING LEAK><br>>160000 | RTR >160K<br>≤ 350K |
| SRG-H<br>MEANING "HALF FAILURE" | SRG 1 | PHP<br>PHF<br>PHH<br>PHQ | TIP-RING LEAK<br>8000<SRG≤160,000 | RTR >80K<br>≤ 160K |
| SRG-Q<br>MEANING "QUARTER FAILURE" | SRG 0 | PQP<br>PQF<br>PQH<br>PQQ | TIP-RING LEAK<br><=80000 | RTR >0K<br>≤ 80K |

FIG. 27

| SERVICE ANALYSIS STANDARD RESULT | SWITCH VENDOR | | | |
|---|---|---|---|---|
| | 1A | 5E | DMS | EWSD |
| SWITCH ALARMS OR PER CALL TEST FAILURES (IDENTIFIED BY THE SWITCH WHEN TRYING TO ORIGINATE OR TERMINATE CALLS - ALITs CAN ALSO BE EXISTING ON THE SAME TN) | | | | |
| SHOWERING LINES | | | | |
| SHWL | SHWL | N/A | LINE 204 LINE 205 | N/A |
| RINGING CURRENT FAILURES | | | | |
| RC | RC | RCF | N/A | N/A |
| POWER CROSS | | | | |
| PX | PX | PX | LINE 110 | AC VOLTAGE DETECTED |

FIG. 28

| PARAMETER | MAINT. LEVEL | PARAMETER DEFINITION | SUG-GESTED RANGE | DE-FAULT VALUE |
|---|---|---|---|---|
| MINIMUM TROUBLE GROUP SIZE | REGIONAL | THE REGIONAL SYSTEM ADMINISTRATOR WILL HAVE THIS SET IN ORDER TO OPTIMIZE REPORTING RESULTS FOR THE REGION. THIS PARAMETER REPRESENTS THE MINIMUM NUMBER OF TROUBLES IN A GROUP IN ORDER FOR SA TO CREATE THE GROUP. IF THE MINIMUM IS SET AT 3, A GROUP MUST CONTAIN AT LEAST 3 TROUBLES TO BE CREATED. IF IT HAS LESS THAN 3 TROUBLES, THE GROUP WILL BE IGNORED AND ELIMINATED FROM FURTHER SA PROCESSING. | ≤3 | 3 |
| MINIMUM TOTAL PRIORITY OF GROUP | REGIONAL | THE REGIONAL SYSTEM ADMINISTRATOR WILL HAVE THIS SET FOR THE LOCAL ANALYSIS GROUP TO CORRELATED TICKETS FOR DISPATCH. THIS WILL OPTIMIZE REPORTING RESULTS FOR THE REGION. IF A GROUP DOES NOT MEET THE MINIMUM PRIORITY, THE GROUP WILL BE IGNORED AND ELIMINATED FROM FURTHER SA PROCESSING. | ≤5 | 5 |
| NUMBER OF DAYS OF HISTORICAL TROUBLE TICKETS | LOCAL | HISTORICAL TROUBLE TICKETS WILL BE PRINTED ON THE TECHNICIAN DAILY REPORT TO ASSIST HIM/HER IN EVALUATING TROUBLES IN THE PLANT. | 15-60 DAYS | 30 |
| NUMBER OF DAYS OF HISTORICAL ALITs | LOCAL | ALIT SCHEDULED TESTING WILL SOMETIMES NOT GET THROUGH A SINGLE CENTRAL OFFICE IN ONE NIGHT. THIS PARAMETER SHOULD BE SET AT THE NUMBER OF DAYS IT REQUIRES ALIT TO PROCESS ALL LINES WITHIN A SWITCH. SERVICE ANALYSIS WILL USE THE ALIT INDICATIONS FOR THIS NUMBER OF DAYS FOR ANALYSIS AND GROUPING IN ORDER TO ENSURE EVERY LINE IN THE ENTIRE SWITCH IS INCLUDED IN THE CORRELATION PROCESS. | 1-5 DAYS | 3 |
| MAXIMUM MLTs TO SUBMIT | LOCAL | THIS PARAMETER IS SET BY THE ANALYSIS GROUP TO ENSURE CORRELATION WILL ONLY SUBMIT THE MAXIMUM NUMBER OF MLTs WHICH CAN BE PROCESSED IN THE AVAILABLE TIME PERIOD. THIS TIME PERIOD MAY BE DIFFERENT PER SWITCH AND CENTRAL OFFICE. | | 50 |

FIG. 29

LOCALLY SET BY THE CSC ADMINIS.

| PARAMETER | MAINT. LEVEL | PARAMETER DEFINITION | SUGGESTED RANGE | DEFAULT VALUE |
|---|---|---|---|---|
| CIRCUIT ALIT COUNTER INCREMENT VALUE FOR RAINY DAYS | LOCAL | THE INCREMENT VALUE ADDED TO THE CIRCUIT ALIT RAIN COUNTER FOR EACH CIRCUIT THAT RECEIVES AN ALIT ON A 'RAINY' DAY. | 1-3 | 2 |
| CIRCUIT ALIT COUNTER DECREMENT VALUE FOR NORMAL DAYS | LOCAL | THE VALUE SUBTRACTED FROM THE CIRCUIT ALIT RAIN COUNTER FOR EACH CIRCUIT THAT RECEIVES AN ALIT ON A 'NOT RAINY' DAY. | -1 | -1 |
| ALIT RAIN CAUSE COUNTER THRESHOLD | LOCAL | THE THRESHOLD VALUE ABOVE WHICH A CIRCUIT ALIT RAIN COUNTER IS CONSIDERED TO INDICATE A RAIN CAUSE TROUBLE. | 2 | 2 |
| SYSTEM SUMMARY OUTPUT FLAG | REGIONAL | SYSTEM ADMINISTRATION REPORTING TOOL. | ON/OFF | OFF |
| SYSTEM SUMMARY OUTPUT PATHNAME | REGIONAL | THE PATHNAME WHERE THE SYSTEM SUMMARY OUTPUT FILE WILL BE WRITTEN. | NA | NA |
| FILTERED PAIRS OUTPUT FLAG | REGIONAL | SYSTEM ADMINISTRATION REPORTING TOOL. | ON/OFF | OFF |
| FILTERED PAIRS OUTPUT PATHNAME | REGIONAL | THE PATHNAME WHERE FILTERED PAIRS OUTPUT FILE WILL BE WRITTEN. | NA | NA |
| TERMINAL STATISTICS FLAG | REGIONAL | SYSTEM ADMINISTRATION REPORTING TOOL. | ON/OFF | OFF |
| TERMINAL STATISTICS OUTPUT PATHNAME | REGIONAL | THE PATHNAME WHERE TERMINAL STATISTICS OUTPUT FILE WILL BE WRITTEN. | NA | NA |
| DEBUG OUTPUT FLAG | REGIONAL | SYSTEM ADMINISTRATION REPORTING TOOL. | ON/OFF | OFF |
| DEBUG OUTPUT PATHNAME | REGIONAL | THE PATHNAME WHERE THE DEBUG OUTPUT FILE WILL BE WRITTEN. | NA | NA |
| TRACE LOG FLAG | REGIONAL | SYSTEM ADMINISTRATION REPORTING TOOL. | ON/OFF | OFF |
| TRACE LOG OUTPUT PATHNAME | REGIONAL | THE PATHNAME WHERE THE TRACE LOG OUTPUT FILE WILL BE WRITTEN. | NA | NA |
| RULE FIRING FILE FLAG | REGIONAL | SYSTEM ADMINISTRATION REPORTING TOOL. | ON/OFF | OFF |
| RULE FIRING OUTPUT PATHNAME | REGIONAL | THE PATHNAME WHERE THE RULE FIRING OUTPUT FILE WILL BE WRITTEN. | NA | NA |
| PERFORMANCE INFORMATION FLAG | REGIONAL | SYSTEM ADMINISTRATION REPORTING TOOL. | ON/OFF | OFF |
| PERFORMANCE INFORMATION OUTPUT PATHNAME | REGIONAL | THE PATHNAME WHERE THE PERFORMANCE INFORMATION OUTPUT FILE WILL BE WRITTEN. | NA | NA |

FIG. 30

| PRIORITY RULES | PRE-MLT INDICATOR WEIGHTINGS POINTS |
|---|---|
| PRIORITY CUSTOMER OR CUSTOMER TROUBLE REPORT | 7 |
| PCTF (SHWL, PX, AND RC) | 6 |
| ALIT FEF 0 | 5 |
| ALIT FEF 1 | 4 |
| ALIT FEF 2 | 2 |
| TRG/SRG 2 | 1 |
| TRG/SRG 1 | 2 |
| TRG/SRG 0 | 3 |

FIG. 33

| PRIORITY RULES | POST-MLT INDICATOR WEIGHTINGS POINTS |
|---|---|
| REACTIVE TROUBLES (RELEASE 7) | 10 |
| PRIORITY CUSTOMER | 10 |
| SPARE PAIRS | |
| 5 OR FEWER SPARE PAIRS EXIST IN THE COMPOSITES OF F1 CABLES SERVING THE SAME F1 CABLE | 25 |
| 5 OR FEWER SPARE PAIRS EXIST IN ANY F2 CABLE RANGE LEAVING THE F1 TERMINAL (EXCLUDING THOSE GOING TO ENCAPSULATED TERMINALS) | 10 |
| 0 OR 1 SPARE PAIRS IN ANY F2 OR Fn CABLE BRANCH ≥10-PAIRS (EXCLUDING THOSE GOING TO ENCAPSULATED TERMINALS) | 10 |
| 0 SPARE PAIRS IN ANY F2 OR Fn CABLE BRANCH <10 PAIRS (EXCLUDING THOSE GOING TO ENCAPSULATED TERMINALS) | 5 |
| PCTF | |
| SHWL: MLT Res. ≤ 9.5 KOHMS | 7 |
| MLT Res. > 9.5 KOHMS | (SEE MLT Res. RANGES BELOW) |
| PX:   MLT HAZARDOUS VOLTAGE OR AC FEMF/dc VOLTS > 50 VOLTS | 10 |
| RC:   MLT OPEN OUT WITH BALANCE <95% | 7 |
| MLT dc VOLTAGE (MAGNITUDE) | |
| ≥35 VOLTS | 5 |
| >10 VOLTS BUT <35 VOLTS | 4 |
| ≤10 VOLTS | 2 |
| MLT Res. | |
| ≤9.5 KOHMS | 7 |
| >9.5 KOHMS BUT ≤ 100 KOHMS | 2 |
| >100 KOHMS BUT < 3500 KOHMS | 1 |
| NON-VOLTAGE TROUBLES SERVED FROM THE SAME TERMINAL | 10 |
| DEFECTIVE PAIRS | 1 |

FIG. 34

COMBINATION SYSTEM FOR PROACTIVELY AND REACTIVELY MAINTAINING TELEPHONE NETWORK FACILITIES IN A PUBLIC SWITCHED TELEPHONE SYSTEM

CROSS REFERENCE TO RELATED APPLICATION

This application is a continuation-in-part application of application Ser. No. 08/506,655, filed Jul. 25, 1995 and application Ser. No. 08/551,622, filed Nov. 1, 1995, now U.S. Pat. No. 5,687,212.

BACKGROUND OF THE INVENTION

1. Field of the Invention

This invention relates to public switched telephone networks (PSTNs) and more particularly relates to a combination system for proactively and reactively maintaining telephone network facilities, such as, for example, responding to a customer complaint, correcting or repairing outside plant facilities of a customer for line faults, failures, while simultaneously detecting and correcting proactively determined faults or potential faults in network facilities.

2. Description of the Prior Art

U.S. Pat. No. 4,782,517, issued Nov. 1, 1988 discloses a system that allows a user to provide new service to existing terminations in a telephone network. A server having program sequences for controlling its operation connects the terminations and the telephone network. The server monitors the occurrence of a request event at one of the terminations. A processor, distinct from the server, controls the server by accessing a directly accessible database to extract a state transition rule to provide control information corresponding to the response event. Information is returned to the terminations in response to the control information. The database storing the state transition rules is directly accessible by the user for changing the state transition rules to modify the services without changing the program sequences of the server.

U.S. Pat. No. 5,012,511, issued Apr. 30, 1991 discloses a system that provides special service in telephone networks, particularly with respect to call forwarding. An adjunct computer is associated with a Remote Memory Administration System (RMAS) for switches which include a facility for providing special services such as call forwarding. The adjunct computer is inserted between the RMAS and the switches which it controls and responds to a request for special services. The processor determines the identity of the subscriber station that is to receive the requested service and the nature of the service. A programming signal is generated and transmitted to the switch to which the station is connected.

U.S. Pat. No. 4,782,519, issued Nov. 1, 1988 discloses a method and apparatus for enhancing the operation of an existing central office in a telephone switching system to provide extended subscriber service. The system relates to existing central office equipment that is incapable of adequately providing "equal access" and other extended subscriber features to non-conforming central offices. The operating capabilities of these offices are enhanced so that they can offer extended subscriber features, such as equal access, without replacing or upgrading existing technology.

U.S. Pat. No. 5,086,461, issued Feb. 4, 1992 discloses a method and apparatus for providing switching equipment, such as 1ESS or 1AESS telephone switching office equipment which are stored program controlled switches, with the capability of controlling the connection management and disconnection of telephone circuits using Signaling System #7(SS7) protocols.

U.S. Pat. No. 4,232,199, issued Nov. 4, 1980 discloses a special services add-on specifically adapted for use in dial pulse activated switching offices such as a step by step office. The add-on is a stored program, processor based system that can be put on a line-by-line basis, independent of subscriber line assignments. The add-on provides special services such as incoming call alert, call conferencing, call forwarding, tone dialing abbreviated dialing, instant recall, etc.

FIG. 1 is diagram illustrating the basic structure or arrangement of the customer and telephone company facilities for providing telephone service or connection between a telephone caller and a telephone receiver destination. As illustrated in FIG. 1, telephone sets 1a, 1b, 1c, 1d, 1e represent different addresses or customer locations which receive and initiate telephone calls. In order for a customer location or address to establish or receive telephone service, each location or address must be physically connected to a central switching office or central office (CO) 3a, 3b, 3c via a physical copper cable pair, Sub.Carrier Sys, or fiber optic cable sys. The cable pair which connects customer locations 1a, 1b, 1c, 1d, 1e often require intermediary connections via cross connect devices 2a, 2b, 2c, 2d and 2e. In this situation, there may be several legs of cable pairs 5a, 5b, 5c, 5d, 5e between cross connect devices 2a, 2b, 2c, 2d, 2e. The combinations of cable pairs which connect the customer location to the serving CO is commonly referred to as "outside plant". Central offices 3a, 3b, 3c are connected together via trunk lines 7a, 7b.

Once the customer location is connected to the CO via an in-coming frame at the CO 3a, 3b, 3c, the customer location must also be allocated office equipment (OE) and switch translations made to provide the specific calling features requested by the customer location. For example, the customer may request such features as call waiting or call forwarding which require different switch translations in CO 3a, 3b, 3c. Once the customer location is able to access the CO, the customer location may be connected via a CO to another customer location serviced by the same CO, such as customer location 1a calling customer location 1b which is connected or switched by CO 3a. Alternatively, the customer location may be connected to another customer location which is serviced by a different CO. For example, customer location 1c will be connected to customer location 1e via COs 3b and 3c, and cable trunk 7b.

The combination of outside plant and OE which is allocated or "provisioned" for a customer location is typically referred to as customer facilities which are always associated with the customer location until the customer location decides to disconnect service, e.g., the customer location moves from one calling area to another calling area. As clearly illustrated in FIG. 1, the arrangement of the outside plant and OE can become extremely complicated, particularly in view of the quantity of customer facilities which must be provisioned for each customer location. Further, the provisioning or assignment of customer facilities is further complicated with the typical or standard desire to conserve or reuse customer facilities as efficiently as possible. As will be discussed in detail below, we have discovered that this insistence on conserving customer facilities has resulted in excessive and unnecessary work which the present invention is directed at eliminating.

The current state of the art of provisioning of residential services to customers of PSTNs, i.e., customer facilities, follows a series of steps not conceptually different from the steps that were followed in a manual provisioning environment some thirty years ago. The individual work steps have been mechanized, and the mechanized steps have been connected with interfaces, but the steps have not basically changed. The common sequence of such steps is illustrated in FIG. 2. FIGS. 3–5 provide a more detailed flow chart illustration of this methodology. FIG. 6 shows system architecture.

Referring to FIG. 3 a Customer service representative of the Telco at 10 determines the reason for the call and the address of the caller or customer. The call may be for ordering service, making bill payment arrangements, registering a deposit, or calling for service maintenance. If the customer is calling for new service or a change to existing service the representative proceeds to the next step 12. Here the representative gathers the customer information such as the calling party's name, the customer's name, the service address, the billing name, and billing address. The representative determines how the customer wishes the service to be listed, the numbers and types of directories, calling cards, and any disclosures that are requested by the customer.

In the next step 14 the credit history of the customer is checked using internal and external data sources. At 16 the service representative takes the customer service address information provided and uses a PREMIS (Premis Information System) processor. PREMIS is an on-line address-based system used by service representatives for service order negotiation. It provides street address, Living Unit (LU), previous credit status, equal access carrier data, facility availability, and Telephone Number (TN) selection capabilities. PREMIS provides storage and retrieval of Street Address Guide (SAG) information, Living Unit (LU) information, Facility Assignment (FA) information, Telephone Number (TN) selection, repetitive debt customer information, and other information. At 16 the service representative uses PREMIS to verify the address, determine the working status of the address, and determines the serving wire center and other common address information such as community and tax codes. Based on the wire center serving the customer, the service representative is able to determine what services are available to the customer.

At 18 service is negotiated with the customer, matching the customer needs with the available products and services. The first service that is negotiated is basic service which will determine the calling plan for the customer. This is followed by the negotiation of toll services and other optional services such as touch tone, custom calling services and maintenance plans.

At 20 the due date for installation is negotiated and scheduled. At 22 a Telephone Number is selected from the PREMIS or Service Order Processor (SOP) systems. This Telephone Number will be based on the wire center serving the area and the availability of the TN.

Before ending the call with the customer, the service representative at 24 recaps the service request to insure that the customer order accurately reflects the customer's requirements. The service order is then issued or released at 26 to the SOP. The SOP checks the order for format accuracy and determines what centers or systems should receive the service order. The service order is then distributed to the systems and centers at 28.

Referring to FIG. 4 the service order is next received by the Service Order Analysis and Control System (SOAC).

The order is validated and checked for format accuracy 30. At 32 an initial determination is made for orders that might require manual work or testing. If the order might require work or testing a planning message is sent to the Work and Force Administration/Dispatch Out (WFA/DO) system at 33. WFA/DO system makes the final determination as to whether a dispatch or testing is required.

At 34 the Service Order Control system determines if loop facilities are required for the order. This is based on Universal Service Order Codes (USOC) and Field Identifiers (FID) on the order. If a loop facility is required an assignment request (AR) is prepared and sent to the Loop Facility Assignment and Control System (LFACS). This assignment request is made at 36 and contains the address, order number, telephone number, and date due. An outside plant equivalency code (OEC) is also sent in the request that has been determined based on the type of service. The OEC designates the type of facility required for the request.

At 38 the address is first matched with addresses in the Loop Facility inventory system. If there is an address match, the status of the living unit is checked to insure that there is not already working service at the address. The terminal address is then determined. Once the address and terminal address have been verified, a network facility matching the request is selected at 40. After the facility is selected the information in the form of an assignment request response (ARR) is sent back to the Service Order Control system at 42.

The Service Order Control system determines switch equipment requirements, prepares the request and sends an assignment request to the Switch Inventory system at 44. The assignment request is received by the Switch Inventory system from the Service Order Control system at 46. This request will contain information as to the type of switch facilities required, the loop facility that must be connected, the telephone number, the service order number, and the date due.

At 48 the loop facility and telephone number received in the assignment request are verified with the Switch Inventory system data. The status of each is checked to insure that the request can be completed as requested.

The switch equipment is selected at 50 based on the requested switch facility, the loading of the switch and the jumper length to be connected. The selection also will determine if an existing jumper has been left in place. Based on these criteria, switch equipment is selected. The switching equipment which is typically used involves a stored program control switch (SPC) such as a 1ESS or 1AESS switch.

After the selection of switch equipment, the information is sent to the Service Order Control system at 52. The Service Order Control system assembles the information received from the Loop Facility Inventory System and the Switch Inventory system at 54. This information is formatted as an assignment section and placed on the service order. The assigned Service Order (SO) is then sent to the SOP at 56. The SOP determines where the service order should be sent and distributes the service order at 58.

At 60 the Service Order Control system also sends the assigned service order to the Work and Force system. At 74 work is performed as required. That is, if other work in the field or in the central office is required, this work is completed and reported back to the appropriate center or system. Work may include placing jumpers in the central office or in the loop facilities, connecting the customer to the network and placing inside wiring and jacks at the customer premise.

After completion of the service request the completion information is sent to the SOP at 76. This information may include the completion time and date, any changes to the service order and any billing information that needs to be added for time and material charges.

The Service Order Control system determines if memory administration is involved in the request and if so determines if it has the required information to prepare a translation packet to send to the Memory Administration System (MAS) at 62. The translation packet is then created. If a translation packet cannot be prepared an image of the service order is prepared. The translation packet or the service order image is then sent to the Memory Administration System at 64.

The TP or SOI is received and validated in the Memory Administration System at 66. The Memory Administration System validates the TP/SOI and determines what needs to be done to complete the request.

At 68 the Memory Administration System (MAS) creates a machine readable Recent Change (RC) message specific to the switch to receive the message. The Recent Change (RC) message is created to match the vendor specific switch type and generic. The RC message is then sent to the switch at a designated time at 70 and the switch is updated at 72.

Referring to FIG. 5, the SOP receives the completion information at 78 and prepares the completed service order for distribution at 80. At 82 the SOP determines the distribution of the service order and the completed service order is distributed to all systems requiring the information. Thus, as indicated at 84, the service order is sent to a number of systems including Loop Maintenance, Billing, Directory, and E-911. The service order is also sent back to the Service Order Control system at 86 to update the status of the facilities from Pending Connect or Disconnect to Working or some idle status. At 88 the Service Order Control system receives the completed service order and validates the format of the information.

The Service Order Control system determines the network requirements at 90. In this case, since the order is completed, the requirement is to change the status of the facilities from Pending Connect to Working. If the request was for a disconnect this would change from Pending Disconnect to Disconnected.

At 92 the Assignment Request is sent to the Loop Facility system. The Loop Facility system matches information received in Assignment Request with existing facility data and at 94 updates the status of the facility from Pending Connect to Working or from Pending Disconnect to Disconnected. At 96 an Assignment Request Response is sent to the Service Order Control system. At 98 switch facility requirements are determined. In this case, the requirement is to change the status of the facility from Pending Connect to Working or from Pending Disconnect to Disconnect.

At 100 an Assignment Request to the Switch Inventory system is sent to update the status of the facility and the Telephone Number. The Assignment Request is received from the Service Order Control system at 102 and the appropriate status changes are made. The status of the facility and the Telephone Number are changed. The Status Inventory system inventories and administers the use in aging of telephone numbers. When a telephone number is disconnected, it will be aged for a specified period of time before being reused. After the status of the switch facility and telephone number have been completed, a confirmation is sent to the Service Order Control system at 104.

Referring to FIG. 6 there is shown typical architecture for carrying out the above described methodology. The Service Order Processor (SOP) is shown at 106. The SOP obtains the information from the customer calling for service and obtains the previously described information from Premis Information System (PREMIS) 108 upon the SOP initiating a request to PREMIS. That information is put on the service order which goes from the SOP to the Facility Assignment Control System (FACS) 113 which is an automated facility assignment system which automatically assigns loop facilities and office equipment to a subscriber address to provide telephone service. This assignment of loop or outside plant facilities and office equipment is in response to the provisioning request or service order generated by SOP 106.

FACS is an automated facilities assignment system which attempts to optimize the use of loop facilities and office equipment including jumper cables to minimize the amount of unused inventory and cost to the telephone service provisioning company. FACS, an on-line computer system, administers, inventories, and assigns the complete circuit from the customer's premises to the local serving office. FACS is the primary automated support for the provisioning work group since it keeps track of all interconnections and segments (working and available). FACS works by maintaining inventories of outside plant (OSP) and central office (CO) facilities and using the data to make assignments. FACS is a collection of computer systems which have been previously discussed in connection with FIGS. 4-5, and which is further discussed in greater detail with respect to FIG. 6.

The first system in FACS 113 which receives the service order is the Service Order Analysis and Control system (SOAC) 110. SOAC is the controller of service order flow within FACS and handles most of the interfaces between FACS and other systems, such as the Service Order Processor (SOP). SOAC reads the assignment affecting sections of the service order line by line and determines if FACS can process the order. If the assignment requirements can be determined, FACS automatically assigns the service order. If SOAC reads a Field Identifier (FID) or Universal Service Order Code (USOC) that is beyond FACS' capability, the service order is sent to the service provisioning work center for manual intervention using perhaps LAC Operations Management System (LOMS). SOAC also detects errors that are routed back to the originator for correction.

If SOAC can completely interpret the service order, it builds Assignment Requests (ARs) which are sent to LFACS and Work Manager/Computer System for Maintenance Operations (WM/COSMOS) or SWITCH to request outside plant facilities and central office facility assignments, respectively. After assignments are made, SOAC receives Assignment Request Responses (ARRs) from LFACS and WM/COSMOS, merges and formats this data into a service order assignment section and automatically returns it to the Service Order Processor (SOP).

SOAC tracks all service orders and Line and Station Transfers (LSTs) through completion or cancellation. Status information is maintained on all service requests as well as the service order image and relevant data that results from processing.

SOAC also includes the capability of supporting multiple SOACs residing on the same machine, different machines, or a combination of both. This capability is called SOAC Tandem. For orders that contain wire centers supported by more than one SOAC, SOAC Tandem provides tracking of all involved SOACs and the linking of assignment data generated by all involved SOACs. Hence, the SOP only needs to communicate with one SOAC for any multi-SOAC order.

A service order is sent to the appropriate SOAC by the SOP based on the header wire centers (for non-TFS involved orders) or the Circuit Administrative Area (for TFS involved orders). Note: TFS (Trunk Facility System) is a generic term for a system such as TIRKS. The particular SOAC that receives the service order determines other potentially involved SOACs based on the wire centers and/or NPA-NNXs appearing on the order. If there is more than one potentially involved SOAC, the SOAC that receives the order is the controlling SOAC for the order and the other potentially involved SOACs are called the subordinate SOACs.

Current SOAC processing takes place in each involved SOAC to generate the necessary assignments for the wire centers involved in the SOAC. Each involved SOAC sends it SOP status and assignment data to the controlling SOAC. The controlling SOAC tracks and sequences all responses sent back by all involved SOACs. When at least all solicited responses or any subsequent unsolicited responses have been received by the controlling SOAC, the controlling SOAC analyzes the statuses and determines the appropriate response (if any) to return to the SOP. Assignment data returned by involved SOACs is linked by the controlling SOAC before it is sent to the SOP.

Besides communicating with the SOP, the controlling SOAC is also responsible for communicating with all other order level SOAC interfaces, such as TFS.

SOAC also records the pass of a service order. The pass identifies the current phase of the order as determined by the service order issuance group. There are five pass types as described below:

1. Pre-completion (PRE)—The initial issuance of a service order.
2. Correction (COR)—A change to the initial service order prior to completion in the SOP.
3. Post Completion (PCN)—Notification that the service order has been completed without corrections in the SOP.
4. Completion with Correction (CPC)—A completion notice that identifies changes made to the service order at the time it was worked. This pass also completes the service order in the SOP. If a CPC pass is sent and SOAC detects that the changes may affect assignment, SOAC sends a notice to the service provisioning work center. IF necessary, the user updates the LFACS and/or COSMOS databases.
5. Cancellation (CAN) notification that the service order has been cancelled.

SOAC reads the changes on each new pass of a service order. If a COR pass is sent and changes are needed on the assignment, FACS attempts to automatically reassign the service with the necessary changes.

The service order is parsed out by SOAC and a determination is made as to whether there is a loop facility required for the order. An Assignment Request (AR) is made to the Loop Facility Assignment and Control System (LFACS) 112 where a loop facility is requested for the specified address. LFACS maintains a mechanized inventory of outside plant facilities, (e.g., facility addresses, cables, cable pairs, serving terminals, cross connection devices, loops, etc.) and assigns the outside plant facilities to ARs (Assignment Requests) received from SOAC as a result of customer service order activity. LFACS sends this assignment back to SOAC via ARRs. LFACS also generates work sheets for cable transfers and reconcentrations. These activities are updated mechanically upon notification of completion.

In addition, LFACS changes existing loop inventory with maintenance change activity and facility modifications via transactions input into the system by the user. Information once contained in Dedicated Plant Assignment Cards (DPAC) and Exchange Customer Cables Records (ECCR) for use in the manual assignment process is now maintained in an automated data base. As a consequence of assignment requests from the Service Order Analysis and Control (SOAC) system or inquiries from Loop Assignment Center (LAC) personnel, LFACS applies appropriate algorithms to information contained in the data base in order to provide appropriate responses.

The LFACS assignment process consists of two parts: the blocking function and the assignment function. The blocking function identifies the serving terminal. The automatic assignment function uses information provided by the blocking function in conjunction with an assignment algorithm appropriate for the type of service requested. The automatic assignment function can select reserved, connect-through, committed and spare pairs. Given that an assignment cannot be made in one of the above ways, a pair can be selected by breaking a connect-through which has remained idle for longer than a specified time period (overaged), performing a line and station transfer, breaking an underaged connect-through or some combination of these. The order of the selection of pairs is controlled by parameters specified at the terminal or wire center level. In addition to automatic processing, LFACS supports a capability which allows a user to manually select and assign any OSP facilities.

The LFACS administration of circuit terminations and facilities allows for single-loop single-line circuit terminations, multi-loop single-line circuit terminations, and multi-party circuit terminations with the use of appropriate bridging rules. Two or more circuit terminations may share a common facility (i.e., cross-box or field bridging).

LFACS supports the assignment and administration of multiple outside plant, dedicated outside plant, and serving area concept. This includes the specific types of hardware associated with each type of administration. The LFACS assignment function processes customer initiated inward, outward and change activity for circuit terminations.

SOAC matches the address from PREMIS to a possible address in LFACS. If a match is found it proceeds with processing by matching that to a terminal serving the address. It then begins to select a pair back to the central office. Once this is completed the Assignment Request Response (ARR) is sent back to SOAC and the loop part of the connection is fixed.

SOAC makes an assignment request to the Computer System for Mainframe Operations (COSMOS) 114 via Work Manager (WM) 116 or SWITCH 118. The WM links COSMOS to the other FACS components. Inquiries and transactions to COSMOS are sent through the WM which controls the load level of the message delivered to COSMOS. If COSMOS fails, the WM stores the ARs (Assignment Requests) generated by SOAC during the down time and distributes them to COSMOS when it is restored.

COSMOS maintains an inventory of central office facilities (e.g., office equipment (OE), tie pairs (TP), bridge lifters (BL), telephone numbers (TN)). COSMOS assists the Network Administration (NAC) and Frame Control Centers (FCC) in managing, controlling, and utilizing main distributing frame and central office equipment, facilities, and circuits. The system performs preferential assignment of line equipment, frame jumper reuse, tie pair management for Plain Old Telephone Service (POTS), frame work management and includes extensive reporting capabilities.

COSMOS receives ARs from SOAC after a successful LFACS assignment and automatically assigns line equipment and certain miscellaneous central office equipment. COSMOS responds back to SOAC with ARRs. Cable transfers and reconcentrations generated by LFACS are automatically established in COSMOS. These transactions can be manually input into COSMOS if necessary.

The SWITCH system is an operations system to inventory and assign central office switching equipment and related facilities. It allows companies to provision, efficiently and economically, a network that is comprised of both digital and analog technologies. The SWITCH system provides improved computing methodology and a new database structure to support quick incorporation of new technological developments and to accommodate differences in technology between vendors. The SWITCH system will support digital and other new technologies/services in a single, integrated, flow-through provisioning system. In particular, the SWITCH system is designed to handle ISDN inventory and assignment requirements, and to facilitate ISDN flow-through provisioning. The SWITCH system is also designed to support inventory and flow-through assignment capabilities as appropriate for digital overlay networks and integrated digital facilities.

The SWITCH system will provide integrated inventory and flow-through assignment control for circuit switches, packet switches, ISDN switches, derived channel technologies, and for any associated transmission equipment and intra-office facilities (e.g., tie pairs) required to support the provisioning of these switches and technologies. SWITCH is designed to support integrated line and trunk side provisioning requirements and will ultimately replace and expand both COSMOS and TAS functionality.

COSMOS or SWITCH takes the facility that it obtained from LFACS and tries to find a match. Also PREMIS selects a Telephone Number and COSMOS attempts to match the facility, the F1 facility, and the Telephone Number. If a match is secured it assigns office equipment.

After SOAC gets the service order and determines what to do and sends the assignment request to LFACS, it sends a planning message to the Work and Force Administration/ Dispatch Out (WFA/DO) 120 and provides notification that there is a need to make a determination if there is any outside work to be done. After the assignment request response has come back from COSMOS, information is sent to Memory Administration Check System (MARCH) 122 for memory administration work and it is also sent to the Remote Intelligent Distribution Element Support System (RIDES) 124 which handles the fiber electronics, if required. A Work Manager (WM) 126 is disposed between SOAC and MARCH. After the assigned service order is received at WFA/DO a mechanized loop test is initiated by the Loop Maintenance Operation System (LMOS) 128. After the service is completed, the LMOS host 130 will receive a completed service order for record maintenance.

Service orders that do not automatically flow through the provisioning process fall out of automatic processing and are managed by the LAC Operations Management System (LOMS) 132. LOMS assists the Mechanized Loop Assignment Center (MLAC) in management of Requests for Manual Assistance (RMAs). The primary function of LOMS includes the creation of work packages for assignment personnel and monitoring the flow of orders through FACS and the service provisioning work group. This state of the art provisioning process may require up to two days to complete.

Two important work centers interface with FACS. These work groups are the Frame Control Center (FCC), and the Installation Control Center (ICC).

The FCC is responsible for the administrative, force control, work control, and analysis functions associated with the installation and maintenance of cross-connects of loop, special service, carrier, and message trunk circuits and their associated activities in central offices. The center is responsible for providing related order status and work completion information to the support systems, COSMOS and the TIRKS system, or to Order or Circuit Control Centers. The centers will also be responsible for the support of facility maintenance, sectionalization and/or substitution of facilities in connection with failures detected by routing testing or customer complaints.

The ICC has responsibility for and performs the administrative functions associated with work activities including:

Installation Force Management,

Order tracking,

Work assignment and dispatch,

Field-force coordination and progress tracking,

Force planning,

Prepost completion dispatch testing, and

Completion notification to the service order centers and to the customer when required.

The ICC performs these functions for installation work groups, which are the field forces responsible for installation of the service drop, protector, network channel terminating equipment, network terminating work, and network interface. The ICC interfaces with FACS through WFA/DO the Work and Force Administration/Dispatch-out system. This interface is optional and is not installed in all companies. Where WFA/DO and its interface to FACS do not exist, the ICC gets its information from FACS as a function of the normal service order flow. The WFA/DO interface speeds the process and provides additional automation to assist the work in the ICC.

As discussed above, FACS is designed to optimize the assignment or provisioning of customer facilities. Accordingly, FACS will often reuse customer facilities in order to achieve the main objectives of FACS which is to conserve customer facilities, i.e., outside plant or OE. FIG. 7 is a detailed diagram of outside plant facilities for a first combination of customer locations. As illustrated in FIG. 7, customer locations 201, 203, 205 are connected to central office 200 via different combinations of outside plant facilities including cable pairs 202a, 204a, 206a and cable pairs 202b, 204b, 206b via cross connect devices 208 and 216. Customer location 201 is connected to CO 200 via cable pair 206a and terminal 210a in cross connect device 208. Customer location 203 is connected to CO 200 via cable pair 204a and cable pair 204b by connecting cable 212b which connects terminals 210b and 214b in cross connect device 208, and terminal 218b in cross connect device 216. Finally, customer location 205 is connected to CO 200 via a drop wire and customer serving terminal (not shown) cable pair 202a and 202b by connecting cable 212c which connects terminals 210c and 214c in cross connect device 208, and cable 220c which connects terminals 218c and 222c in cross connect device 216. As can be seen, multiple cable pairs are installed or positioned along the area of customer locations 201, 203, 205, and not all of the cable pairs are utilized. This type of arrangement of outside plant facilitates the adaptability of outside plant to changing conditions of the various customer locations in the area of cross connect devices 208, 216.

FIG. 8 is a detailed diagram of outside plant facilities for a second combination of customer locations which has altered the first combination of customer locations. In FIG.

8, customer location 205 has been disconnected via a disconnect request executed by the Business Office and entered via a disconnect service order in the SOP. During the same relevant time period, a new service request has been initiated by customer 207 at the Business Office and entered via a new connect service order in the SOP.

Both the disconnect and new connect service orders are transmitted to SOAC which sends each of the requests to LFACS for outside plant provisioning. Since, as indicated above, LFACS will attempt to optimize outside plant facilities by minimizing the outlay of new cable pairs and reuse of existing outside plant facilities, LFACS will often break the existing connection 212c in cross connect device 208 at 224, and reassign terminal 210c to the new customer location 207. A work order is then issued for an installer to make the appropriate changes to the outside plant facilities.

FIG. 9 is a detailed diagram of office equipment facilities for a first combination of customer locations. In FIG. 9, stored programmed control switch 230 will connect incoming telephone calls to destinations by connecting the incoming call to, for example, different central office frames which will be described. For example, an incoming telephone call may arrive in the central office in frame 246c at frame location 248c. Frames 246a, 246b, 246c, 246d may be located on a first floor of the central office building 245 and represent the vertical side of the Main Distributing Frame (VMDF). All cable pair terminations are made on the VMDF.

The incoming call is then transferred to frame location 242c in frame 240c bearing the office equipment used to provide the requested service to the customer location. Frames 240a, 240b, 240c may be located on a separate floor 241 of the central office and represent the horizontal side of the Main Distributing Frame (HMDF). All OE terminations appear on the HMDF. The cables 244a, 244b, 244c which connect frames 246a, 246b, 246c, 246d to frames 240a, 240b, 240c are commonly referred to as "jumper" cables. Frames 240a, 240b, 240c are then connected to switch 230 at switch connections 236a, 236b, 236c via cables 238a, 238b, 238c. From switch connections 236a, 236b, 236c, the incoming call may be transferred to another customer location or to another central office via, for example, trunk frame 235 at location 234 from switch location 232. Note that frames 246a, 246b, 246c, 246d and frames 240a, 240b, 240c may be located on different floors of the central office 241, 245.

FIG. 10 is a detailed diagram of office equipment facilities for a second combination of customer locations which has altered the first combination of customer locations. In FIG. 10, a first customer location which utilized the OE on frame 240b, accessed via frame 246b at location 248b, has been disconnected via a disconnect request executed by the Business Office and entered via a disconnect service order in the SOP. During the same relevant time period, a new service request has been initiated by another customer at the Business Office and entered via a new connect service order in the SOP. The second customer has been provisioned on frame 246b at location 254.

Both the disconnect and new connect service orders are transmitted to SOAC which sends each of the requests to COSMOS or SWITCH for office equipment provisioning, depending on the particular type of stored programmable switching equipment. Since, as indicated above, COSMOS or SWITCH will attempt to optimize office equipment facilities by minimizing the use of new office equipment, minimize the length of jumpers between frames, and reuse existing office equipment facilities, COSMOS or SWITCH will often not reuse the existing connection 244b at 250, and reassign a new jumper cable 252 for the second customer location. A work order is then issued to the central office for frame installers to make the appropriate changes to the office equipment facilities.

FIG. 11 is a detailed diagram of office equipment facilities for a first combination of customer locations. FIG. 11 illustrates the various connections within a frame at the central office. In FIG. 11, frame 254 connects three customer locations at entrance points 256a, 256b, 256c (VMDF) to office equipment connected to out going frame locations 260a, 260b, 260c (HMDF) via jumper cables 258a, 258b, 258c. Jumper cables 258a, 258b, 258c are to some extent disorganized, and longer than necessary, thereby inefficiently utilizing jumper cable facilities.

In order to correct the problem of inefficient allocation or provisioning of jumper cables, COSMOS or SWITCH in the FACS provisioning system will reorganize the jumper cables as illustrated in FIG. 12. Thus, frame 254 will connect customer entrance points 262a, 262b, 262c to office equipment accessed by cables 266a, 266b, 266c via jumpers 264a, 264b, 264c, thereby minimizing the jumper length and conserving use of the jumper cables. Accordingly, a frame installer will be dispatched to make the necessary changes to frame 254.

Previous efforts to reduce provisioning costs and improve provisioning services have focused on improving the flow of work through the existing provisioning steps which have been described. This approach seeks to improve an underlying process that was developed to support provisioning in an analog copper facilities environment. In essence it seeks to improve flow-through. One related system, U.S. Pat. No. 5,416,833 to Harper et al. has attempted to provide an essentially no-flow paradigm where most service requests move directly from service negotiation to service activation without going through current largely unnecessary assignment processes. The system in Harper et al. fully supports provisioning of services and also facilitates future enhancements to support provisioning of video-on-demand (VOD), ISDN and other advanced services.

Harper et al. includes reducing the operating cost of provisioning business functions, such as Install Inside and Install Outside; increasing the reliability of providing on-time, error-free service by reducing the number of orders that require manual assistance; increasing the flexibility of the provisioning process to support the activation of a new product or service quickly and inexpensively; enhancing customer service and customer retention by providing faster access to all products and services; providing a strong long-term information infrastructure that meets the needs of the existing products and provides a foundation that can handle the requirements of new products.

Referring to FIG. 13 there is shown a block diagram of the architecture of the Harper et al. system used in implementing the preferred embodiment of the invention. The Ready-To-Serve (RTS) Adjunct Processor (AP) is indicated at 136 and includes storages or memories 138, 140 and 142. While these memories are illustrated as separate items it will be understood that a single storage may be utilized and is preferred. The RTS is connected to the Sales Service Negotiation System (SSNS) and Common Service Order Processor (CSOP) 144. The SSNS comprises a graphical user interface system that presents information to service representatives from a variety of systems and platforms in a window format to assist negotiation of services and inquiries. The CSOP translates service requests from SSNS into service order format. The RTS processor and its storage or memories store an inventory of data which includes address information, network facility data and Telephone Number data. Addresses are associated with specific network facility data that will serve the address. Customers are associated with the address being served by the network. Included in the customer information is the Telephone Number of the customer and the type of service which is provided. Customer data also includes information concerning the current and previous customers, service, and status of each.

In general the RTS builds, maintains, and deletes information about the Living Unit (LU) address. This information is provided as required for the service negotiation process and is used in the processing of service activation requests. The customer information associated with the LU address supports access to customer data which includes existing and former customer names, class of service, telephone number, status of the line, and disconnect reason.

RTS validates address information provided by the customer at the time of service negotiation for a service request and provides all LU information associated with the address to the service negotiator. RTS provides capability to search by partial or full address, customer name, and telephone number. RTS contains all LU addresses regardless of the existing service type including both residential and business addresses. RTS LU databases are initially compiled from a combination of available data sources including PREMIS, LFACS, CRIS (Customer Records Information System), LMOS, and 911.

In general RTS builds, maintains, and deletes information common to a range of addresses. These ranges are modifiable for specific addresses within an area. This information is provided as required for the service negotiation process along with LU information and is used in the processing of service activation requests. The information is currently referred to as Street Address Guide (SAG) information and is contained in the existing PREMIS database. The RTS also builds, maintains, and deletes information about the Facility Information serving a LU address. This information is provided as required to the service negotiation process for use in the processing of service activation requests and in providing assignment data to other downstream systems.

The RTS Facility Information includes living units specific facility information. This facility information includes outside and central office facility data normally listed on the service order, such as: Outside facility data-cable and pair for F1, F2, FN; terminal addresses for distribution and feeder; status; and central office facility data; F1 cable and pair location; Office Equipment (OE) and location and status.

RTS provides the capability to search by facility data and provide facility information and status. RTS maintains a real-time view of the network facilities inventoried in LFACS and COSMOS. RTS performs updates to the facility data resulting in activity from the facility inventory systems including LFACS and COSMOS/SWITCH. These may result from network rearrangements in the form of Engineering Work Orders, maintenance changes, database reconciliations and other service order activity.

RTS stores and maintains all telephone numbers. RTS assigns TNS for all residential services and most business services. These are administered in RTS which controls the status and aging of such telephone numbers. Telephone numbers will be provided as required to the service negotiation process, for use in the processing of service activation requests, and in providing to other downstream systems. RTS has the capability to define, assign and change the status of a telephone number and will age residential and small business telephone numbers and make them available for reassignment after proper aging. RTS updates the telephone number database as a result of customer service requests, database reconciliations with other systems, and changes initiated by other inventory systems. The telephone number database is built from existing sources including COSMOS/SWITCH, LFACS, and Customer Records Information System (CRIS), which is the billing system for exchange services.

RTS stores and maintains an association for the Access Path. This association relates a specific LU address to a specific outside facility and office equipment and has a related customer and telephone number. RTS maintains a real-time view of the network facilities inventoried in LFACS and COSMOS. RTS performs updates to the Access Path data due to changes in LFACS and COSMOS/SWITCH. While RTS has the capabilities to alter various data associated with a customer address, it is the goal of RTS to maintain the network or customer facility assignments in tact, under all circumstances for which RTS is applicable. Accordingly, the service request is first transmitted to RTS to determine whether the same facilities can be provisioned to the customer, without optimizing outside plant and office equipment facilities which would be performed by LFACS, SWITCH and COSMOS. RTS, therefore, eliminates the potential re-working or re-assignment of customer facilities under most circumstances which LFACS, COSMOS and SWITCH will attempt for each service order request. Thus, RTS minimizes the amount of unnecessary installation work with the realization that the customer facility assignments may not be optimal.

In service request processing RTS has the ability to search by address, telephone number, customer name or SSN. RTS assigns a unique identifier to each service request which allows users and other systems to track and inquire about specific service requests. RTS also extracts service request data relevant to RTS processing and determines if a service request is RTS eligible or if the request must be sent to a Service Order Processor for processing.

RTS provides an interface to implement interaction between facilities and the Service Request. Thus, RTS determines if the service request requires dispatch for customer premises work and, if so, creates data packets containing service request information which are sent to WFA/DO.

RTS determines if an Activation Message is required for the Service Request and the Memory Administration Systems involved. RTS then creates and distributes activation messages to the various Memory Administration Systems. RTS also interfaces with MARCH to send activation messages and receive acknowledgement of work completed or error in processing.

RTS receives requests from other systems both in real time and batch modes. These systems include SSNS (Sales Service Negotiation System), SOP, EAMI (Exchange Access Mechanized Input) for processing Primary Interexchange Carrier (PIC) orders, and ASTR (Automatic Suspension Termination Referral) for processing Suspension, Denial, Restoral and Disconnect orders.

RTS has the functionality to alter and manage distributions depending on the type of service request. Thus, RTS transmits data to SOP, WFA/DO, MARCH and the other Memory Administration Systems as required. RTS receives facility status requests from inventory systems and transmits the facility status back to the requesting system.

RTS provides reports of various types including reports detailing information regarding the RTS data inventory, the volume of information processed by RTS, capacity available, time of processing requests of different types, and number of requests processed.

In order for RTS to accomplish the foregoing certain existing elements in the system are modified. Thus, SSNS is modified to interface with RTS for address, TN, customer, and service request information. LFACS and COSMOS status facilities as RTS, LFACS and COSMOS work without the current working/idle facility status. COSMOS loads business TNs into RTS. WFA/DO interfaces with RTS for dispatch requests and confirmations. RTS interfaces with MARCH for activation messages and configurations. RTS distributes to the other MA systems. SOP accepts an order from SSNS. SOP must also be able to accept the completion trigger from RTS and match it with a service order in its pending files.

As seen in FIG. 13, RTS 136 is also linked to other elements of the system including MARCH 122, WFA 120, SOP 106, SOAC 110, LFACS 112, COSMOS 114, and other MA systems 146. A link to a third net and its connected elements is provided at 148. SOP 106 is linked to SOAC at 110 for handling those requests which are not RTS eligible.

The method of operation of this preferred embodiment of the invention is now described in connection with the flow chart in FIGS. 14 and 15.

Referring to FIG. 14, at 150 the customer service representative determines the customer's address and the reason for the call. This may be for ordering service, making bill payment arrangements, registering a deposit, or calling for service maintenance. The call is handled or transferred according to need. If the customer is calling for new service or a change to existing service, the process proceeds to 152.

At 152 the customer service representative gathers the necessary information including the name of the calling party, the name of the customer, and the service address. If this is a new customer, the service representative may also obtain employment history, date of birth, SSN, and previous address information. The billing name and address is determined if different from the service address. The representative also ascertains how the customer wishes their service to be listed, the numbers and types of directories, calling cards, and any disclosures that are required.

At 154, the customer's credit history is checked using internal and external data sources. Through this step at 154 the process has been the same as that described in the current system illustrated in FIGS. 2 and 5. At 156 the service representative takes the customer service address information provided and uses the adjunct processor referred to as "RTS" 136 in FIG. 13 to verify the address, determine the working status of the address and determine the serving wire center and other common address information such as community and tax codes. Based on the wire center serving the customer, the service representative is able to determine what services are available to the customer.

At 158, the Assignment Section Information is retrieved from RTS including the network address such as cable, pair, binding post, time slot identification, etc. From this information a determination can be made whether the address is RTS eligible, what services may be offered to the customer, and whether the requested service may be provided over the existing network.

At 160, service is negotiated with the customer, matching the customer needs with the available services as at 18 in FIG. 3. At 162 the installation time is scheduled and due date for service negotiated as in step 20 in FIG. 3.

At 164, the selection of Telephone Number is now made from RTS which contains all TNs and also assists in administration of those numbers. Administration of TNs includes the categories, status and availability of the TN. This TN is based on the wire center serving the area and the availability of the TN. RTS supports the selection of a preferred or special TN by the customer.

At 166, the service representative recaps the service request to insure that the customer order accurately reflects the customer requirements as in step 24 in FIG. 3.

At 168, a determination is made to identify the service request as RTS eligible. This eligibility is based on the address being served, the status of network facilities and the services requested. If the service request is RTS eligible, the request is sent to RTS 136 in FIG. 13 for processing. If the service request is not RTS eligible, the request may be processed in the current service activation process environment. This is indicated at 170 where a conventional service order is issued followed by the remainder of the current service order processing steps.

If the service request can be processed by RTS, it is received by RTS at 172 in FIG. 14. The service request is received by RTS and validated and checked for format accuracy and RTS eligibility at 174 in FIG. 15.

At 176, RTS places the service request in a log for further use and identification. This permits a check of the status of the request at any point during RTS processing.

At 178, RTS associates service request types as appropriate before processing them through the RTS environment. This includes but is not limited to: sequencing "in" and "out" service requests, associating corrected service requests with the original request or processing supplemental changes of a service request in process. At 180, a determination is made as to where the request needs to be processed and in what sequence. Processing includes the Memory Administration System (MAS) that must receive an activation message based on the requested products and services. A determination is also made as to whether or not a dispatch or test is required.

If a dispatch or a test is required a message is created and sent to the Work and Force system at 182. This message includes all necessary information to complete the work request including assignment data. If other work in the field or in the central office is required, this is completed and reported back to the appropriate center or system as indicated at 184.

At 180, RTS also determines if a Memory Administration System (MAS) is involved in the request and, if so, determines if it has the required information to prepare a translation packet to send to the MAS. The translation packet (TP) is then created and sent to the MAS. The TP is received and validated in the Memory Administration System and the MAS determines what needs to be done to complete the request. The MAS creates a machine readable message (RC message) specific to the switch to receive the message. The Recent Change (RC) message is created to match the vendor's specific switch type and generic at 186. If the RC message is accepted by the switch, the switch updates the information associated with the switch equipment and telephone number on the RC message at 188.

When the Work and Force system completes a job, a completion confirmation is dispatched to RTS from the Work and Force system and from the Memory Administration System and RTS then updates the inventory facilities, telephone numbers and LU addresses at 190 to reflect the completed service request. The Service Request Order Trail is updated when each task associated with a service request is completed. When all tasks associated with a service request have been completed in the RTS processing environment, completion information is formatted for transmission to the service order processor at 192.

After completion of the service request the completion information is sent to the SOP at 194. This information may include the completion time and date, any changes to the service order and any billing information that needs added time and material charges. At 196 the SOP receives the completion information and prepares the completed service order for distribution and determines the distribution list. The completed service order is then distributed to all systems requiring the information.

As a result of the new system and method it is possible to reduce the time between request and activation of service from up to two days to a matter of minutes. In many instances it is possible to activate the service prior to ending the service request call. As a result of the new system and method it is possible to reduce the operating cost of provisioning business functions such as Install Inside and Install Outside, increase the reliability of providing on time, error-free service by reducing the number of orders that require manual assistance thereby increasing the flexibility of the provisioning process to support the activation of a new product or service quickly and inexpensively, enhance customer services and customer retention by providing faster access to all products and services, and provide a strong long-term information infra structure that meets the needs of the existing products and provides a foundation that can handle the requirements of new products.

In addition, the new system and method support SSNS negotiation by providing information that is currently provided by PREMIS. RTS provides telephone numbers for selection, address verification and suggestions, and RTS eligibility information. RTS stores and maintains all address information including common and living unit address information for both business and residential addresses. All telephone numbers are selected from RTS. However, the administration (classification and maintenance of status) of telephone numbers are split. RTS administers all residential telephone numbers and COSMOS continues to administer business telephone numbers. RTS does not provision facilities but instead maintains the status of a fixed assembly from the central office to the living unit. As service requests are processed by RTS, the facilities remain fixed and only the customer information and services are updated. RTS creates activation messages for other MARCH and other memory administration systems, such as VMAP (Voice Mail Adjunct Processor) and MSP (Multi-Services Platform), required to produce recent change messages which update switch memory. In addition, RTS does not maintain the facilities that it inventories and assigns.

While the Harper et al. system reduces the time between request and activation of service from up to two days to a matter of minutes, and may also activate the service prior to ending the service request call thereby reducing the operating cost of provisioning business functions, Harper et al. does not address other matters that would further reduce operating costs. For example, Harder et al. does not relate to effectuating improvements for maintaining facilities.

Some attempts have been made at reactively maintaining network facilities. For example, one process for reactively maintaining network facilities occurs as follows. If a trouble has not been detected and resolved before the customer identifies it, the customer calls to report the trouble. This initiates the reactive mode of maintenance. Reactively identified troubles constitute approximately 92% of all troubles experienced by network facilities. FIGS. 16–17 illustrate the systems and processes involved in the reactive maintenance flow. The following is an explanation of the role the systems play in the process flow.

Step S1—Gather Customer Information

Step S1a—Gather Stored Customer Information

The Caseworker 308 or Automated Repair Service Answering (ARSA) 310, answers the repair call and obtains the affected telephone or circuit number. After entering the number on a Trouble Entry screen, the Caseworker or ARSA automatically receives related customer profile information, such as billing, service order, circuit test history and trouble history.

Step S1b—Gather Trouble Information From Customer

The Caseworker 308 or ARSA 310 obtains a description of the customer trouble and enters the trouble type on the Trouble Report screen. A Trouble Report Profile is built, which includes the trouble the Caseworker 308 or ARSA 310 has entered, automatically generated test results, related trouble reports and all information gathered in Step S1a. The Caseworker 308 then determines whether additional information is needed, or whether the report can be closed out, or whether the report should be forwarded to another work group.

Step S2—Route Trouble

Depending on the trouble type, class of service or test results, the information collected by the Automated Repair Service Answering (ARSA) 310 system or Caseworker 308 may lead to one of the following routing decisions.

The trouble could be resolved without further analysis and does not require a dispatch. This would occur when the customer agrees that the trouble is caused by their equipment and when the Caseworker 308 resolves the problem with customer education, such as how to use Answer Call. Problems solved in this manner would enable a front-end close out.

The customer needs to call another department, such as the Business Office, to resolve the trouble. In this case the customer is supplied with the correct phone number and the action to be taken.

The problem involves inside wiring, a jack or a piece of equipment located at the customer premises. If the customer is not enrolled in a maintenance plan, they are notified of any charges that might apply. No dispatch is made if the customer does not wish to pay.

The trouble location can be isolated to the outside or inside plant. For outside plant problems (cable, drop, etc.), the trouble is routed to the outside dispatch pool; for inside plant problems (switching equipment, line translations, frame equipment, network terminal equipment, etc.), the trouble is routed to the inside dispatch pool.

The information collected is not sufficient to make a decision at this stage. The trouble is routed to a Maintenance Center via Maintenance Contact Support System (MCSS) 306 for further manual screening, additional tests, and analysis by a Maintenance Administrator (MA). MCSS 306 interfaces with Work and Force Administration/Control (WFA/C) 300 and WFA/Dispatch Out (WFA/DO) 120 for requesting work force functions or actions to be performed by craft personnel. WFA/Dispatch In (WFA/DI) 302 is provided for craft personnel to update the status of completed work in WFA/C 300. Some examples of troubles updated by WFA/DI into WFA/C could include cross talk, noisy, no dial tones at times, etc., where the line tests okay. Trouble reports where the data on the line record doesn't agree with the information the customer has given could also be included, such as new service orders that have been completed but have not been posted to LMOS Host 116.

Step S3—Perform Further Screening and Determine Fault

The Auto Screen and Mechanized Screening sub-systems of LMOS Host 116 are rule-based applications that make some of the routing decisions based on Mechanized Loop Testing (MLT) 314 test results and other trouble characteristics. Troubles that fall out of these subsystems are forwarded to a Maintenance Center for further analysis by an MA as mentioned above.

MAs make full use of MLT 314 and other sources of information to perform interactive testing with technicians. Several MLT tests are submitted for each trouble ticket. MAs compare the results to provisioning data in the LMOS Host 116 to identify the possible location of the trouble in the loop. MAs may contact the customer to gather additional information, or to conduct additional testing. After this process is completed, the MA updates the ticket and, if appropriate, dispatches the trouble to the appropriate craft technician.

Step S4—Dispatch

The Work and Force Administration/Dispatch Out (WFA/DO) 120 system supports the MA by providing logging, grouping and outside plant dispatching functionality for plain old telephone service (POTS) and non-designed special service troubles. All troubles that are successfully processed by the Mechanized Screener subsystem of LMOS F/E 312 flow through automatically to WFA/DO. If the Mechanized Screener is unable to make a routing decision, the trouble falls out for further screening by an MA, and is manually entered into WFA/DO 120 by the MA. For POTS, as many as 60% of troubles routed to a Maintenance Center flow through to dispatch. WFA/DO 120 supports this flow-through by performing the following activities.

Step S5—Perform Automatic Testing

Once the trouble from LMOS F/E 312 is received in WFA/DO 120, the system may request a full MLT test. The results of the test are used to determine the approximate location and cause of the trouble. This input is one of the factors considered by WFA/DO 120 in making a dispatch decision.

Step 6—Correct Problem and Close Trouble

The Craft Access System (CAS) 304 allows field technicians to remotely access the operations systems while performing work activity related to the resolution and closing of a trouble. These activities include, but are not limited to, job dispatch and close-out, circuit testing, time and materials reporting, spare pair assignments and access to required customer information. CAS 304 is accessed via a hand held terminal.

The primary functions supported by the CAS 304 are:
Receive New Installation Job
Receive New Maintenance Job
Work on Current Job
Close/Return Installation Job
Close/Return Maintenance Job The following secondary functions are also supported:
Conduct Loop Testing (via MLT 314)
View Technician Assignment Information
View Technician Load Information
Send/Receive Electronic Mail FIG. 18 illustrates the architecture of a standard mechanized loop test system used in the above described reactive maintenance of network facilities. FIG. 18 illustrates the data link between LMOS 128 and MLT system 314 via user interface 139. The user interface 139 is connected to the MLT controller 316 which is a software implemented system which performs test sequences, loop access, loop tests, communications and diagnostics. The MLT controller then transmits the various sequences and tests to test (hardware 318 which accesses the particular circuit to be tested and performs access, monitoring, loop test and diagnostics with the standard telephone central office switch 320 which is connected to subscriber 322.

The following brief discussion is provided regarding the specifics of the mechanized loop tests (MLT). MLT uses AC resistance to see if there is a telephone or other termination on the line. It makes three AC resistance measurements: T-R, T-G, and R-G. These measurements are called the "signature" of a telephone termination. A telephone causes a low AC resistance value. So, if the telephone is connected between the tip and ring, as on a POTS line, the T-R AC resistance value should be low. Since there is usually no phone on the tip side or ring side of the line, the AC resistance T-G and R-G should be higher. If either of the T-G or R-G values is low and the T-R value is high, the telephone may be connected improperly. If none of the values is low, then there is probably an open fault. Different types of terminations (2-party lines, PBXs) have different signatures. Both AC and DC resistance values are used to identify these different signatures. M L T includes a list of DC and AC values that correspond to certain line conditions. This list specifies what a short looks like in terms of DC resistance and what a Key Set looks like in terms of AC resistance. MLT compares the measurements it gets to the ones on this list. For example, MLT expects a standard POTS line to have a certain AC resistance. After it runs the AC Signature Test on a line, it checks to see if the results match the standard values. If they do, MLT decides that there are no AC problems and moves on to the next test in the sequence. If they do not match, MLT decides that there is a problem and does a special test for an open circuit. MLT makes decisions by comparing the test result values to the list of AC and DC values it retains.

The MLT standalone testing load is divided into two categories: rapid tests and interactive tests. Rapid tests are characterized by short trunk holding times (averaging about 20 seconds) with the release of test trunks and test equipment under the control of the MLT Control Software. Typical rapid tests include initial test series, pre-dispatch tests, pre-installation tests and tests to verify cable transfers.

Interactive tests are characterized by longer test trunk holding times (2–5 minutes) under the control of the user, and typically require both a test and talk connection to the subscriber's line. Typical tests include interactive talk and test with a repair technician (e.g., identifying a faulty pair in the field) or with a customer (e.g., TOUCH-TONE frequency test).

All rapid and interactive tests, with the exception of the double-sided fault sectionalization test, require one test trunk. The double-sided fault sectionalization test requires a test trunk connection to the faulted pair and a simultaneous separate test trunk connection to a good reference pair.

Individual MLT tests are described below. The first set below is run when you request a full series of tests on a line. They are initiated by the FULL request from an MLT test mask. The other MLT requests run a subset of these tests.

An access test is the test that MLT runs when it first connects a test trunk to the subscriber's line. First it checks for hazardous potential, which is defined as extremely high voltage on the line. That much voltage is dangerous, so MLT quickly drops access to the line, putting a halt to any further testing. If there's no hazardous potential, MLT connects a busy detector to the line. The busy detector, as you might expect, checks to see if there is speech on the line. If there is, MLT drops access immediately so that the customer is not disturbed. Otherwise, MLT remains connected to the line over the test trunk and moves on to the next test in the sequence.

A foreign electromotive force (FEMF) test perform a second check for excess AC or DC voltage. If there is a lot of excess voltage, MLT drops access to the line during the Access Tests discussed above. The FEMF tests look for high (but not necessarily hazardous) voltage. Because high voltage would adversely affect the results of later MLT tests, MLT stops testing if the FEMF tests reveal voltage exceeding a certain level.

A line in use test expects that the line to be tested is NOT being used at the time of the test. It expects that the telephone is on-hook. To make sure of this, it does a few checks to make sure that this is the case.

The first question MLT determines is whether the line appears to be in use. Each type of central office switch indicates a line in use condition in a different way. Each has its own line in use "signature." MLT figures out which type of switch is connected to the subscriber's line and then looks for this signature. If it finds what looks like a line in use condition, it checks for conversation, following by the Receiver Off Hook (ROH) test if conversation is not detected. Otherwise, MLT moves to the next test in the sequence—the intercept test. MLT determines whether the line in use condition is because the subscriber is talking on the line. Conversation for all switch types is determined by use of a speech detector. If it looks like conversation, MLT stops testing immediately to avoid disturbing the customer. Basically, MLT is double-checking to make sure that the busy detector in the Access Tests didn't make a mistake. If there is no conversation, MLT tries to figure out whether the receiver is really off-hook or if there is a fault that makes it look like that's the case. It does that by running a receiver-off-hook (ROH) test.

MLT next determines whether the receiver is really off-hook. The ROH test distinguishes between a T-R short and an actual off-hook condition. It does this by testing for non-linear devices such as diodes or varistors, which can only be present if the station set is off-hook.

The intercept test identifies lines that have been taken out-of-service. Out-of-service lines are often called "lines on intercept" since they are routed to an intercept message. Such lines also have characteristic DC signatures which are purposely placed on the intercept trunks to assist in MLT recognition. If it sees an intercept signature, it stops testing. If not, it moves on to the next test in the sequence.

The next step is the direct current (DC) test. By now, MLT is satisfied that the line is not in use or on intercept. So, it starts the DC and AC tests. An important thing to remember is that MLT removes the line circuit from the line at this point. The customer is out-of-service - THE LINE IS DEAD. The DC tests measure DC resistance and voltage.

Resistance values are used to identify shorts and/or grounds. A short fault means that current is taking an alternate route between the tip and ring. A ground fault means that current is escaping from the loop on either the tip or the ring side. MLT next moves on to the next test in the sequence if it identifies a short or ground fault, unless the fault is a major one. MLT stops testing if it discovers a major fault.

DC voltage values are used to identify a cross to a working pair, among other things. On a good POTS line, there should be no voltage T-G and R-G. That's because MLT removed the line circuit, which is where DC voltage comes from on a telephone line. A cross to a working pair means that the line has a resistance path to another telephone line and is drawing battery from that pair—so there should be voltage on whichever side is crossed with the working pair.

DC resistances are also used to validate non-POTS telephone signatures. Usually, AC resistances are used to identify telephones on the line, but some terminations (for example, a 756 PBX system) are recognized by their DC resistances. MLT compares the DC values it measures to those it expects for that particular telephone. If MLT measured these values and the line record indicated the presence of a 756 PBX, then MLT would report a valid PBX signature. And, because it validated a PBX, it would skip the AC Signature, Longitudinal Balance, Thermistor, and Opens tests since the presence of a PBX on the line leads to inaccurate results from these tests.

An alternating current (AC) signature test then is performed which uses AC resistance measurements to identify POTS and other termination equipment. Other terminations (2 party, Key Systems) will have different AC signatures. On a two-party line, one ringer is connected tip-to-ground and the other is connected ring-to-ground. If MLT sees high AC resistance values (doesn't see a valid signature), it suspects that there is an open fault and it initiates an opens test.

Next, a longitudinal balance test is performed that measures how likely it is that the line is noisy. The results are expressed in decibels (dB). A thermistor test is also performed which checks for the presence of a thermistor on the line. A thermistor is a part of the idle termination in some PBX and Key System telephones. It causes the telephone line's resistance to decrease as its temperature increases. By applying voltage to the line, MLT heats the thermistor and measures changes in resistance. The presence of thermistors are compared to expected thermistor locations (i.e., tip to ring, or tip to ground and ring to ground) for the termination (for example, PBX) listed in the line record. For example, a tip-to-ring thermistor would be expected if the line record lists 701 PBX as the termination.

The thermistor test is performed if the line record indicates that there should be a thermistor on the line, or if all other attempts at detecting a valid station signature have failed.

The opens test is also performed which uses AC capacitance measurements to analyze the location and type of open on a line. If MLT decides that a line is open, it then determines whether the open is in or out of the central office. AC capacitance is a measure of how long a wire is. So, if the length of either the tip or ring wire (for example, the distance from the CO to the open) is shorter than a reference length stored for comparison in each CO, MLT decides that the open is in the central office and reports OPEN IN; if those lengths are longer than the reference value, MLT decides that it is outside of the central office. In the latter case, it also reports the distance (in feet) from the central office to the open. The opens test is performed whenever an open is suspected based on results from the DC tests, AC signature test, or thermistor test. A capacitive balance measurement test is performed that also uses AC capacitance to compute a percentage called capacitive balance. Basically, it compares the capacitance of the tip wire to the capacitance of the ring wire. Because capacitance is used to measure the length of a wire, the balance measurement is the same as comparing the lengths of the tip and ring wires. Capacitive balance is important when there is an open fault. If the lengths from the central office to the open on both sides of the loop are equal, the balance will be about 100% and MLT will report a balanced open. This means that both sides of the loop are open at the same place. If the lengths are not equal, and the balance is less than 95% (for example, 150 feet/167 feet= 0.90=90%), MLT will not report a balanced open. This means that the open is probably only on one side—the shorter one. MLT determines which side is shorter and reports either OPEN TIP or OPEN RING.

A line circuit test checks for the proper arrangement of the battery and ground in the central office line circuit. The line circuit is the equipment that 1) detects that the phone has been taken off-hook, 2) connects the loop to the switching equipment and battery, 3) accepts dialed digits, and 4) provides dial tone. All of the tests described so far are conducted without the line circuit present since MLT removes the line circuit at the start of the DC Tests. Now, MLT has to re-connect the line circuit to the subscriber's line.

A draw and break dial tone test attempts to draw and break dial tone. MLT electrically simulates a telephone going off-hook and checks for the presence or absence of dial tone. Then, it removes the simulated off-hook condition and checks to see if the dial tone breaks or stops.

A soak test may also be performed that measures DC resistance over time to determine if a ground is "swinging" and if it may be "dried out." Voltage is applied to the line and a series of six resistance measurements are made over a short period of time. The highest resistance value of these six is compared to resistance value seen in the initial DC test to determine whether the fault is "swinging."

A ringer test may also be used to determine the location of standard ringers on a particular line. It checks for the presence of ringers T-R, T-G, and R-G. It then determines whether the results are consistent with what was expected from the line record information. If the line record says that it is a two-party line with only one party assigned, MLT expects to see one or more ringers on either the tip or ring side (remember that 2 party ringers are hooked up T-G and R-G, not T-R like POTS lines). So, it looks for low AC resistance on either the tip or ring side.

A length of loop measurement may also be performed using AC capacitance to measure the length of a good pair. It functions similarly to the opens test and reports the distance from the central office to the telephone. This test is run only on single party POTS and coin lines that have already been deemed TEST OK.

MLT also performs specialized test, sometimes requiring interaction with a subscriber or repair technician. For example, a dial test checks the subscriber's rotary dial. It requires the assistance of someone at the telephone in question. When that person dials a "0," MLT measures the dial speed and percent break of the rotary dial. This test is run when a problem with the dial is suspected (for example, the subscriber can't call out).

A touch-tone test checks the condition of the subscriber's touch-tone pad by analyzing the tones that are produced when the subscriber presses a certain sequence of buttons on the pad. This test is run whenever a problem is suspected with the touch tone pad (for example, the subscriber gets a lot of wrong numbers).

A resistive fault sectionalization test may be performed which measures the distance between a fault on a line and the repair technician's location along that line. To do this, the repair technician has to tell MLT where he or she is located. This is done by putting an intentional short on the telephone line. Then, MLT measures the distance from the fault to the repair technician's short. This distance helps the repair technician find the exact location of the fault.

Coin tests may be used that check for potential problems in a coin telephone set. Basically, it checks the two primary mechanisms in the coin set—the totalizer and the coin relay. The totalizer counts the coins that a customer puts in. It must be in a certain starting position when the coins are dropped in. When it is in this position, the totalizer is "homed." Each coin deposited causes the totalizer to send tones to the central office. When the central office hears enough tones, the customer is allowed to make a call. When a coin test is run, MLT first looks for a T-R short. If it finds one, it suspects that the totalizer is not homed. So, it (a) tries to home the totalizer, (b) listens for tones put out when the totalizer is homed, and (c) measures how much current it took to home the totalizer. If MLT doesn't find a T-R short, it checks the coin relay. The coin relay is the mechanism that returns or collects the coins deposited by the customer. It sends the coin to either the coin box or the return slot. If MLT sees a T-G fault, it suspects a problem with the relay. So, it (a) tries to operate the relay, (b) measures the relay's timing, and (c) measures how much current was needed to operate the relay.

Unfortunately, this current reactive process for maintaining network facilities suffers many significant disadvantageous. For example, reactive maintenance always results in an emergency situation since customers are unsatisfied with any minimal loss of telephone service. Further, the customer perceives that the telephone service provider is not performing to expectations. In this connection, we have discovered that current reactive maintenance processes suffer from lack of the necessary information to assess troubles and to appropriately dispatch technicians to correct reactive troubles in an efficient manner.

For example, we have discovered that current reactive maintenance processes are unable to analyze a current reactive problem using information regarding similar and related troubles that have been experienced contemporaneously with other network facilities. This type of information is sometimes the most valuable, since it provides a vignette or small picture of current conditions in the area of the reactive problem. In addition, we have discovered that current reactive maintenance processes also suffer from the inability to collate reactive troubles with proactive troubles. Accordingly, we have discovered that field technicians for current maintenance systems are unable to correct different categories of troubles in substantially the same geographic area. Thus, much additional work and expense is required since field technicians are not appropriately dispatched to areas to maximize efficiency, minimize travel and minimize repair time.

We have also discovered that some reactively reported troubles may be resolved by comparing these troubles to already determined and related reactive and proactive troubles. We have further discovered that for much better and accurate determinations of the presence of a trouble, baseline data indicating the regular working conditions of the communication line is needed and must be available on a real-time basis. We have also discovered that many reactive troubles are discovered and reported when technicians have already been dispatched to the substantially same geographic area to correct related troubles.

Accordingly, other attempts at repairing and/or maintaining network facilities have taken a "proactive" approach. FIG. 19 illustrates one current process for proactively repairing and/or maintaining network facilities. As will be discussed in detail below, we have discovered that this current process of proactive maintenance for telephone related operations has significant disadvantages, particularly with respect to the distributed database architecture of data being stored in many different databases. The various components/ systems that have been described previously are not described in connection with FIG. 19. Note that Customer Record Information System (CRIS) 324 that handles customer billing is further provided with its own data as well.

The proactive maintenance is performed as follows. Automatic Line Insulation Test (ALIT) 336 tests for any line insulation failures on a cable basis that appear as leakage resistances and/or dc voltages via switch 338. The results of the tests conducted by ALIT 336 are transmitted to PREDICTOR 334, described below, for analysis. PREDICTOR 334 then determines whether the cable should be considered in a fault status. PREDICTOR 334 utilizes Automated Cable Expertise (ACE) system 332 which analyzes and stores historical data on outside plant troubles for the determination of a faulty cable. PREDICTOR 334 also utilizes Cable Repair Administration System (CRAS) 330 that provides analytical reports on outside plant troubles and technician performance administrative reports for the determination of a faulty cable. PREDICTOR 334 also utilizes Loop Activity Terminal Information System (LATIS) 328 that provides analytical reports on where operating costs are occurring in outside plant troubles. PREDICTOR 334 also utilizes Mechanized Trouble Analysis System (MTAS) 326 that provides customer trouble history data in general.

When PREDICTOR 334 estimates that a telephone line has a potential trouble via ALIT 336 (as described in detail below), LMOS/Host 116 is notified which in turn notifies LMOS/FE 312. LMOS/FE 312 then, with the assistance of maintenance personnel, requests MLT 314 to perform a more in depth analysis of the telephone line via switch 338 to determine more precisely if the cable is in fact faulty. FIG. 20 illustrates a simplified block diagram of the current process for proactively repairing and/or maintaining network facilities illustrated in FIG. 19. Note that LMOS/FE 312 and LMOS/Host 116 are represented by LMOS 340. In addition, Automated Cable Expertise (ACE) system 332, Cable Repair Administration System (CRAS) 330, Loop Activity Terminal Information System (LATIS) 328, Mechanized Trouble Analysis System (MTAS) 326 are collectively represented by Trouble Ticket Analysis System 342.

Significantly, we have discovered that the current cable fault detection performed by PREDICTOR 334 is insufficient, and at times inaccurate for today's telephone network situations. Accordingly, we have discovered that a better method of common cause fault detection or geographic grouping of proactive faults is needed which is explained below.

A detailed description of the current cable fault detection performed by PREDICTOR is described herein. Customers are the main source of information about outside plant trouble. Cable dispatch centers rely heavily on customer trouble reports to identify sections of plant that need repair. However, other sources are available, and are often used to supplement information reported by the customer. Automated Line Insulation Tests (ALIT), messages from Electronic Switching Systems, and alarms from cable pressure systems all supply information that may relate to outside plant trouble.

PREDICTOR is a computer based system that monitors these sources and uses thresholding techniques to identify probable areas of trouble in outside plant. This results in two important benefits. First, it reduces the amount of manual activity required to analyze many sources of data. Second, it has the potential to reduce customer report rates through early detection and repair of cable trouble.

PREDICTOR's main advantage is that its output can be altered to suit the needs of a specific user community. This flexibility is controlled directly by the user and can be exercised on a daily basis if necessary. PREDICTOR has several objectives.

1. Reduce the report rate in the outside plant.
2. Improve customer service by rapid detection of outside plant trouble.
3. Consolidate all outside plant (OSP) related messages into a common processor.
4. Provide early warning of troubles on coin lines and stations to Coin Repair to avoid lost revenue.

PREDICTOR's main relationship is with the Loop Maintenance Operations System (LMOS). Data circuits to LMOS allow PREDICTOR to receive nightly data base updates, and to request information during the day. The links to LMOS also give PREDICTOR access to Mechanized Loop Testing (MLT). As we will see, MLT plays an important role in reducing the amount of information that people must analyze in finding cable troubles. One of PREDICTOR's goals is to reduce the manual effort spent in analyzing ALIT messages.

The receipt of a trouble indication is not always a sure sign of outside plant cable trouble. Trouble messages can be generated on properly working equipment for many reasons. For example, leakage is a normal condition for certain kinds of terminal equipment (e.g., ground start PBX). PREDICTOR uses several methods to increase the validity of its reports.

First, PREDICTOR checks all incoming messages against a bypass list to eliminate any indications on ground start PBX etc. Second, PREDICTOR looks for cable complements with accumulated trouble indications. Third, PREDICTOR uses MLT to verify that trouble exists on a targeted facility. These methods enhance the validity and usefulness of PREDICTOR input.

Reports can be obtained from PREDICTOR in several ways. Reports can be scheduled for issue at specific times during the day. For example, the Morning Report will be issued in the early morning before the first work assignment for outside plant technicians. Other reports are issued in response to alarm conditions identified by PREDICTOR's thresholding mechanisms. PREDICTOR scans its collection of trouble indications every half hour and issues Alarm Reports whenever predefined thresholds are exceeded.

Users also may request Special Reports from PREDICTOR at unscheduled times. This report is analogous to the Morning Report except that it is available on demand. If, for example, an ALIT run is scheduled for the afternoon hours, a Special Report can be designed for the user to examine the results of the run. Special Report thresholds can be altered for each report requested.

Verification of trouble conditions by MLT is an important feature of PREDICTOR. It is needed to prevent false dispatches and minimize the effort spent in manual analysis. Although PREDICTOR tests some incoming indications automatically, users access MLT from a CRT/keyboard. The transaction will provide users with a flexible means of verifying suspected trouble conditions in a cable via MLT. Accordingly, a cable fault may be then analyzed on a line by line basis using MLT. PREDICTOR does not provide trouble reports on individual line troubles. Rather, PREDICTOR provides trouble reports on a cable basis. MLT may then use the cable trouble reports to test each of the lines in the cable suspected to be in trouble. Its main features are as follows.

1. Cable oriented input. Users are allowed to test by entering cable and pair information directly without manually translating between cable/pair and telephone number.

2. Line record information. The output from MLT is merged with selected line record data stored in PREDICTOR's database. This merging makes it easier for users to detect relationships between test results and outside plant equipment.
3. Testing on multiple lines. The transaction allows users to begin tests on a series of lines with a single entry. This is done by entering a cable and pair range or by initiating tests from the displayed output of another transaction.

Updates to PREDICTOR's database will be received periodically from LMOS. However, manual updating of lines assigned to bypass or selective facilities status will be required. Single and multiple record retrieval assist users in maintaining the bypass and selective facilities features of PREDICTOR.

There are two transactions that allow users to retrieve information from PREDICTOR's database and to update the bypass and selective facilities status of the outside plant. The Display PREDICTOR Line Record (DPLR) transaction retrieves records from the database. The Change Status (CSTS) transaction is used with DPLR to assign lines to the bypass and selective facilities files.

In addition to the Bypass and Selective Facilities, users will also maintain the Scratch Pad File. This is best described as a mechanized log where relevant data on outside plant facilities (such as sheath openings and temporary closures, etc.) can be stored and retrieved. The format of the scratch pad is flexible and can be tailored to the needs of the user.

Scratch Pad entries include fields to identify the facility number, cable and pair ranges, and date of entry. A lengthy remarks field is also provided. The user can enter an estimated completion date for construction activity, rehabilitation work and so on.

Users will be able to enter selected data on routine work, or other information as they feel is necessary. PREDICTOR's reports will be flagged to alert users whenever incoming trouble indications fall within the range of an entry in the Scratch Pad. This is a simple way of notifying users of pending jobs, temporary closures, open sheaths, cables under observation or other relevant information.

PREDICTOR is designed to reduce the manual effort spent analyzing a variety of trouble messages relating to the exchange plant on a cable basis. PREDICTOR accepts messages from XBAR and ESS switching machines and applies thresholding algorithms to identify potential cable failures. MLT is used to verify any messages selected by the algorithms. A bypass file allows PREDICTOR to filter out false indications from ground start PBX and other special terminations.

There are four reports provided by PREDICTOR. The Morning Report helps users select routine work items for early morning dispatch. Special Reports can be requested at any time to summarize activity in a geographical area. Alarm reports are based on ESS messages that are monitored continuously. Coin Reports provide MLT verified troubles on coin lines.

Since the inception of PREDICTOR, other functions and special features have been added to enhance the product.
1. connect a user's terminal with a switching machine for establishing two-way communications. Using standard ESS message syntax as input, the output is optionally returned to the user in standard ESS message format.
2. permit PREDICTOR to accept alarm messages, creates and prints a report containing the messages.
3. accepts a subset of LIT and diagnostic messages from the DMS-100 switch and provides a query function for this switch.
4. treat some facilities or telephone numbers with special processing. This function is provided by allowing special processing. Further control is extended to the selection/rejection of messages received concerning the facilities or telephone numbers from the switch. Control may be specified by data type, cable, pair, pair range, telephone number, telephone number range, and class of service.
5. allow the user add/change/delete data associated with selective facilities for a particular telephone number. It has options for all the items mentioned above.
6. provide an interface from PREDICTOR to the LMOS Tracker subsystem and a means of testing and entering cable troubles into LMOS.
7. allow a user to do single line tests on any data types in the Tdata directory within any MLT testable wire center. Troubles may be entered into LMOS if the user-established criteria is met.
8. permit users to use the output from the statistics gathering and analysis program to adjust threshold and complement sizes and ignore some diagnostic messages.

PREDICTOR also provides the following additional report features:
1. access and print entries, sorted by wire center and start date, for a set of wire centers defined by the Maintenance Center user list.
2. display the complete MLT summary test results rather than just the VER code.
3. provide the capability to easily switch a list of wire centers from one set of thresholds to another. Three sets of thresholds can be used: dry, normal and wet.
4. provide the user with a fast report based on a specified wire center or a list of wire centers.

With all the above proactive maintenance processes that are currently provided by ALIT, PREDICTOR and MLT, we have also discovered that these processes are insufficient for today's telephone network needs. For example, PREDICTOR provides trouble status only on a cable name basis. Therefore, PREDICTOR misses those cable failures where multiple cable names appear in and share the same cable sheath. Further, because current processes in ALIT are not processed in an efficient manner, ALIT processing is typically unable to be completed in one evening. Thus, faults or potential faults in outside plant facilities often go undetected for several days, due to PREDICTOR's use of only a portion of the cable pair failures in the outside plant in question.

We have further discovered that there are unique advantages to combining a reactive maintenance system with a proactive maintenance system. For example, we have discovered that field technicians that have been dispatched to resolve reactively determined troubles are generally capable and trained to also resolve proactively determined troubles. Further, we have discovered that reactively and proactively determined troubles that occur within a specific geographic area have generally common problems that are more easily corrected when resolved in a single task or order. Accordingly, we have also discovered that great savings in efficiency, cost and time result from a combined proactive and reactive maintenance system permitting proactive and reactive troubles to be resolved together.

Thus, it is desirable to provide better and more efficient reactive and proactive processes for detecting and correcting network facility faults and potential faults.

It is also desirable to analyze facilities on a telephone line basis in an efficient manner to prevent unnecessarily wasting of time and resources to perform detailed testing on all lines in a cable.

It is also desirable to provide a more organized system of storing data in a distributed database system to prevent unnecessary redundancy and facilitate database consistency.

It is also beneficial to provide a reactive maintenance process that appropriately dispatches technicians to correct reactive troubles in an efficient manner.

It is further beneficial to provide a reactive maintenance process that collates reactive troubles with proactive troubles in an appropriate manner.

It is further desirable to provide a reactive maintenance process that permits field technicians to correct different categories of troubles in substantially the same geographic area.

It is also beneficial to provide a reactive maintenance process that appropriately dispatches field technicians to different areas to maximize efficiency, minimize travel and minimize repair time.

It is further beneficial to provide a reactive maintenance process that is able to analyze a current reactive problem using information regarding similar and related troubles that have been experienced contemporaneously with other network facilities. This type of information is sometimes the most valuable, since it provides a vignette or small picture of current conditions in the area of the reactive problem.

It is also desirable to resolve reactively reported troubles by comparing these troubles to already determined and related reactive and proactive troubles.

It is further desirable to utilize baseline data for the communication line for much better and accurate determinations of the presence of a trouble on a real-time basis.

It is also desirable to inform technicians that have already been dispatched to the substantially same geographic area to correct all related troubles.

It is further desirable to combine a reactive maintenance system with a proactive maintenance system. It is further desirable for field technicians that have been dispatched to resolve reactively determined troubles to also resolve proactively determined troubles.

It is also desirable to group or bundle reactively and proactively determined troubles that occur within a specific geographic area as a result of the possibility of having common problems that are more easily corrected when resolved in a single task or order.

It is also desirable to obtain savings in efficiency, cost and time result from a combined proactive and reactive maintenance system permitting proactive and reactive troubles to be resolved together.

SUMMARY OF THE INVENTION

It is a feature and advantage of the present invention to provide better and more efficient reactive and proactive processes and a system for detecting and correcting network facility faults and potential faults.

It is another feature and advantage of the present invention to analyze facilities on a telephone line basis in an efficient manner to prevent unnecessarily wasting of time and resources to perform detailed testing on all lines in a cable.

It is another feature and advantage of the present invention to provide a more organized system of storing data in a distributed database system to prevent unnecessary redundancy and facilitate database consistency.

It is another feature and advantage of the present invention to provide a reactive maintenance process that appropriately dispatches technicians to correct reactive troubles in an efficient manner.

It is another feature and advantage of the present invention to provide a reactive maintenance process that collates reactive troubles with proactive troubles in an appropriate manner.

It is another feature and advantage of the present invention to provide a reactive maintenance process that permits field technicians to correct different categories of troubles in substantially the same geographic area.

It is another feature and advantage of the present invention to provide a reactive maintenance process that appropriately dispatches field technicians to different areas to maximize efficiency, minimize travel and minimize repair time.

It is another feature and advantage of the present invention to provide a reactive maintenance process that is able to analyze a current reactive problem using information regarding similar and related troubles that have been experienced contemporaneously with other network facilities.

It is another feature and advantage to resolve reactively reported troubles by comparing these troubles to already determined and related reactive and proactive troubles.

It is another feature and advantage to utilize baseline data for the communication line for much better and accurate determinations of the presence of a trouble on a real-time basis.

It is another feature and advantage to inform technicians that have already been dispatched to the substantially same geographic area to correct all related troubles.

It is another feature and advantage to combine a reactive maintenance system with a proactive maintenance system. It is another feature and advantage for field technicians that have been dispatched to resolve reactively determined troubles to also resolve proactively determined troubles.

It is also a feature and advantage to group or bundle reactively and proactively determined troubles that occur within a specific geographic area as a result of the possibility of having common problems that are more easily corrected when resolved in a single task or order.

It is also a feature and advantage to obtain savings in efficiency, cost and time result from a combined proactive and reactive maintenance system permitting proactive and reactive troubles to be resolved together.

The present invention is based, in part, on the realization that current processes and systems established to implement reactive and proactive maintenance were implemented for computer systems designed several years ago. These older computer systems, it has been discovered, were unable to perform the required reactive and/or proactive processes to properly maintain customer network facilities. Accordingly, significant network degradation has resulted.

The present invention is also based, in part, on the discovery that the current reactive maintenance process is deficient for various reasons, including not having available the appropriate information including baseline information, related reactive and proactive trouble information. In addition, the present invention is also based, in part, on the discovery that reactive and proactive troubles may be effectively and efficiently grouped to maximize technician efficiency, effectiveness and timeliness of any needed inspection/repair.

The present invention further provides the following additional features:

(1) reduce network services group operating costs;
(2) support goals for quality service;
(3) improve the quality, variety, case of use, and accessibility of telephone network facility related products and services.

(4) react swiftly to rapidly changing markets and technologies with the ability to meet various customer needs.

We have further determined that a significant opportunity for incremental cost savings for maintaining network facilities is in seven of the Sales and Service Delivery Business Process areas: Create Capacity; Sell Products/Services & Process Order; Design and Assign Facilities; Administer Memory; Install Inside; Install Outside; and Repair & Maintenance. These seven areas have been determined to represent 43.6% of the Sales and Service Delivery operating expense. Further analysis showed that within these seven business process areas, 64% of operating costs are associated with supporting residential plain old telephone service (POTS).

Proper maintenance of these business process areas are also critical for reasons beyond cost. A residential customer's perception of the service provider is largely driven by how easily service is activated or changed, how reliable the service is, and how effectively the service provider responds when the customer has a problem with their service. As a result of this analysis, the present invention's reengineering effort has focused on two functional areas, residential service provisioning and outside loop maintenance.

We have analyzed the current inter-office and loop maintenance environments to determine the effectiveness of each. We have discovered as a result of our analysis that even though the current loop maintenance business processes have been mechanized over time, the conceptual framework has not changed from the pre-mechanized work environment. Because of this lack of change, the majority (92%) of network troubles are still identified as a result of customer reported troubles, i.e., reactive maintenance. While systems and procedures exist to proactively identify troubles, they are not effective, and only generate 8% of current trouble reports.

Accordingly, another feature and advantage of the present invention is to further enhance proactive maintenance instead of waiting for customers to identify network troubles. This has two direct benefits. First, the trouble report rate drops because the majority of network troubles are identified and fixed before they become customer affecting. This benefit results in reduced maintenance costs and increased customer satisfaction. Second, proactively identified troubles can be fixed in bulk rather than on a pair by pair basis, reducing the amount of time it takes to resolve network problems.

This emphasis on proactive maintenance also provides several indirect benefits. The average cost per trouble can be reduced by providing the means to increase the number of front end close outs and isolate the trouble location for the plant technician. Unfortunately, the prior systems are very expensive and operate in an antiquated hardware and software environment. For example, LMOS has the highest catastrophic outage rate of any major computer system. Accordingly, we have discovered that significant changes are necessary to improve the current reactive and proactive maintenance systems.

To accomplish the above objectives, a service analysis system is provided in an administration system for a public switched telephone network. The administration system includes an attendant station for receiving service requests and collecting customer information, credit verification means, service order processing (SOP) means for creating and distributing service orders for processing by downstream processing systems such as Service Order Analysis and Control (SOAC) means, a Computer System for Mainframe Operations (COSMOS) means, SWITCH means, and Loop Facility Assignment and Control System (LFACS) means; and Adjunct Processor (AP) means having storage for storing data including Living Unit (LU) data, network facility data and Telephone Number (TN) data. The service analysis system proactively analyzes the working status of customer network facilities including a communication line in a communication cable associated with a customer. The service analysis system includes an automatic line insulation test (ALIT) system testing the communication line in the communication cable associated with the customer producing trouble indicators indicating a potentially defective communication line, and a mechanized loop testing (MLT) system testing groups prioritized for the communication line. The service analysis system also includes a data processor, operatively connected to the ALIT and MLT system, filtering the trouble indicators received from the ALIT system from predetermined communication services associated with the communication line that provide potentially false trouble indicators producing filtered trouble indicators, and generating a list of trouble indicators to be considered when determining whether the communication line is potentially defective. The data processor also generates an end to end description of the communication line to be tested, groups the valid trouble indicators that have common network elements in groups, and prioritizes the groups for performing a second level test of the communication line by the MLT system. The data processor discards the groups tested by the MLT system that are in a satisfactory status responsive to predetermined criteria, prioritizes the groups that are potentially defective indicating the potentially defective communication line generating prioritized groups, and generates a report to be used for examining the potentially defective communication line using the prioritized groups.

In accordance with another embodiment of the invention a service analysis system is provided that proactively analyzes the working status of customer network facilities including a communication line in a communication cable associated with a customer. The service analysis system includes a first test system testing the communication line in the communication cable associated with the customer in accordance with a first test producing trouble indicators indicating a potentially defective communication line, and a second test system testing groups of the trouble indicators associated with the communication line in accordance with a second test. The service analysis system also includes a data processor, operatively connected to the first and second test systems, filtering the trouble indicators received from the first test system from predetermined communication services associated with the communication line that provide potentially false trouble indicators producing filtered trouble indicators. The data processor also generates a list of the filtered trouble indicators to be considered when determining whether the communication line is potentially defective, and generates an end to end description of the communication line to be tested. The data processor discards the groups tested by the second test system that are in a satisfactory status, prioritizes the groups that are potentially defective indicating the potentially defective communication line generating prioritized groups, and generates a report to be used for examining the potentially defective communication line using the prioritized groups.

In accordance with another embodiment of the invention, a method is provided for proactively analyzing the working status of customer network facilities including a communication line in a communication cable associated with a customer. The method includes the steps of performing a first level test of the communication line in the communication cable associated with the customer producing trouble indicators indicating a potentially defective communication line, filtering the trouble indicators from predetermined communication services associated with the communication line that provide potentially false trouble indicators producing valid trouble indicators, and generating a list of the valid trouble indicators to be considered when determining whether the communication line is potentially defective. The method also includes the steps of generating an end to end description of the communication line to be tested, grouping the filtered trouble indicators that have common network elements in groups, and prioritizing the groups for performing a second level test of the communication line. The method also includes the steps of testing the groups prioritized for the communication line, discarding the groups that are in a satisfactory status responsive to predetermined criteria, prioritizing the groups that are potentially defective indicating the potentially defective communication line generating prioritized groups, and generating a report to be used for examining the potentially defective communication line using the prioritized groups.

In another embodiment of the invention, a reactive maintenance system is used in conjunction with an administration system for a public switched telephone network. The administration system includes an attendant station for receiving service requests and collecting customer information, credit verification service order processor (SOP) for creating and distributing service orders for processing by downstream processing systems such as Service Order Analysis and Control (SOAC) system, a Computer System for Mainframe Operations (COSMOS) system, SWITCH system, Loop Facility Assignment and Control System (LFACS) system, and Adjunct Processor (AP) having storage for storing data including Living Unit (LU) data, network facility data and Telephone Number (TN) data, a test system testing a communication line in a communication cable associated with the customer producing trouble indicators indicating a potentially defective communication line, and a data processor generating an end to end description of the communication line to be tested, prioritizing the groups that are potentially defective indicating the potentially defective communication line generating prioritized groups, and generating a report to be used for examining the potentially defective communication line using the prioritized groups.

The reactive maintenance system analyzes the working status of customer network facilities in response to a customer request reporting a customer trouble and includes a reactive maintenance attendant station receiving the customer request, retrieving related customer profile information including at least one of billing, service order, circuit test history, and trouble history, obtaining a description of the customer trouble and entering a trouble type associated therewith, and building a trouble report, the reactive maintenance system also includes a test system testing the communication line associated with the trouble report and generating test results. A caseworker using the test system determines whether additional information is needed, or whether the trouble report can be closed out, or whether the trouble report should be dispatched to a customer work group. If the trouble requires a technician, the trouble report is reviewed by the customer work group together with existing related proactive trouble reports by the customer work group. The reactive maintenance system also includes a work request processing and dispatch system that groups related open work requests with the trouble report and the existing related proactive trouble reports based on grouping rules including similarity of trouble, similarity of geographic area, and available time. The work request processing and dispatch system builds a work load for a technician responsive to pending work requests and technician information including work schedule., job type, work areas, and job skills, and generates a completion message to at least one of the SOP, the SOAC system, the COSMOS system, the SWITCH system, the LFACS system, the AP, the test system, the data processor and the customer as needed.

In another embodiment, a method of reactively analyzing the working status of customer network facilities in response to a customer request reporting a customer trouble includes the steps of receiving the customer request, and retrieving related customer profile information including at least one of billing, service order, circuit test history, and trouble history, the method also includes the steps of obtaining a description of the customer trouble and entering a trouble type associated therewith, building a trouble report, testing the communication line and generating test results, and determining, responsive to first criteria, whether additional information is needed, or whether the trouble report can be closed out, or whether the trouble report should be dispatched to a customer work group, and if so, transmitting the trouble report for review by the customer work group. The method also includes the steps of transmitting the trouble report and related proactive trouble reports to the customer work group using trouble routing criteria, mapping the trouble report to a maintenance area, determining a trouble priority, and assigning a trouble report status, and grouping related open work requests with the trouble report based on grouping rules including similarity of trouble, similarity of geographic area, and available time. the method further includes the steps of building a work load for a technician responsive to pending work requests and technician information including work schedule, job type, work areas, and job skills, and accessing information stored in operation support systems including at least one of the SOP, the SOAC system, the COSMOS system, the SWITCH system, the LFACS system, the AP, the first test system, the second test system, and the data processor as needed. The method also includes the steps of repairing and testing the communication line associated with the trouble report to verify that the communication line is working, notifying the customer that the trouble report has been resolved and the trouble is closed out, resolving the related open work requests, generating a completion message responsive to said repairing and resolving steps, and transmitting the completion message to at least one of the SOP, the SOAC system, the COSMOS system, the SWITCH system, the LFACS system, the AP, the first test system, the second test system, and the data processor as needed.

In another embodiment, a combination proactive and reactive maintenance system is provided that analyzes the working status of customer network facilities in response to a customer request reporting a customer trouble. The combined maintenance system includes an attendant station receiving the customer request representing a reactively determined trouble, and building a first trouble report, and first and second test systems. The first test system tests a second communication line in the communication cable representing a potentially proactively determined trouble, and builds a second trouble report. The second test system tests at least one of the first and second communication lines and determines whether at least one of the first and second trouble reports should be dispatched to a customer work group together with existing related proactive and reactive trouble reports to the customer work group using trouble routing criteria. The combination system also includes a data processor that generates an end to end description of the first and second communication lines to be tested, and a dispatch system that groups related open work requests with at least one of the first and second trouble reports and the existing related reactive and proactive trouble reports based on grouping rules.

In another embodiment, a method of proactively and reactively analyzing the working status of customer network facilities in response to a customer request reporting a customer trouble is provided. The method may be utilized in an administration system for a public switched telephone network which includes an attendant station for receiving service requests and collecting customer information, credit verification, service order processor (SOP) for creating and distributing service orders for processing by downstream processing systems. Examples of downstream processing systems are a Service Order Analysis and Control (SOAC) system, a Computer System for Mainframe Operations (COSMOS) system, SWITCH system, Loop Facility Assignment and Control System (LFACS) system, and Adjunct Processor (AP) having storage for storing data including Living Unit (LU) data, network facility data and Telephone Number (TN) data, a first test system testing a communication line in a communication cable associated with the customer in accordance with a first test producing trouble indicators indicating a potentially defective communication line, a second test system testing groups of the trouble indicators associated with the communication line in accordance with a second test, and a data processor generating an end to end description of the communication line to be tested, prioritizing the groups that are potentially defective indicating the potentially defective communication line generating prioritized groups, and generating a report to be used for examining the potentially defective communication line using the prioritized groups. The method includes one or more of the following the steps of:

(a) receiving the customer request;
(b) retrieving related customer profile information;
(c) obtaining a description of the customer trouble and entering a trouble type associated therewith;
(d) building a trouble report;
(e) testing the communication line and generating test results;
(f) determining, responsive to criteria, whether additional information is needed, or whether the trouble report can be closed out, or whether the trouble report should be dispatched to a customer work group, and if so, transmitting the trouble report for review by the customer work group using trouble routing criteria;
(g) grouping related open work requests and proactively determined troubles with the trouble report based on grouping rules including at least one of similarity of trouble, similarity of geographic area, and available time, the proactively determined troubles being determined in accordance with the following steps:
  (g1) performing a first level test of the communication line in the communication cable associated with the customer producing trouble indicators indicating a potentially defective communication line;
  (g2) generating an end to end description of the potentially defective communication line;
  (g3) performing a second level test of the potentially defective communication line to identify whether the potentially defective communication line contains the proactively determined troubles; and (h) building a work load for a technician responsive to the related open work requests, the trouble report, the proactively determined troubles and technician information including work schedule, job type, work areas, and job skills.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

BRIEF DESCRIPTION OF DRAWINGS

FIG. 7 is a detailed diagram of outside plant facilities for a first combination of customer locations.

FIG. 8 is a detailed diagram of outside plant facilities for a second combination of customer locations which has altered the first combination of customer locations.

FIGS. 26A and 27B are functional block diagrams of the service analysis architecture and functions in the proactive maintenance process.

FIG. 27 is a table illustrating the ALIT indications sent to the service analysis system.

FIG. 28 is a table illustrating the switch alarm indications sent to the service analysis system.

FIGS. 29–30 are tables illustrating the service analysis process parameters.

FIGS. 33–34 are tables illustrating the pre-MLT and post-MLT priority weightings for the service analysis process.

BEST MODE FOR PRACTICING THE INVENTION

Figure 21:
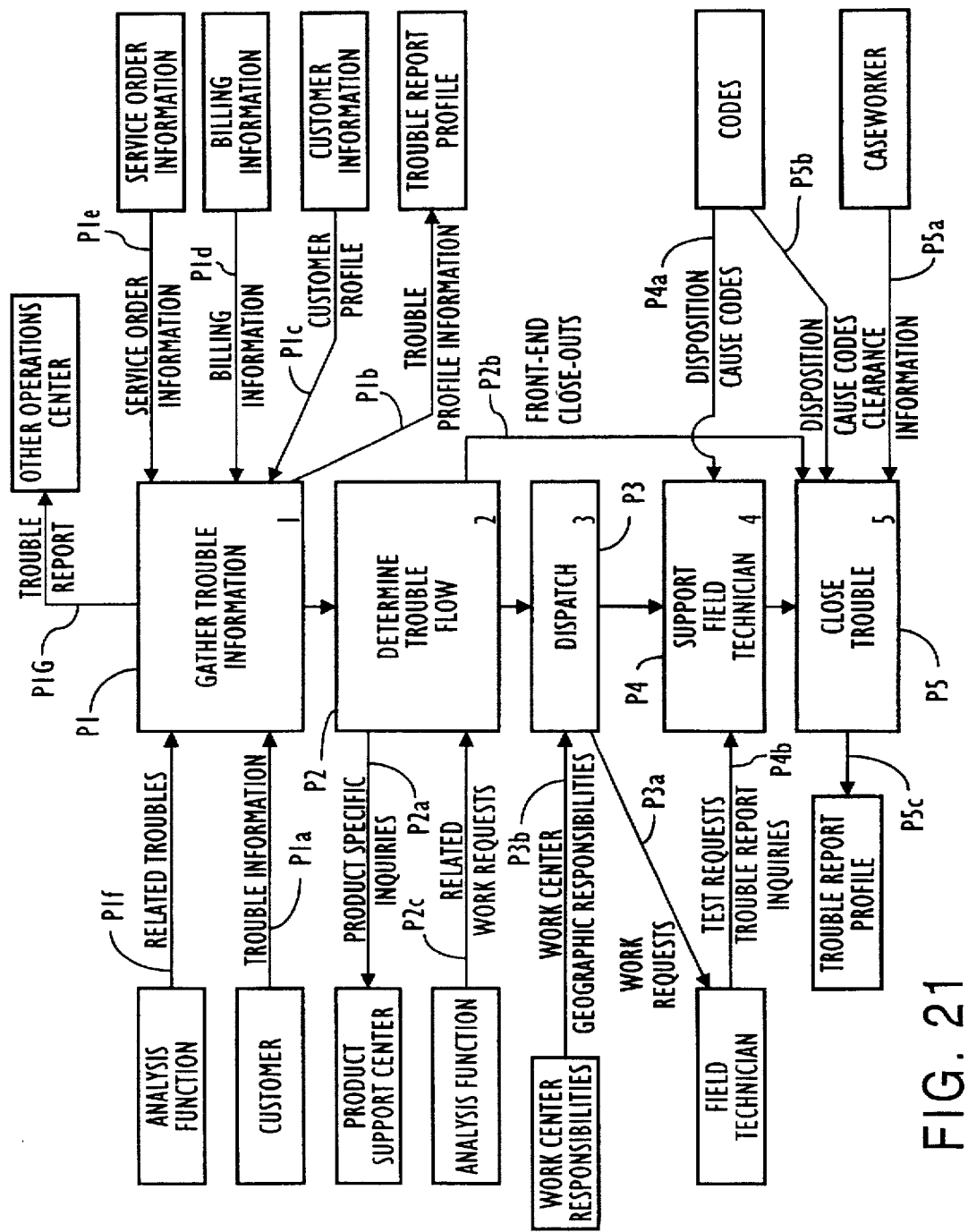
FIG. 21 is a flow chart of a reactive maintenance process.

FIG. 21 is a flow chart of a reactive maintenance process. In FIG. 21, caseworkers support the processing of trouble reports and work requests received from either internal or external sources for Plain Old Telephone Services (POTS) and non-designed special services. Functions associated with the process include repair answering, testing, screening, analysis, dispatch when necessary, field technician support, and trouble completion.

Step P1—Gather Trouble Information

The Caseworker answers the repair call and obtains the affected telephone or circuit number at P1*a*. After entering the number on a Trouble Entry screen at P1*b*, the Caseworker automatically receives related customer profile information, such as billing, service order, circuit test history, and trouble history at P1*c*–P1*f*.

The Caseworker obtains a description of the customer trouble and enters the trouble type on the Trouble Report screen. A Trouble Report Profile is built, which includes the trouble the Caseworker has entered, automatically generated test results, related trouble reports and all information gathered in step P1. The Caseworker then determines whether additional information is needed, or whether the report can be closed out, or whether the report should be forwarded to another work group, and if so, sends the report to a different center at P1*g*.

Advantageously, the Caseworker has access via the Service Analysis System (i.e., Analysis Function) to related proactive and/or reactive troubles for additional consideration when determining whether the reactively reported trouble requires dispatch or whether it can be corrected by the Caseworker. For example, if the Caseworker determines that the entire cable has become defective as is currently being repaired as indicated by the Service Analysis System, the Caseworker can immediately inform the customer that the trouble is being worked on. As a result, no additional testing or dispatch of technicians is necessary.

Similarly, the reactive maintenance system advantageously provides the Caseworker with baseline information regarding the normal operating conditions of the customer communication line. Thus, if a reactive problem is reported, and the Caseworker performs MLT testing described above, the Caseworker will be able to compare the MLT test results with the baseline information to more appropriately confirm whether the communication line does indeed have a trouble condition. Without this information, MLT results are many times meaningless in view of the variability of measurements between communication lines and the variability of acceptable test values for communication lines. For example, when a communication line has a baseline loop length of 100 feet, and MLT returns a loop length of 200 feet, a trouble has been detected. however, without this baseline information, the Caseworker would be unable to determine that the communication line has a trouble. The following additional scenarios where baseline information is necessary for a proper trouble determination are described in the table below:

1) POTS Customer with telephone and no other equipment

| DC Signature | | | AC Signature | |
|---|---|---|---|---|
| KOHMS | | VOLTS | KOHMS | |
| >1000 | | T-R | 3 to 40 | T-R |
| >1000 | 0 | T-G | >80 | T-G |
| >1000 | 0 | R-G | >80 | R-G |
| BALANCE | | LOOP LENGTH = >100 FT. | | |
| CAP. >98% | | | | |
| LONG. >63DB | | | | |

A failure would be indicated if:

The DC resistance fell below 1000 KOHMS in any position (a baseline value between 1000K and 3500K indicates that a short or ground is developing but is not bad enough to cause trouble)

The DC voltage is less than zero in conjunction with a decreasing resistance in the same position, T-G or R-G. This indicates that a cross is developing.

The AC resistance T-R has increased by 1K or more in conjunction with a reduction in CAP. balance of 1% or more and/or a reduction in longitudinal balance of 2 DB or more. Indicative of a series resistance forming at a binding post or other splice or connection point. Any AC resistance change without a balance degradation is probably due to the customer changing the station equipment arrangement (e.g., removing or adding telephone sets).

Capacitive balance reduction of >2% and/or longitudinal balance reduction of >2 DB without any other changes in baseline data elements. This would be indicative of an open bridged tap or a resistive cross to a non working pair in the same cable.

Loop length increases by more than 300 Ft. without any other changes in the baseline data. This can be caused by a section of water filled PIC cable without pair insulation problems that would cause leakage changes, or crosses.

2) Ground Start PBX Customer

| DC Signature | | |
|---|---|---|
| KOHMS | VOLTS | |
| RTR | | T-R |
| RTG | -VTG | T-G |
| RRG | -VRG | R-G |

A Failure would be indicated if:

RTR decreased by more than 2K OHMS, indicative of a short developing in the loop, paralleling the RTR component of the PBX signature, making it appear smaller.

RTR, RTG, or RRG increased by more than 2K OHMS indicative of a series resistance developing at a binding post or splice point due to corrosion and the corresponding increase in contact resistance.

The voltage-VTG or -VRG increased by more than 5 VOLTS (e.g., changed from −48V to −43V) which is indicative of a ground developing on the side with the change. Tip or Ring or both. The ground resistive fault would also cause the value of RTG or RRG to be less than the baseline value.

Step P2—Determine Trouble Flow

Using the information received from the data stores, the Caseworker continues to talk with the customer to determine the scope of the problem. By using on line job aids, the Caseworker provides recommended alternatives, such as plugging the telephone into another jack. In the event the problem is service specific, and the Caseworker cannot handle the problem, the Caseworker transfers the customer to the Service Specific Center at P2a. If a problem still requires further action, the Caseworker informs the customer and establishes a commitment/arrival time. Time and material charges are quoted to the customer, using an on line job aid. There are some cases, however, where further action is not required and the Caseworker has the ability to solve the problem with the customer still on the line, thereby closing the trouble at P2b.

The Caseworker enters the trouble type and required information on the Trouble Report Profile, reviews the trouble report for accuracy and completeness, and corrects any discrepancies. The Caseworker reviews the Trouble Report Profile, together with related work requests input at P2c, and a decision is made as to whether the report needs to be dispatched or can be closed out with the customer without a dispatch.

Step P3—Dispatch

The customer reported Trouble Report, along with any related Proactive Trouble Reports, is automatically forwarded to Dispatch where a Work Request is automatically created. Dispatch automatically routes the Work Request to the proper center at P3a, using prebuilt trouble routing criteria input at P3b. Dispatch also automatically maps the Work Request to the correct maintenance area, estimates the price (time) of the trouble, determines the job type (residence, business etc.), recalculates the trouble priority, and assigns the Work Request status (pending dispatch, pending load, etc.) Information used by Dispatch to perform these tasks is found in standard pre-established Dispatch tables.

The Maintenance Administrator manually, or the system automatically groups any related open Work Requests (e.g., proactive trouble) based on pre-established grouping rules and allocation areas. Work Requests may be stapled or linked with reactive troubles. When stapled, the technician is generally required to also perform such work requests while repairing the reactive trouble. If the work request is linked to the reactive trouble, then the technician is not required to perform the request unless it is convenient for the technician to do so. Using the pending work requests and pre-established information about each employee (work schedule, job type, work areas, job skills), the dispatch process automatically builds a trial work load, either bulk or dynamic, for each technician. Each load is automatically reviewed and altered if necessary.

Advantageously, the reactive maintenance system is able to collate and group related reactive and proactive troubles, as well as determine whether technicians are currently working on recently reported reactive troubles. Accordingly, technicians in the field that have been dispatched may be informed of additional troubles requiring resolution in the same vicinity, thereby increasing efficiency and timeliness of repairs.

Step P4—Support Field Technician

Information contained in other Operating Support Systems, Work Requests, Test Tools, Job Aids, and open Work Request relationships are necessary in assisting the Caseworker and the Field Technician with the proper handling and disposition of a network trouble. Disposition cause codes are entered by the Field Technician or Caseworker at P4a. Automatic access to all operating systems necessary to handle a network trouble customer complaint is provided to the Caseworker and the Field Technician at P4b.

The Field Technician is responsible for isolating and correcting the problem related to the Work Requests. Once the problem has been resolved the Field Technician retests the problem to verify that the line is working properly at P4b. If the test fails, the Field Technician begins the isolation and correction process again until the line is working correctly.

If the trouble is a customer reported trouble, the Field Technician notifies the customer that the problem has been resolved and the trouble is closed out. Isolate Trouble/Correct Problem are manual processes performed by the field technicians at the trouble site.

Step P5—Close Trouble

The Field Technician determines any related trouble reports stored in Dispatch. The Field Technician or the Caseworker closes out the Trouble Report by entering the trouble found, work done and cause descriptions at P5a. The Disposition and Cause Codes are automatically generated based on the trouble found and cause descriptions entered by the Technician/Caseworker at P5b. The system clock automatically records the date and time of the trouble clearance. If applicable, Time and Material charges are generated automatically based on the "hours spent" and "materials used" entries made by the Field Technician at P5c. This close process is continued until all related trouble reports are closed as well.

Information recorded by the Caseworker or the Field Technician is automatically sent to other systems as needed. Time and Materials charges are sent to the Billing Function. Field Technician and Caseworker time and associated codes are forwarded to Payroll. Closed Trouble Report information including Disposition and Cause Codes, may also be forwarded to the Service Analysis System and other related operating systems.

Figure 35:
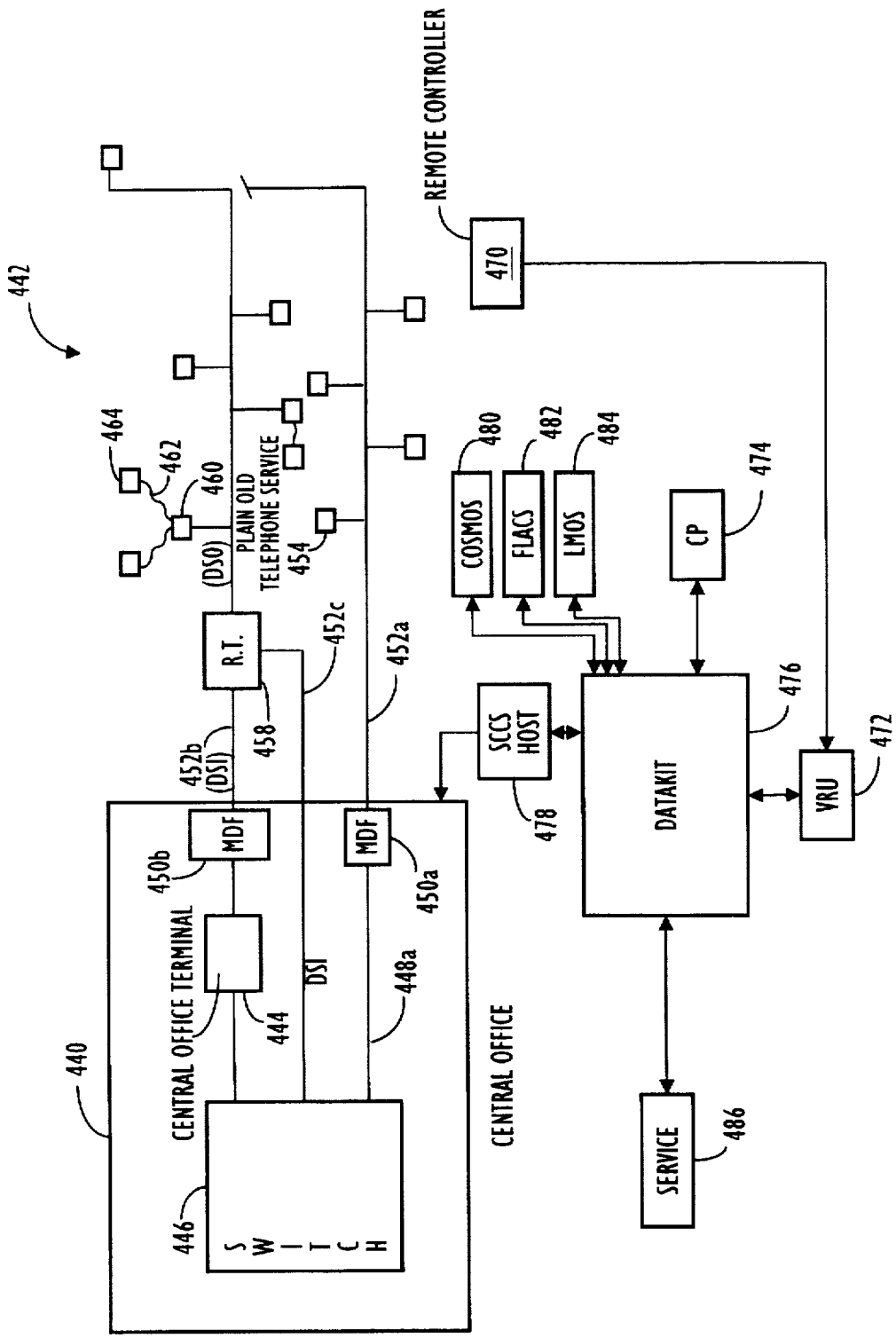
FIG. 35 is a block diagram disclosing a hardware arrangement for performing remote installation of customer facilities used in the reactive and proactive maintenance systems.

FIG. 35 discloses an arrangement for remote activation of facilities. In FIG. 35, a field technician is not required to perform hardware changes (e.g., cable throw, rewire, etc.) in conjunction with coordinated efforts by a frame attendant responsible for updating the necessary databases at the central office. Rather, prior to the work by the field technician, the database manager of the appropriate system will identify the facilities that are to be modified and/or the office equipment (OE) to be replaced for the application (e.g., cable throw, rewire, undeveloped transfer, etc.) on the basis of telephone number, old equipment, and new equipment, respectively. After completing all hardware installation and testing, the field technician independently accesses the system in order to activate the new facility.

FIG. 35 shows an arrangement by which the field technician is able to access the telephone network in order to activate new facilities using a remote controller 470. The remote controller 470 may be, for example, a dial set, although the dial set may be replaced with a lap-top computer for more advanced applications as discussed below.

The field technician will usually perform a continuity test on the new circuit before dialing into the network. After the field technician has successfully completed the continuity test, the field technician will dial into a voice response unit (VRU) 472, using either a spare dial tone or a customer's dial tone. The VRU 472 is preferably implemented as a digital voice synthesizer capable of handling up to twenty-four (24) calls simultaneously, although different voice response units may be used to accept inputs from the field technician via the remote controller 470. The voice response unit 472 is adapted to communicate with a change processor 474 via a Local Area Network (LAN) Datakit 476. The Datakit 476 is known in the art as a communication system manufactured by AT&T, used to access the computer control and database systems and the public switched telephone network. The change processor (CP) 474 is preferably an AT&T product known as the "400011", which includes a 3B-15 computer made by AT&T. The change processor 474 receives downloaded information from databases and control systems that supply OE information in response to a prior request from a database manager. The CP 474 stores the downloaded information in its own internal databases (not shown). The downloaded information stored in the change processor 474 identifies facilities that are to be modified and/or the OE to be replaced on the basis of telephone number, old equipment, and new equipment.

The VRU 472 communicates with the field technician by executing a digital speech driver program (DSDRV) that generates voice commands. Alternatively, the DSDRV is executed in the CP 474, which outputs the appropriate voice commands to the VRU 472 via the Datakit 476. Upon entering the appropriate access identification, the field technician is able to communicate with the change processor (CP) 474, which prompts the field technician as to the type of service being performed (e.g., cable throw, rewire, undeveloped transfer, etc.). After the field technician identifies the service using the remote controller 470, the change processor 474 prompts the field technician via the VRU 472 to identify the facilities being serviced, preferably in the form of a ten-digit telephone number, which may be used in some instances to identify a group of subscribers. The change processor 474 processes the ten-digit number supplied by the field technician, and compares the supplied ten-digit number with its internal databases to determine if the supplied ten-digit number corresponds to previously downloaded data with respect to facilities to be modified. If the change processor 474 does not match the supplied ten-digit number with a downloaded number, the change processor 474 supplies an appropriate message to the remote controller 470 via the VRU 472, for example, "telephone number not on file", and terminates (disconnects) the call. If, however, the change processor 474 matches the supplied ten-digit number with a telephone number stored in the internal databases, the change processor 474 generates the appropriate recent change signals for the office equipment/ switch corresponding to the ten-digit number, depending on the switch type (e.g., DMS-100, 5ESS, etc.), and outputs the recent change signals to an SCCS Host 478. The SCCS Host 478 supplies the recent change signals to the central office 440 for activating the new equipment. The SCCS Host 478 also provides the recent changes signals to other appropriate databases in order to register the change in OE.

SCCS Host 478 preferably provides remote access to the switch in order to perform modifications to the central office switch 446. As known in the art, the SCCS Host 478 comprises computers such as a 3B-15, 3B-20, etc., which obtain information from a switch maintenance section of the central office mainframe. The CO mainframe (not shown) receives information about the switch 446 via leads from the switch components. Thus, the SCCS Host 478 monitors the central office 440 based on the information supplied from the central office mainframe, and allows interactivity with the central office 440 either automatically or through the requirements of a technician. In addition, the SCCS Host 478 is able to look for alarms, look for troubles, and to print out the results at a switching control center for intervention by technicians, or to a display which may in turn activate an alarm at the center.

As discussed above, the CP 474 receives downloaded information from the appropriate database in order to generate recent change signals for a switch corresponding to a given telephone number supplied by the field technician. Depending on the application, the CP 474 receives the downloaded information from different databases via the Datakit 476. For example, the CP 474 may receive downloaded information from a Facility Assignment Control System (FACS) that automatically assigns loop facilities and office equipment to a subscriber address to provide the telephone service. FACS attempts to optimize the use of loop facilities and office equipment including jumper cables and minimize the amount of unused inventory and cost to the telephone service provisioning company.

As shown in FIG. 35, the CP 474 is able to communicate via the Datakit with a computer system for main frame operation (COSMOS) 480; a loop facility assignment and control system (LFACS) 482; a loop maintenance operation system (LMOS) 484; and/or a system to accept and route verification and input of customer enhancements (SERVICE) 486. SERVICE 486 stores enhanced services such as call waiting, call forwarding, three-way calling, caller ID™, and other IQ™ services. Other systems may be accessed by the Datakit as needed.

As known in the art, COSMOS 480 stores all the assigned equipment, to make changes, the hardware facilities changes need to be made at the same time as changes in the COSMOS database to ensure that there are no inconsistencies between the COSMOS database and the equipment in use.

The database manager of COSMOS 480 can identify the facilities that are to be modified and/or the OE to be replaced on the basis of telephone number, old equipment and new equipment, respectively. The request may come from LFACS 482, or SERVICE 486. The downloading of the information to the change processor 474 therefore eliminates any need to simultaneously update the COSMOS 480 system at the same time that new facilities are activated. Rather, a field technician can access the control processor 474 via the Datakit and the VRU 472 to cause the CP 474 to generate the recent change signals whenever appropriate for the field technician. The SCCS Host 478 then dispatches the recent change signals to the switch 446 and any necessary databases, such as COSMOS 480, LFACS 482, LMOS 484, etc.

Figure 36:
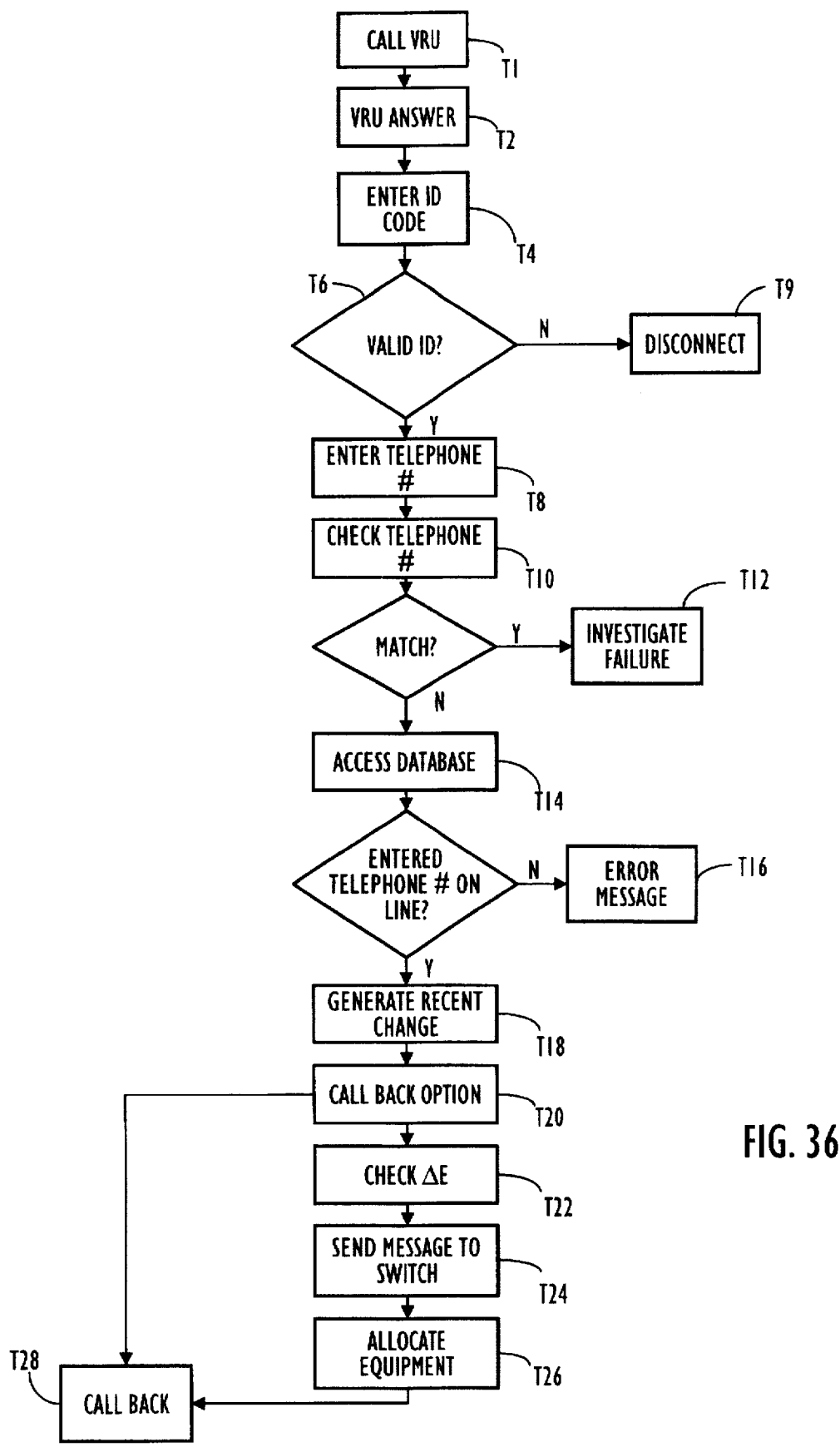
FIG. 36 is a flowchart of a method for performing the remote installation using the arrangement disclosed in FIG. 35 for performing remote installation of customer facilities used in the reactive and proactive maintenance systems.

FIG. 36 is a flowchart showing the method of updating databases by the field technician. A field service technician accesses the control system and transmits instructions via a voice response unit in order to reach access to a Datakit that serves as a communication path for software control data. The Datakit is under the control of a computer which includes, for example, a program for copper to fiber (CTF) exchange. Recent Change messages, containing new digital office equipment identification, are created and transmitted over a Recent Change Channel to the appropriate End Office. If the change cannot be done without problem, the control system will automatically default back to analog office equipment.

As shown in FIG. 36, the technician located at the distribution terminal, the CEV or the network interface device, can initiate the change over by placing a telephone call over the network to the voice response unit (VRU) (step T0). The customer's dial tone source can be used so that there is no need to bridge to a separate source. The VRU will answer the call (step T2) and prompt for the security code of the technician (step T4). After verification of the DTMF ID input (step T6), the VRU prompts the technician to enter the 10 digit telephone number that is to be converted (step T8). If the ID input is not valid, the caller is disconnected (step T9). Protocol will be provided for verification of the telephone number.

The control system in communications with the technician has the capability of checking the phone number to be converted against a record of numbers previously entered (step T10). A match would be recognized as a failure of a previous attempt to convert, thus triggering investigation at the switch (step T12). If no match occurs, a system database is accessed to determine whether the telephone number has been entered as being on line (step T14). If the telephone number is not on line, a message is sent back to the technician and the loop is terminated (step T16). If the telephone number is listed in the database, the program initiates the recent change procedure while the technician is on line (step T18). The technician is given the option of being called back after the change is completed (step T20).

After the technician terminates the call, the program will then look up the old OE and corresponding new OE for the telephone number in the database (step T22). A recent change message is then generated and transmitted through the Datakit network to the switch (step T24). The switch is thus instructed to allocate digital equipment for the telephone number (step T26). If the technician had elected a call back, the switch will place a call to the telephone number over a digital loop (step T28). Ringing of the call indicates successful transfer. In this manner the system moves all of the translations from the copper to the digital loop and tests the transfers.

The following examples illustrate potential applications of the remote controller 470 by the field technician.

This system is particularly useful for system upgrades, for example replacing twisted pair with optical fiber for upgrading networks to provide video broadband services using to-the-curb optical fiber service or hybrid-fiber coax. After installing the optical fiber, a field technician may access the CP 474 in order to activate the cable throw. The change processor 474 sends the recent change signal preferably on the maintenance channel, or possibly on the recent change channel, to the appropriate SCCS Host 478 as identified in the internal database of the CP 474.

The field technician may also use the remote controller 470 when installing multiple circuits (for example, 100, 200, 500) in a new community. In such a scenario, an equipment change is marked in COSMOS as "undeveloped transfer". The database manager goes into COSMOS and extracts the information for the corresponding switch 446 for downloading into the CP 474. In another application, a field technician can activate service coincidentally with moving a drop wire in the case of a rewire.

This system may also be applied to eliminate the need for RCMAC. For example, a field technician can perform tests on the facility and then call the VRU 472 in order to activate the subscriber without waiting for the RCMAC. In addition, the necessity for manual access to COSMOS/SWITCH is also removed, since the database manager can download any number of circuits at one time to the CP 474, thereby eliminating the need for a frame attendant.

In a variation of the above system used by technicians to complete repairs, etc., subscribers may be able to directly access the VRU 472 in order to modify services. For example, if a customer decides to purchase three-way calling service, or to try three-way calling service during a trial period, the change processor 474 can receive downloaded information from SERVICE 486 and generate recent change signals in response to customer inputs identifying a desired service.

In addition, the present embodiment may be modified such that the remote controller 470 includes a lap-top computer to enable the technician to access the Datakit 476 directly. In such a case, the field technician could act as the database manager and directly access the appropriate databases, such as COSMOS 480, LFACS 482, LMOS 484 and/or SERVICE 486, to download the appropriate information to the CP 474. Additional details of this system that permits field technicians access to the telephone network in order to activate new facilities using a remote controller is discussed in U.S. Ser. No. 08/383,740, filed on Feb. 6, 1995 to Kevin Maurer et al., incorporated herein by reference (attorney docket 680-077).

This system used by a field technician to either verify or activate customer enhancements, or to make changes such as cable throw, rewire, or undeveloped transfer in the local loop, may also be modified to enable customer access so that customers can call up and activate or deactivate the services over the phone. In such instances, a customer would likely use a soft dial tone in order to activate service to obtain a hard dial tone. A soft dial tone is a dial tone which permits access to only a limited sub-set of network services available to normal subscribers, to network lines which are "disconnected". When subscribers are "disconnected" they are only logically disconnected, that is, they are placed in an inactive status without physically disconnecting them from the network. The subscribers in a disconnected (inactive) status are provided with soft dial tone whereby they may access only a limited number of network services such as 911 emergency dialing and the placing of calls to the telephone company business office. Provision of these limited services is possible because of office equipment number rather than the telephone number (which is not valid for a disconnected user) of the telephone line at the user's location is used to identify the line requesting service.

The use of soft dial tone may be implemented by incorporating the arrangement of FIG. 35 into a public switched telephone system having AIN capabilities. In an AIN type system certain calls receive specialized AIN type processing under control of data files stored in an SCP database within an ISCP. In such a network, the SSP type local offices of the public telephone network detect a call processing event identified as an AIN "trigger". For ordinary telephone service calls, there would be no event to trigger AIN processing; in such cases the local and toll office switches would function normally to process the calls as discussed above, without referring to the SCP database for instructions. An SSP type switching office which detects a trigger, however, will suspend call processing, compile a TCAP formatted call data message and forward that message via common channel interoffice signalling (CCIS) link and STP(s) to the ISCP which includes the SCP database. This TCAP query message contains a substantial amount of information, including, for example, data identifying the off-hook line, the number dialed and the current time. Depending on the particular AIN service, the ISCP uses a piece of data from the query message to identify a subscriber and access the subscriber's files. From the accessed data, the ISCP determines what action to take next. If needed, the ISCP can instruct the central office to obtain and forward additional information, e.g., by playing an announcement to receive and collecting dialed digits or to receive voice input. Once sufficient information about the call has reached the ISCP, the ISCP accesses its stored data tables to translate the received message data into a call control message. The call control message may include a substantial variety of information including, for example, a destination number and trunk group selection information. The ISCP returns the call control message to the SSP which initiated the query via CCIS link and the STP(s). The SSP then uses the call control message to complete the particular call through the network. Thus, the use of a soft dial tone may be adapted to generate an AIN trigger whereby the ISCP, in response to a subscription request from the residential user, interacts with the CP 474 so that the appropriate recent change signals are generated to activate the subscriber service to a hard dial tone. A more detailed description of soft dial tones is disclosed in U.S. patent application Ser. No. 08/264,166, filed Jun. 22, 1994, the disclosure of which is incorporated in its entirety by reference. As would be appreciated in the art, the remote controller 470 may access the Datakit by using either a dial tone, or by a cellular phone call.

In a variation of the above embodiment, the use of a lap-top as the remote controller 470 would enable a technician to use the remote controller 470 as an intelligent peripheral (IP) in an AIN network in order to communicate with an ISCP. In such a case, the remote controller 470 having IP capabilities could bypass the maintenance channel inputs and directly supply inputs such as translation tables into the switch 446 using the common channel signaling network. A more detailed description of AIN networks and intelligent peripherals may be found in U.S. Pat. No. 5,247,571, and U.S. patent application Ser. No. 08/188,871, filed Jan. 21, 1994, (ATTY NO. 680-073), the disclosures of which are incorporated in their entirety by reference.

Figure 22:
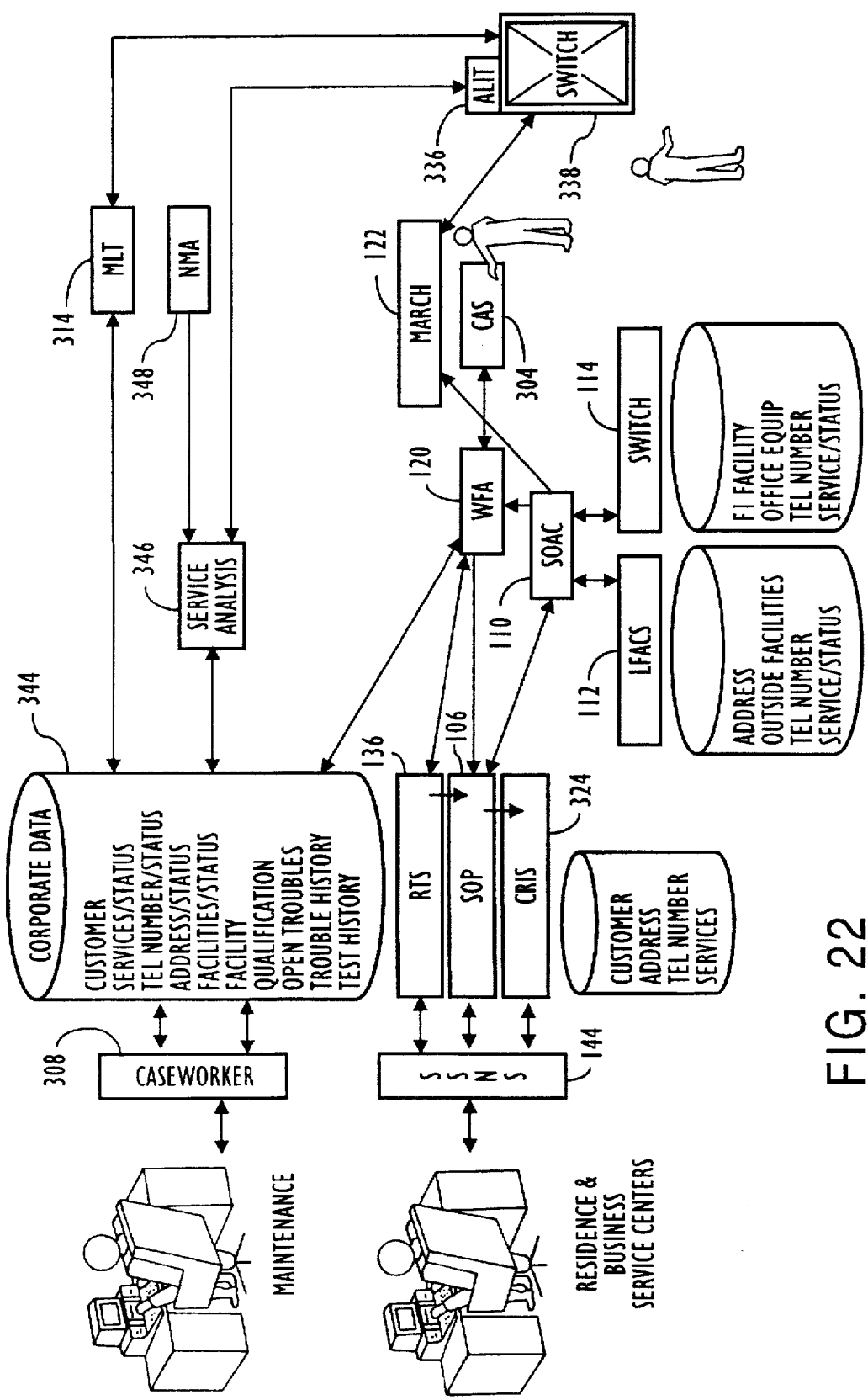
FIG. 22 is a block diagram of a proactive maintenance process.
Figure 23:
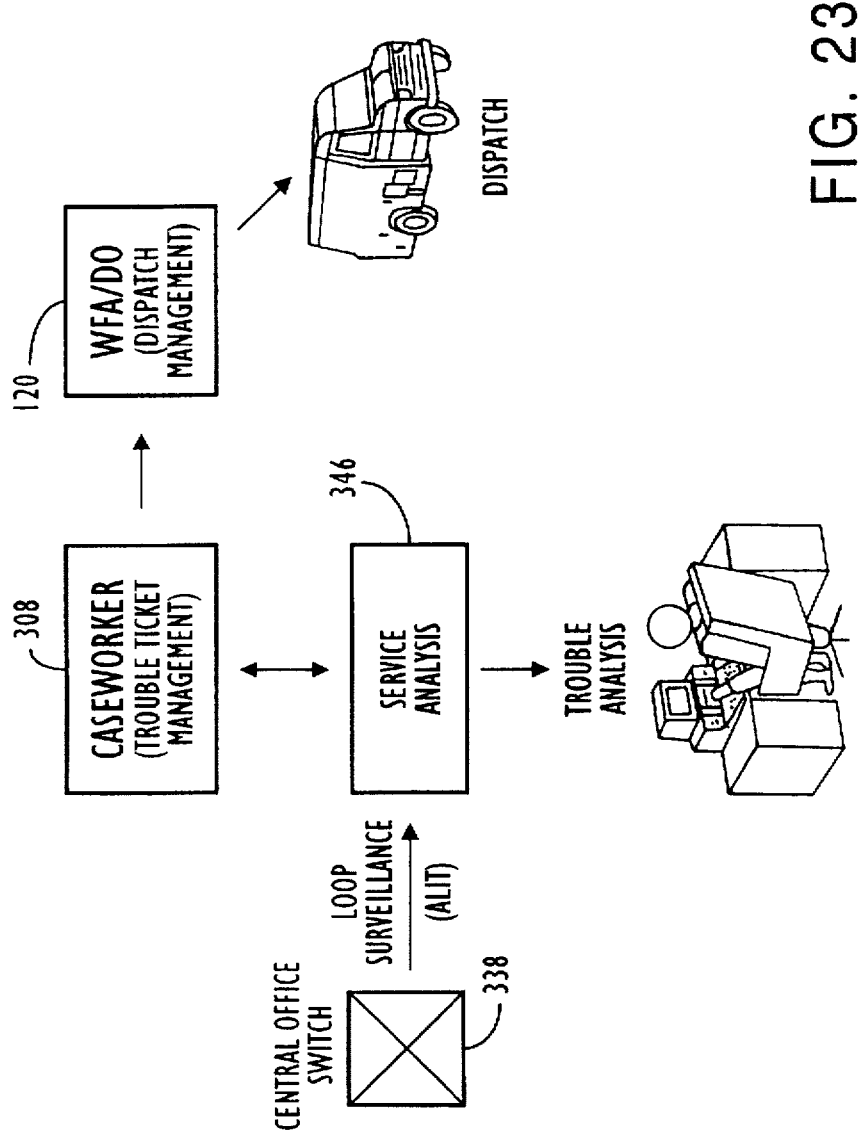
FIG. 23 is a block diagram of a proactive maintenance surveillance and analysis process.

FIG. 22 is a block diagram of a proactive maintenance process. In FIG. 22, a central corporate database 344 is provided that stores and maintains the basic customer network facility related data, such as customer name, service status, telephone number status, address, facilities, etc. Significantly, many of the previously provided databases that used to also maintain this information have been eliminated. This is a result of eliminating the previous systems LMOS/FE 312, LMOS/Host 116 and PREDICTOR 324, and providing a new component Service Analysis System 346 that performs enhanced testing and monitoring features, as will be discussed below in greater detail. In addition, the Network Monitoring and Analysis (NMA) system 348 is now utilized by Service Analysis System 346 for obtaining alarm status data regarding the facility network. FIG. 23 is a block diagram of a proactive maintenance surveillance and analysis process that has eliminated the other computer system components in the provisioning or facility assignment architecture for additional clarity.

Figure 24:
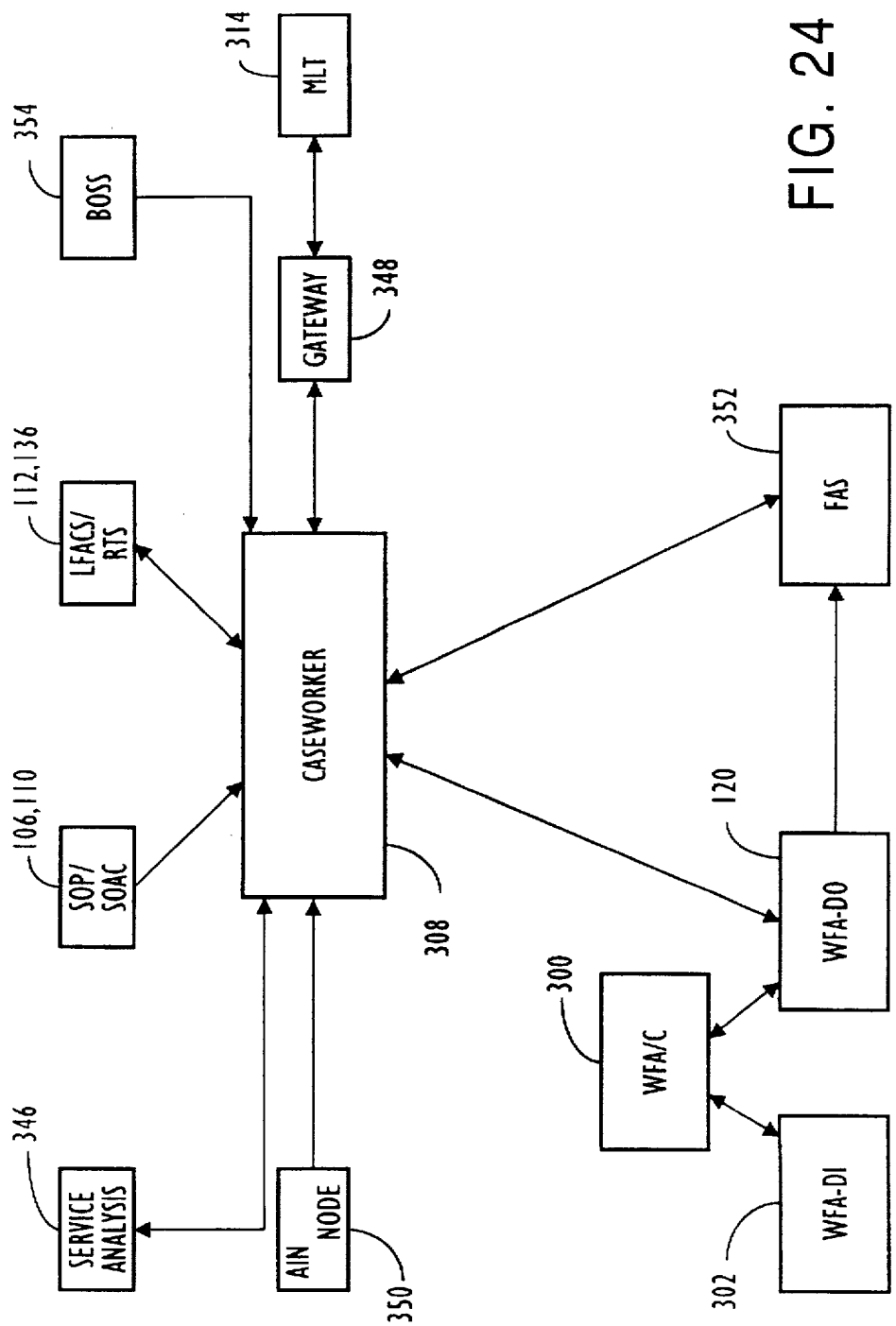
FIG. 24 is a block diagram of a proactive service management process.

FIG. 24 is a block diagram of a proactive service management process. In FIG. 24, Caseworker 308 is used for coordinating trouble reports received from MLT 314 (via standard interface Gateway 348) or Service Analysis system 346 via the reactive or proactive architectures. Depending on the trouble type, class of service and test results, the information collected by Caseworker 308 may lead to different resolutions of the trouble as discussed previously. In accordance with this management architecture, Caseworker 308 advantageously is able to access the different systems and related databases in the facility assignment system, such as SOP 106, SOAC 110, LFACS 112 and RTS 136. Caseworker 308 also has access to Billing Order Support System (BOSS) 354 used by Residence and Business Service Centers to assist service representatives with billing inquiries and services. BOSS provides, for example: 1) current monthly bill; 2) previous bill; 3) payments; 4) audit trail of account history (i.e., payment arrangements, discussions regarding service, record of contacts).

Caseworker 308 also receives information regarding network status from Advanced Intelligent Network (AIN) Node 350, indicating the status of the AIN facilities in the network that may assist Caseworker 308 in resolving a trouble report. Access between Caseworker 308 and WFA/DO 120 and Force Access System (FAS) 352 is also provided. FAS allows mobile field or central office based craft technicians to remotely access the appropriate operations systems to perform work functions.

Figure 25:
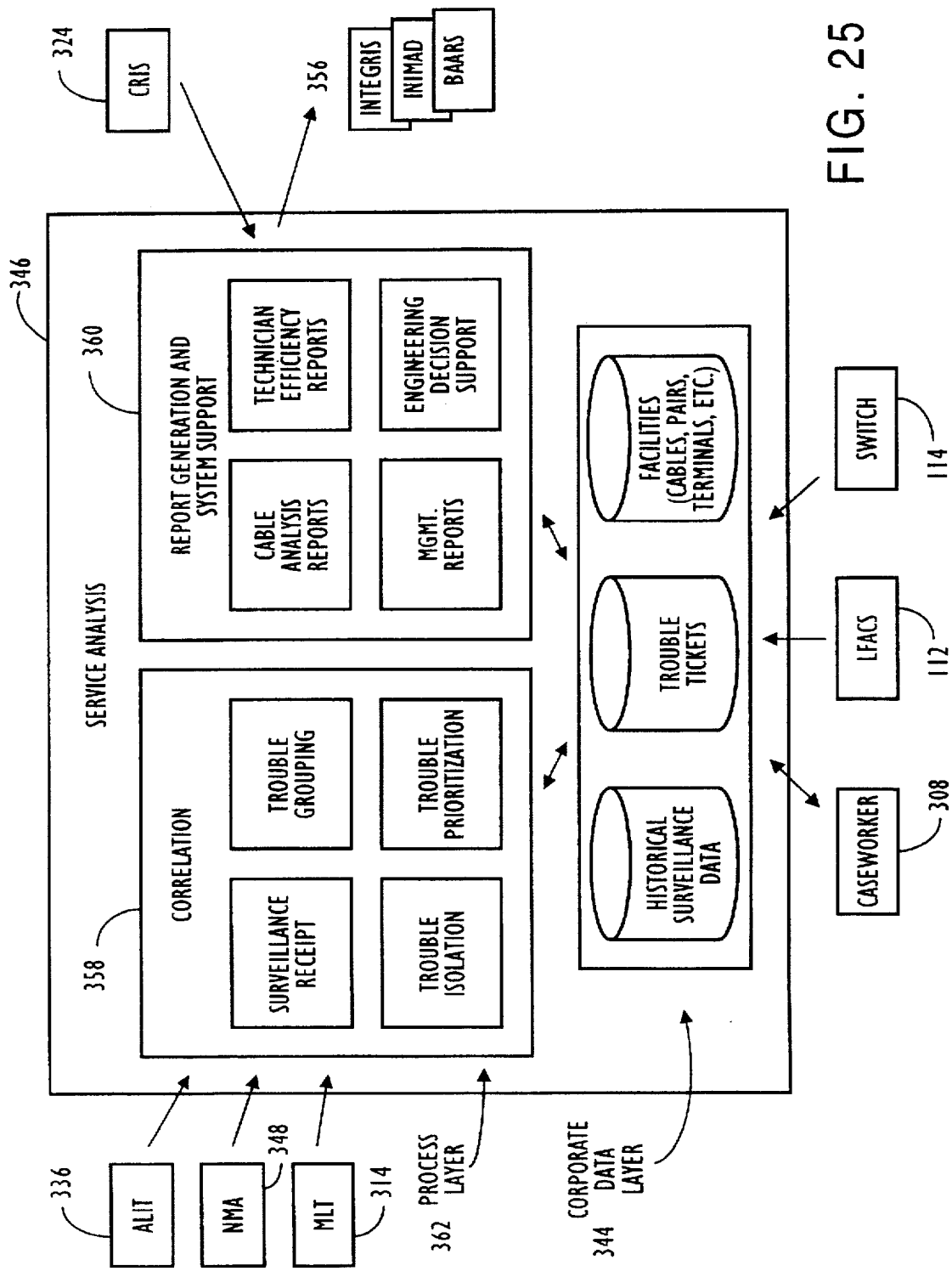
FIG. 25 is a block diagram of the service analysis architecture and functions in the proactive maintenance process.

FIG. 25 is a block diagram of the service analysis architecture and functions in the proactive maintenance process. In FIG. 25, Service Analysis system 346 is logically divided in correlation process 358, and report generating system support 360 in process layer 362. Service Analysis system 346 provides trouble status and resolution information to various report systems 356, including: Integrated Results Information System management system (INTEGRIS) that collects data, summarizes, and analyzes the data for corporate evaluation; Integrated Administration (INIMAD) that monitors service center performance compared to corporate objectives; and Bell Atlantic Automated Records System (BAARS) that mechanizes the process for outside plant engineering.

The primary functions of the correlation process 358, described in detail below, are the surveillance receipt, trouble grouping, trouble isolation, and trouble prioritization. Each of these functions are discussed below:

SURVEILLANCE AND TESTING

SURVEILLANCE PROCESS DESCRIPTION

Receive results of network surveillance processes

Filter erroneous and redundant surveillance results

Perform tests on troubled lines for fault verification and comprehensive electrical signature

SURVEILLANCE AND TEST PROCESSES

ALIT (Automatic Line Insulation Test)

Performs nightly tests on the maximum number of lines possible during the available time period, which are associated with each switch NMA (Network Monitoring and Analysis)

Continually monitors the status of Digital Loop Carriers (DLC)

PCT (Per Call Test)

Switch generated test of terminating line of each phone call

MLT (Mechanized Loop Test)/Teradyne 4TEL

Performs complete series of tests for comprehensive electrical signature.

CORRELATION—TROUBLE GROUPING

TROUBLE GROUPING PROCESS DESCRIPTION

Use technology to identify relationships among various network trouble instances.

Relate proactive and reactive faults together on an asynchronous basis to optimize technician dispatch.

GROUPED TROUBLE TYPES

Reactive troubles (customer calls)
New surveillance indications (ALIT,PCTF,NMA)
Historical surveillance indications

PRIMARY GROUPING CRITERIA

Facilities data relationships (including terminals, cables/pairs, etc.)
Trouble type and severity relationships

CORRELATION—TROUBLE ISOLATION

TROUBLE ISOLATION PROCESS DESCRIPTION

Use technology to determine the most optimum location for technician dispatch.
Process takes into account the most likely individual trouble locations and most cost-effective dispatch location.

DATA INPUTS FOR ISOLATION PROCESS

Common facilities among multiple troubles
Location and cause of recently closed trouble tickets
Defective pair information
Electrical test results
Historical surveillance information
Baseline test information for comparison with fault signature

CORRELATION—TROUBLE PRIORITIZATION

TROUBLE PRIORITIZATION PROCESS DESCRIPTION

Use AI Technology to determine the relative importance of various trouble groups.

DATA INPUTS FOR PRIORITIZATION PROCESS

Relative cost-effectiveness of dispatch based on potential number of troubles to be repaired
Severity of individual trouble and trouble group
Priority of customers affected by network fault
Number of spare pairs in defective cable.

Figure 20:
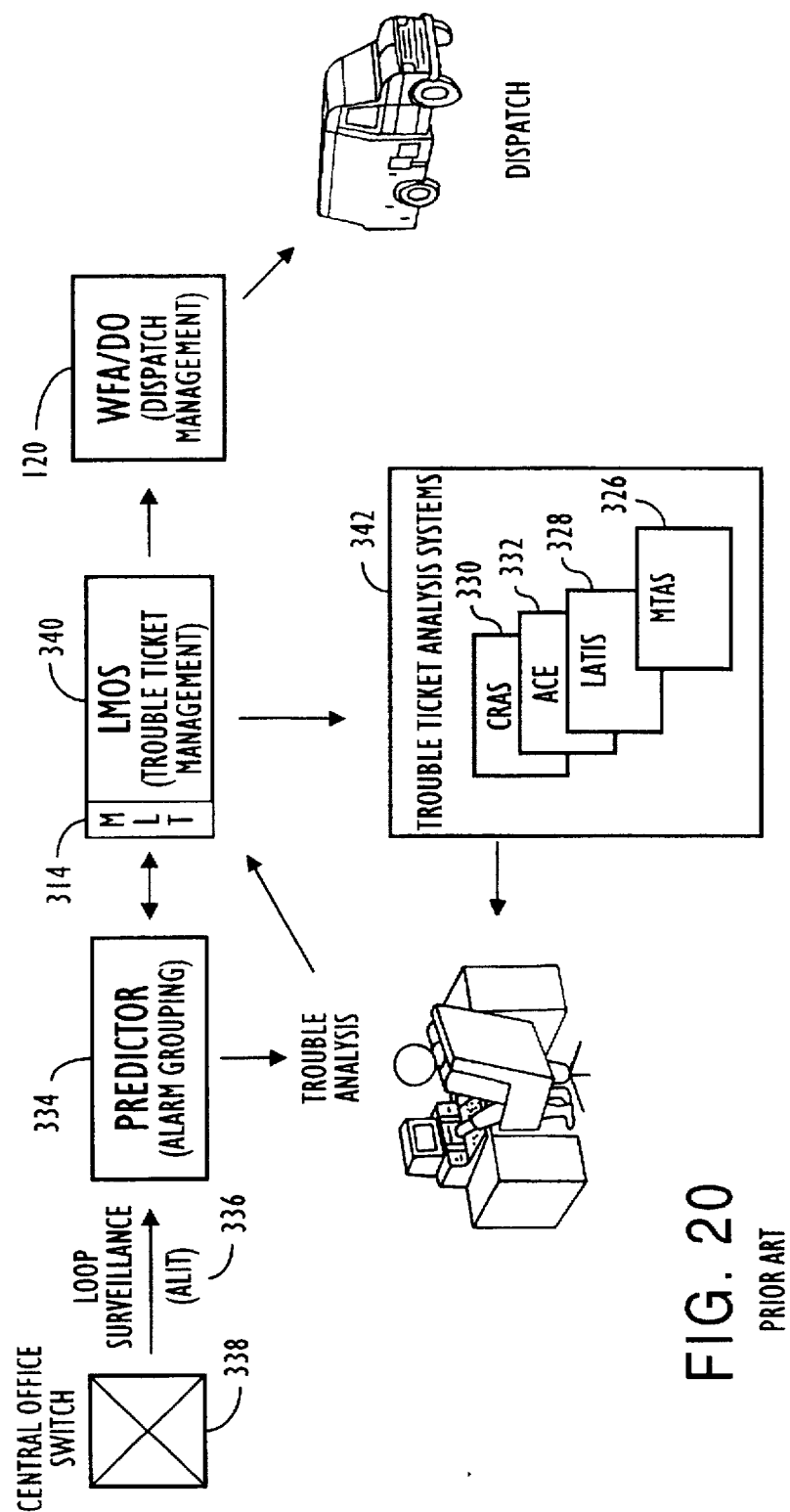
FIG. 20 illustrates a simplified block diagram of the current process for proactively repairing and/or maintaining network facilities illustrated in FIG. 19.
Figure 26A:
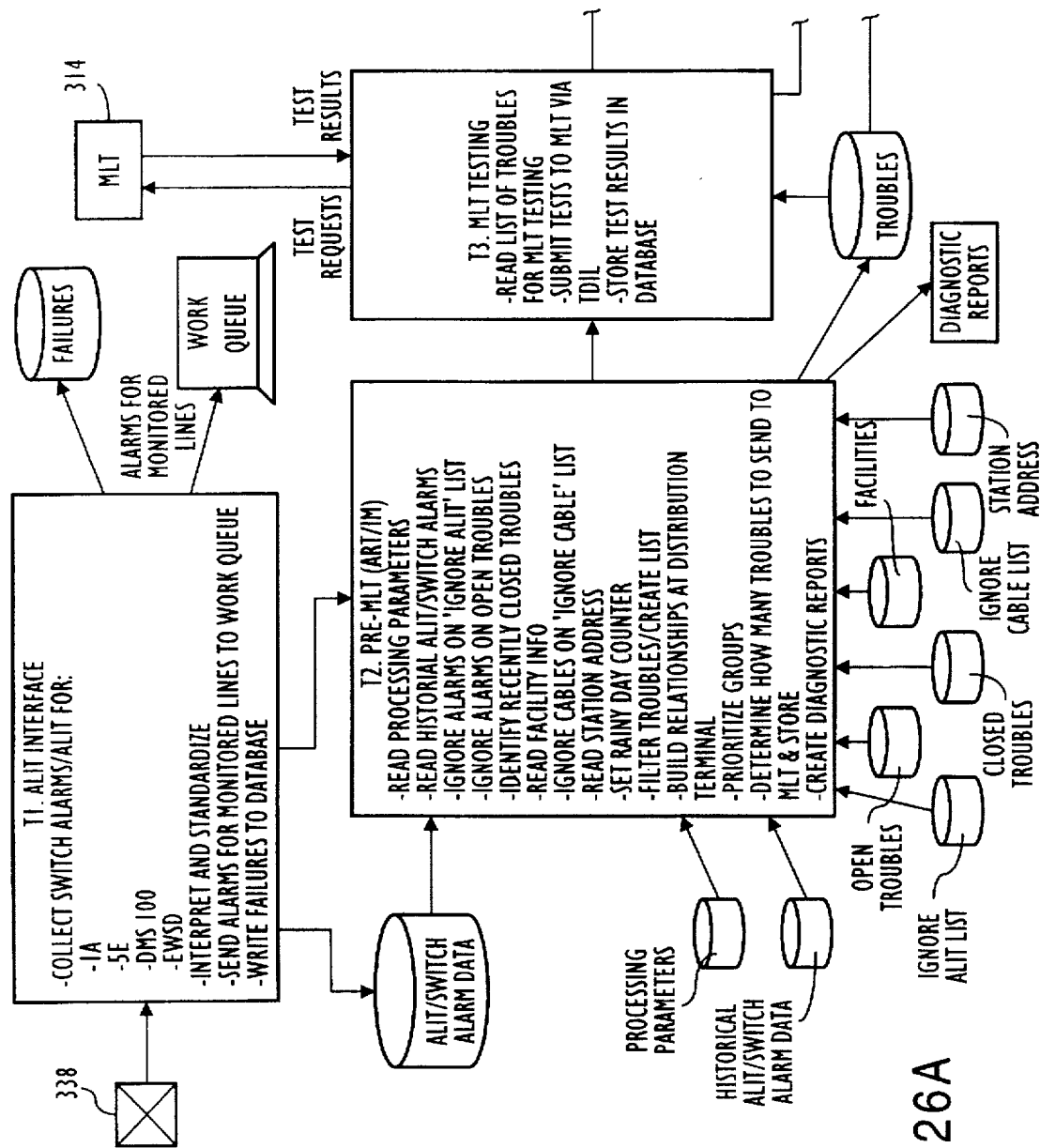
Figure 26B:
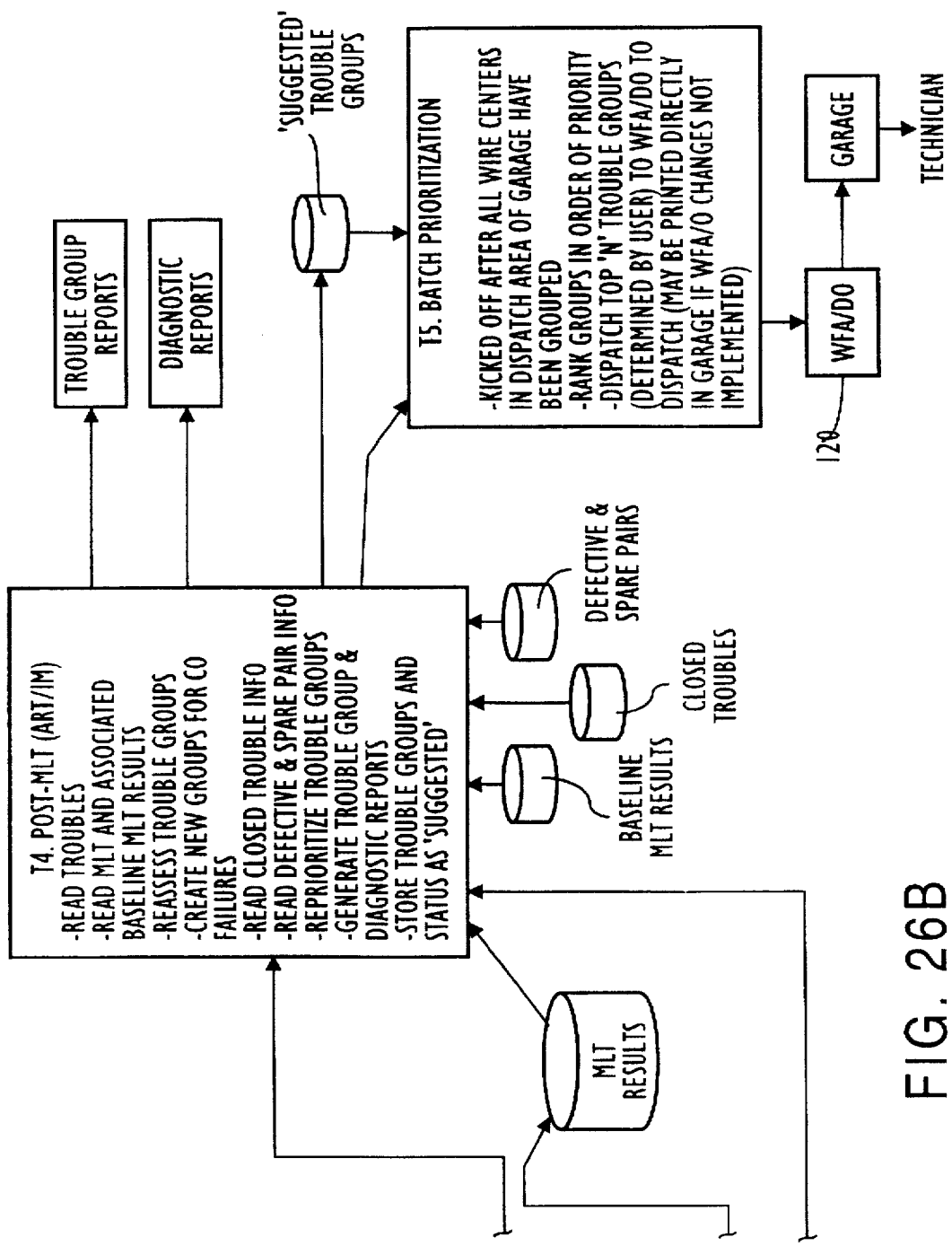

FIGS. 26A and 26B are functional block diagrams of the service analysis architecture and functions in the proactive maintenance process. As discussed in connection with FIG. 20, the prior art correlation of switch surveillance data is performed by the PREDICTOR system 344. PREDICTOR's primary objective is to identify common-cause cable troubles. It groups together all trouble indications for a specific cable identity which occur within a user-defined number of pairs for a single dispatch. While dispatching on common-cause troubles is a useful objective, we have discovered that it falls short of the ultimate goal of dispatch optimization as discussed previously.

Service Analysis system more effectively optimizes technician dispatches for three primary reasons. First, the system's objective is to group troubles by geographic area rather than cable pair range. Grouping troubles in this way increases the number of pairs that can be cleared per dispatch. While the troubles may or may not be related by cause, the reduction in "windshield" time will reduce the average repair time per trouble. Second, Service Analysis uses historical switch surveillance information in order to provide the technicians with a complete picture of the maintenance status of the geographic area he or she will be working in. In the current environment, only a single evening's surveillance information is used to determine what troubles need to be repaired. The third primary benefit of Service Analysis is the grouping of proactive and reactive troubles. Currently, proactive troubles and reactive troubles are worked without regard to one another. This is not sensible because the two troubles may very well be in the same geographic area or may even be related by cause.

The implementation of Service Analysis will not significantly affect trouble report rates without complementary changes in the trouble repair procedures. Service Analysis does not simply replace an aging system. Rather, the Service Analysis design changes the way that technicians perform their jobs by implementing processes heretofore not performed, and unable to have been performed. Instead of simply responding to customer-affecting troubles (both proactive and reactive), Service Analysis will make the technicians aware of the status of the environment where they will be working (with data such as new trouble indications, recent repair work, and defective pairs). With this information, they will have the ability to increase their productivity. The more a technician knows about the plant, the more efficient he will be.

The following description is a decomposition of the correlation process. The text follows the sequence of events illustrated in the process flow displayed in FIGS. 26A and 26B.

Step T1—ALIT Interface Process

The first step in the Service Analysis (SA) process is the completion and collection of data from the Automatic Line Insulation Test (ALIT). The ALIT feature within a Central Office (CO) switch tests for any line insulation failures which show up as leakage resistances and/or dc voltages. ALIT is scheduled to automatically start and stop at specific times and for specific days. Specified days are determined by CO switch type. The ALIT schedule is dependent upon the needs of each individual work center and can be changed through communications with the local Network Operations Center (NOC) for a specific CO. When a failure is detected, an output message is sent. Depending upon the switch vendor (AT&T, SIEMENS, Northern Telecom, etc.) the ALIT test proceeds sequentially through all the Office Equipment (OE) or telephone number (TN) lines. The testing cycle will continue until either all possible lines have been tested or the scheduled time is complete. If the testing did not complete through the entire office then ALIT will start the next night where it left off.

The testing styles by switch type include:

1AESS—by TN or by OE (depend on local ALIT setup)
5ESS—by OE
DMS100—by OE
SIEMENS—by OE The SA–ALIT interface process will receive the failure type and level of severity messages from ALIT for each individual switch. In addition to ALIT testing, this interface also receives switch alarms or per call test failures. Since SA must interpret and deal with the output of all switch types listed above, the interface process will standardize the different "failure messages" or trouble indications it receives from each switch type. FIGS. 27–28 are tables that describe the ALIT indications, and switch alarm indications sent to the service analysis system standardized per switch type, respectively.

The ALIT interface process writes information about each ALIT failure for the particular ALIT test cycle to the corporate database. The interface process checks the monitoring table in the data base for each line failure it receives. Lines are put on the monitor table by individual work groups when they want to be notified as soon as any activity (switch alarm or ALIT failure) happens on that line. If a line appears on the monitoring table, the interface process immediately sends a message to the work group queue indicated on the monitoring table and the ALIT information for this line is not written to the database.

Step T2—Pre-MLT—Overview

The Service Analysis process runs under the ART/IM standard artificial intelligence system, a product of Inference Corporation. It is not like a normal process which is thought of as running in a sequential manner. SA is driven by a set of rules. When there is enough information to process a given rule, the rule is immediately fired and results evaluated.

Pre-MLT—Data Contracts

Once ALIT is completed for a given wire center (all ALIT scheduled testing must be complete if the wire center has multiple switches), SA determines if the individual server has enough memory and resources to begin another SA process. This determination must be done due to the wire center data distribution. Each server covers data for multiple, preassigned wire centers, and due to the processing requirements of SA, only a certain number of wire center SA processes (based on wire center size) can realistically run on one server at a time. If too many SA processes run at once, the server could experience both database contention and process swapping problems and may not be able to complete any wire center processing.

Retrieve Processing Parameters

Figure 1:
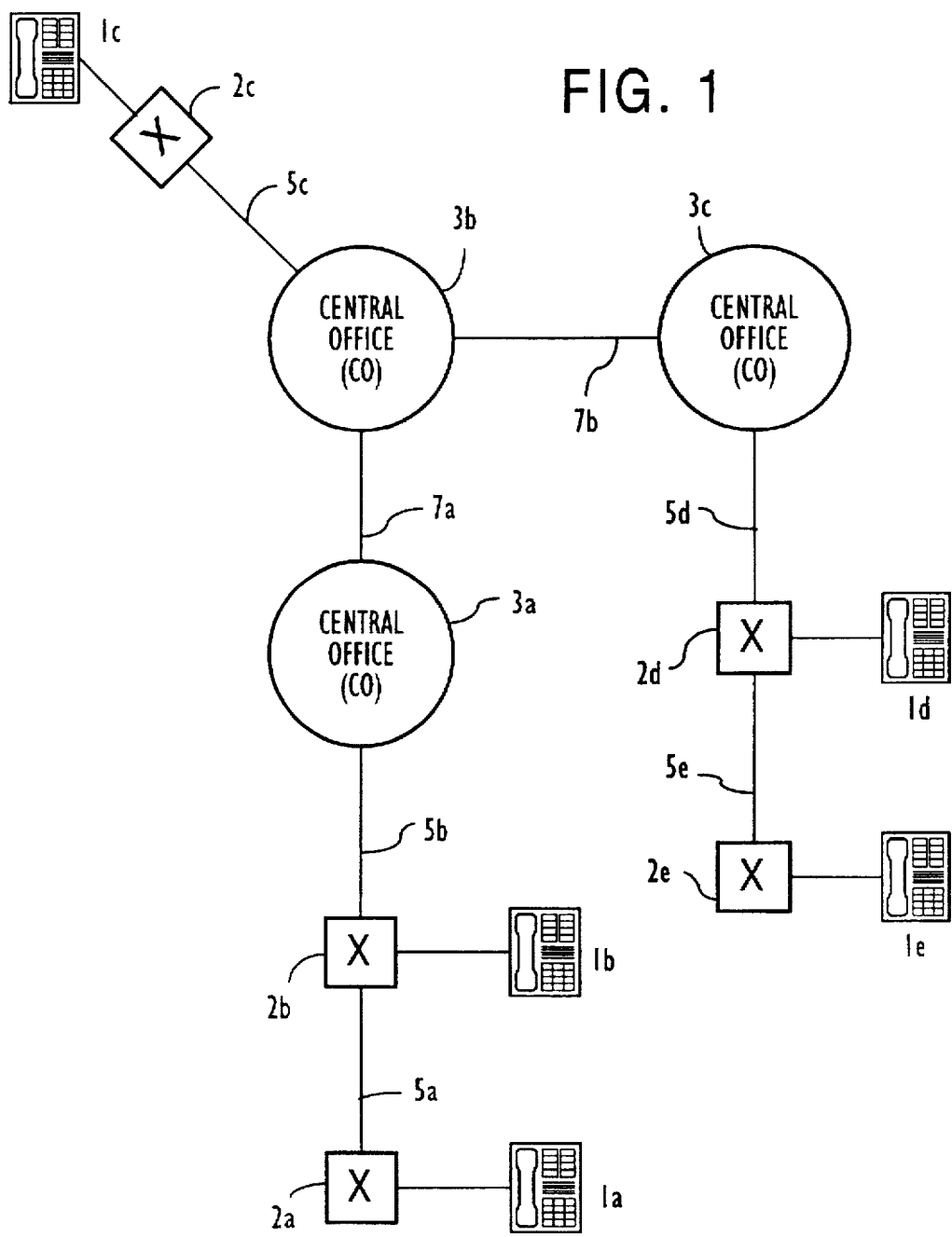
FIG. 1 is diagram illustrating the basic structure or arrangement of the customer and telephone company facilities for providing telephone service or connection between a telephone caller and a telephone receiver destination.
Figure 2:
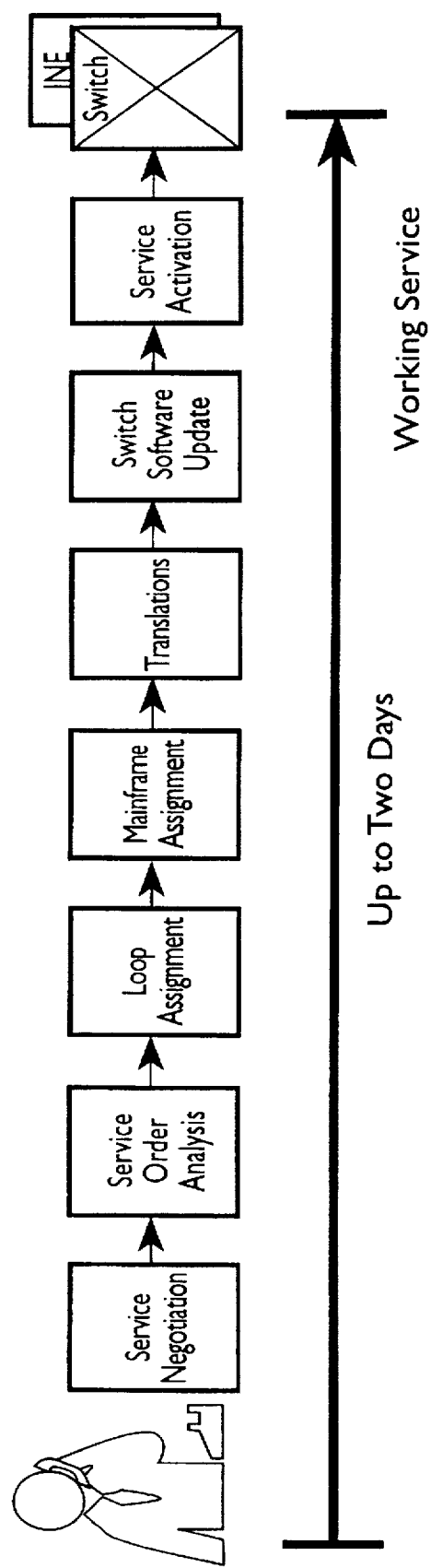
FIG. 2 is a simplified block diagram showing current (prior art) Public Switched Telephone Network (PSTN) provisioning.
Figure 3:
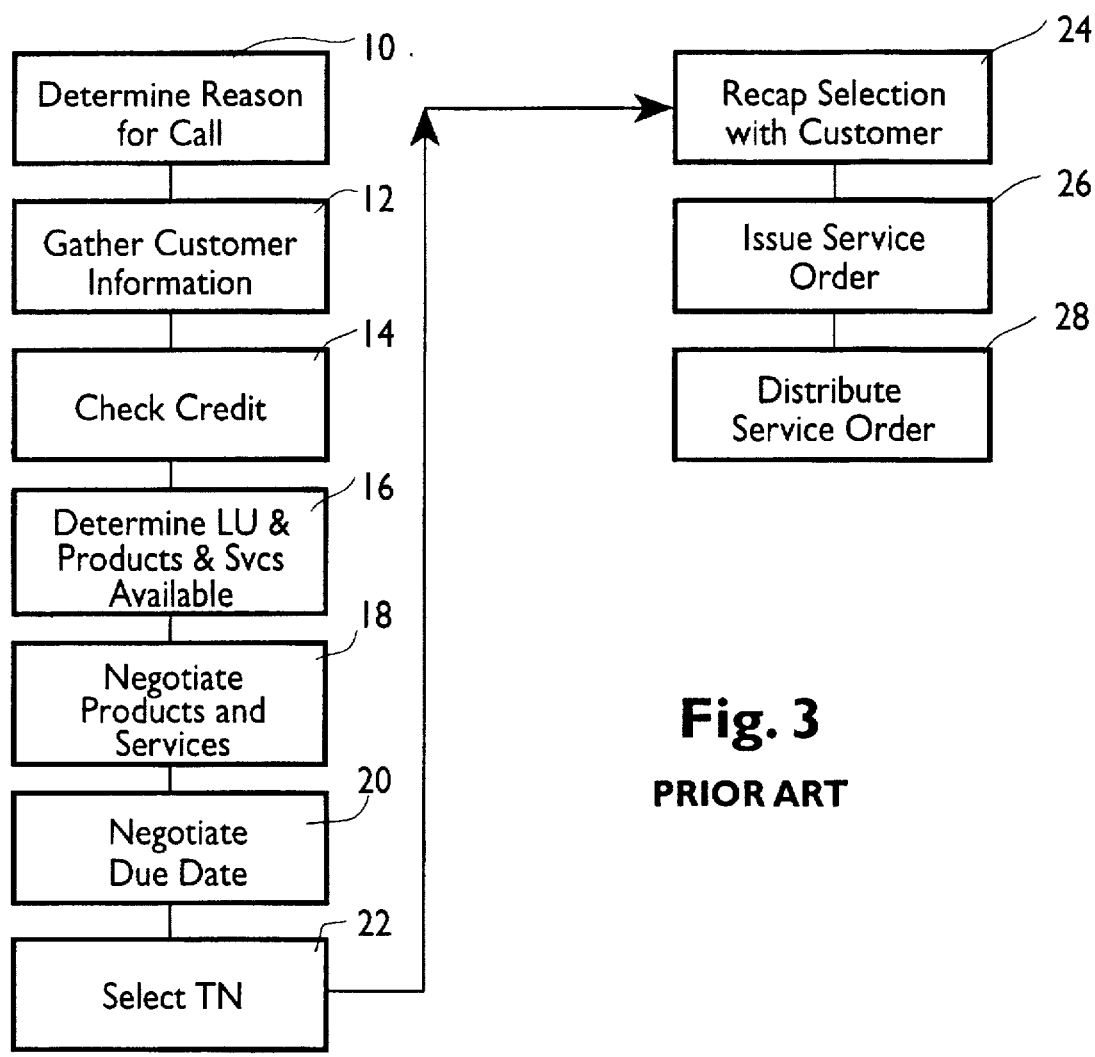
FIGS. 3, 4 and 5 are flow-charts illustrating current (prior art) service activation flow.
Figure 4:
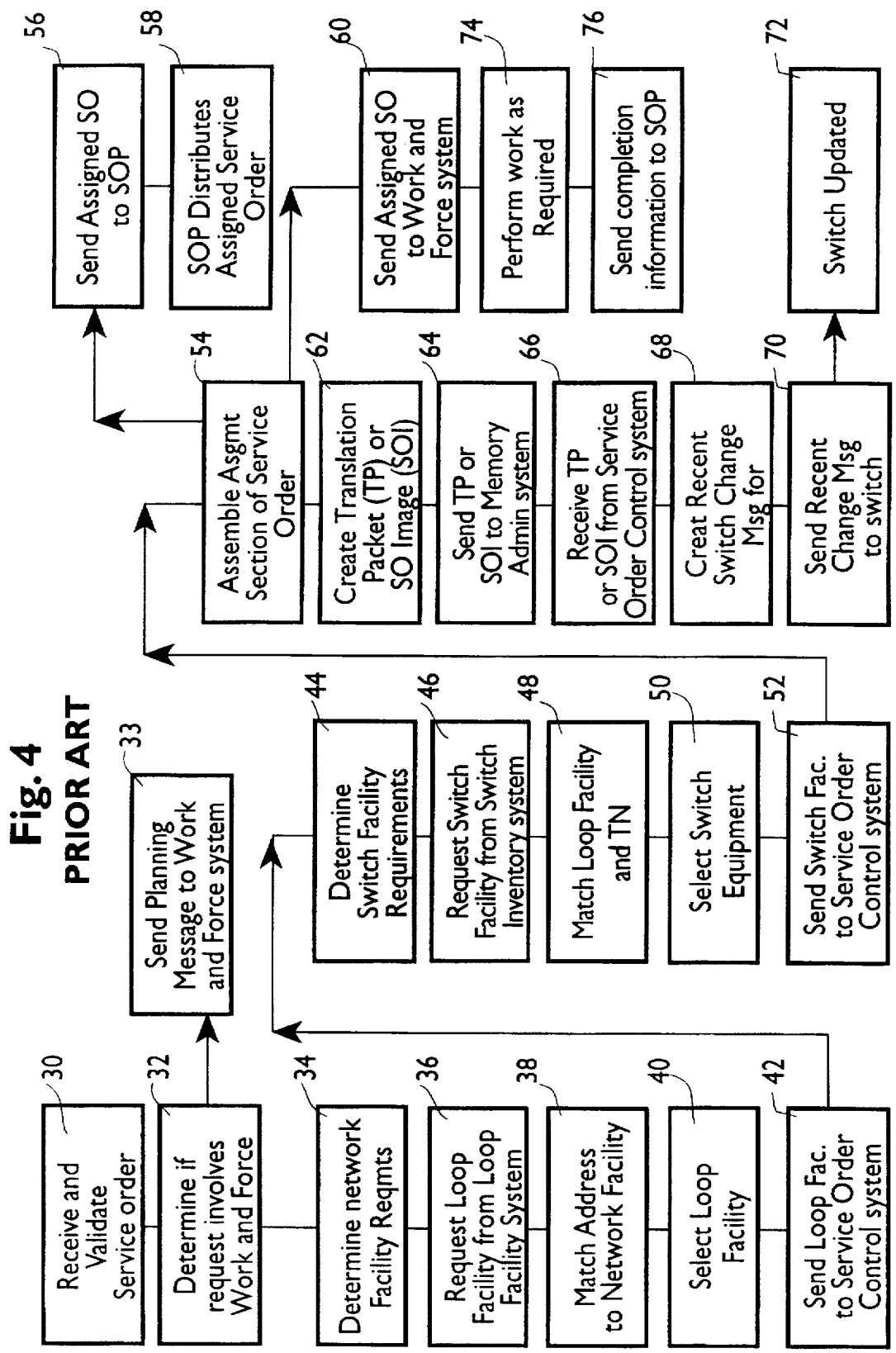
Figure 5:
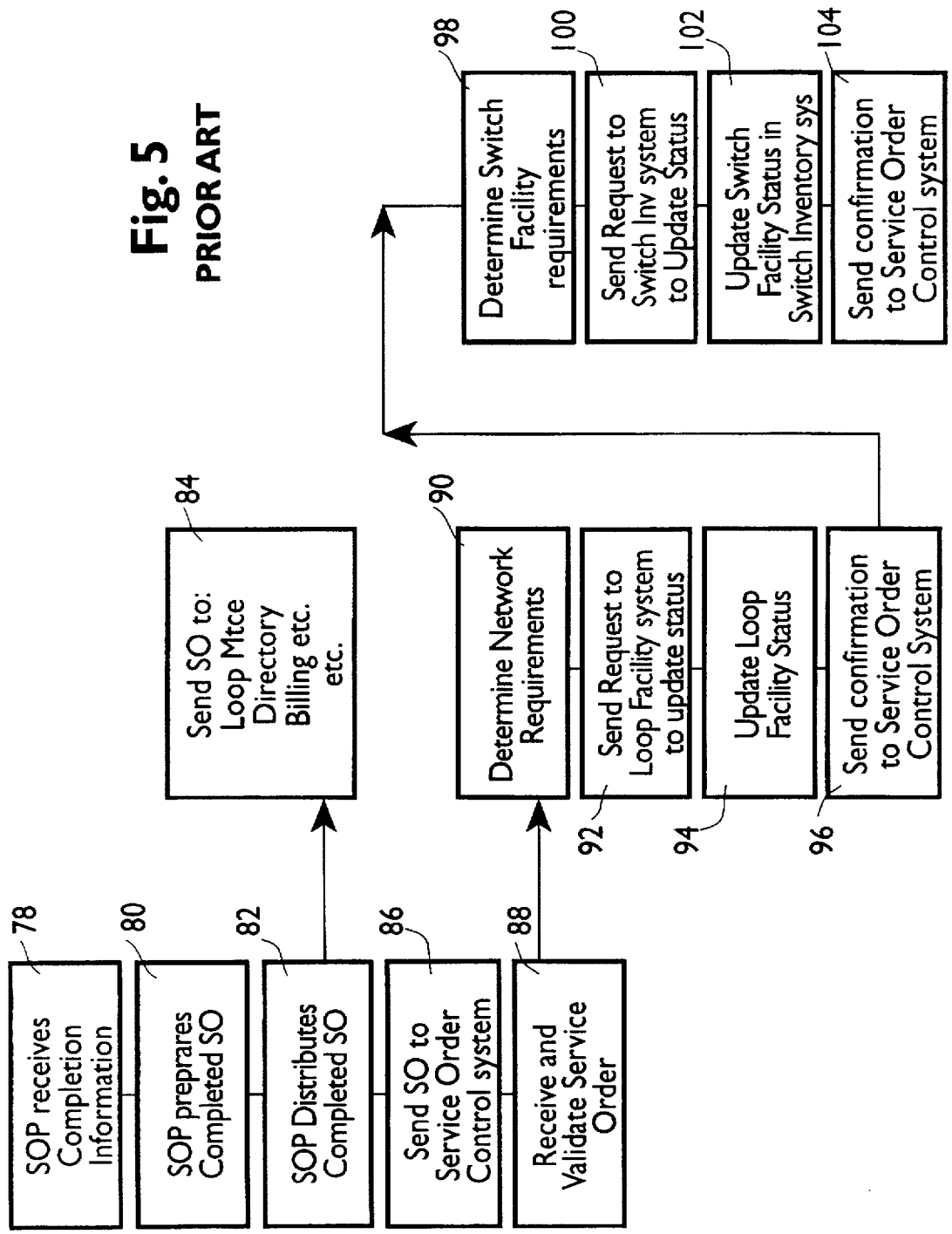
Figure 6:
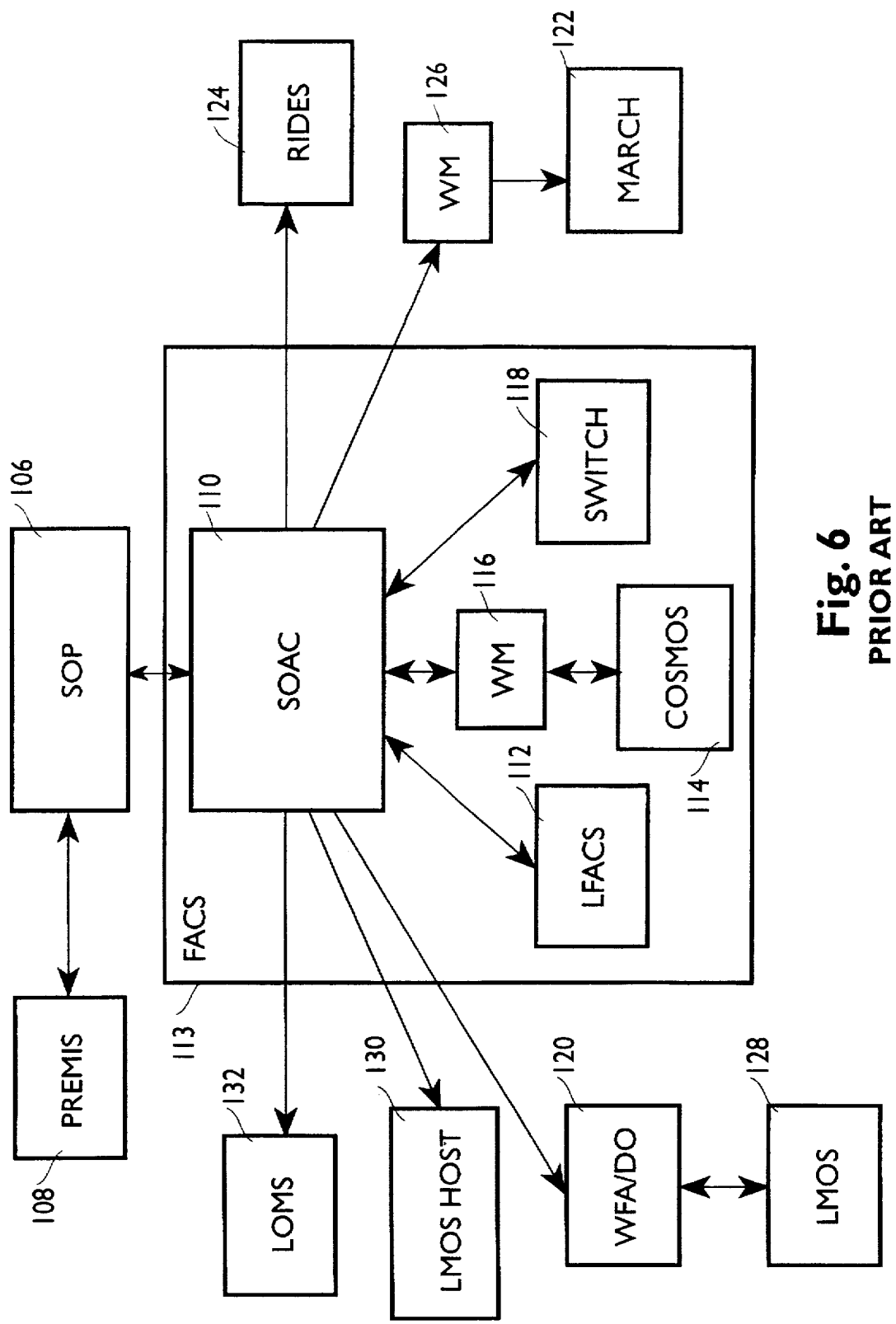
FIG. 6 is a block diagram illustrating the architecture of the current (prior art) PSTN administration system.
Figure 9:
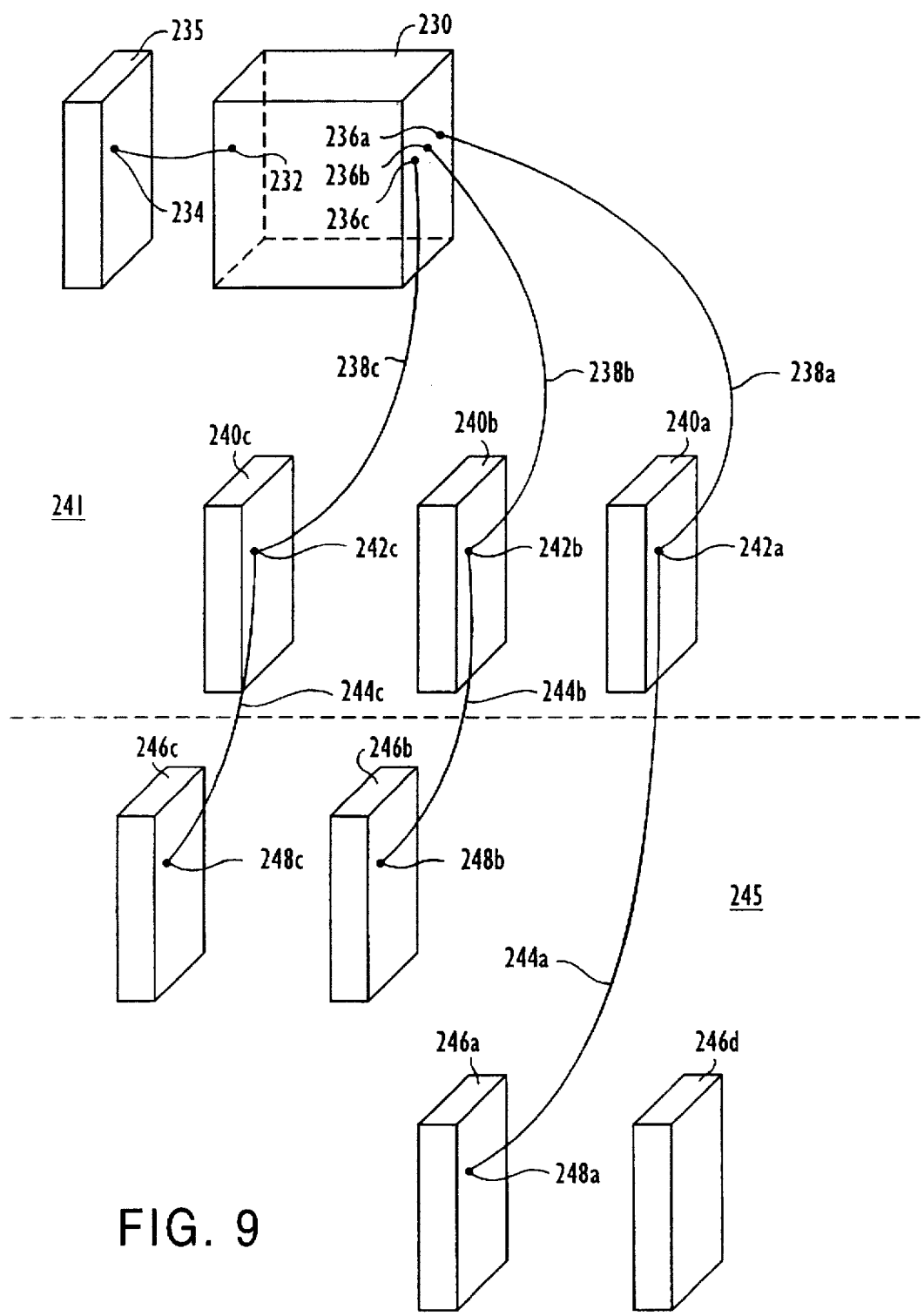
FIG. 9 is a detailed diagram of office equipment facilities for a first combination of customer locations.
Figure 10:
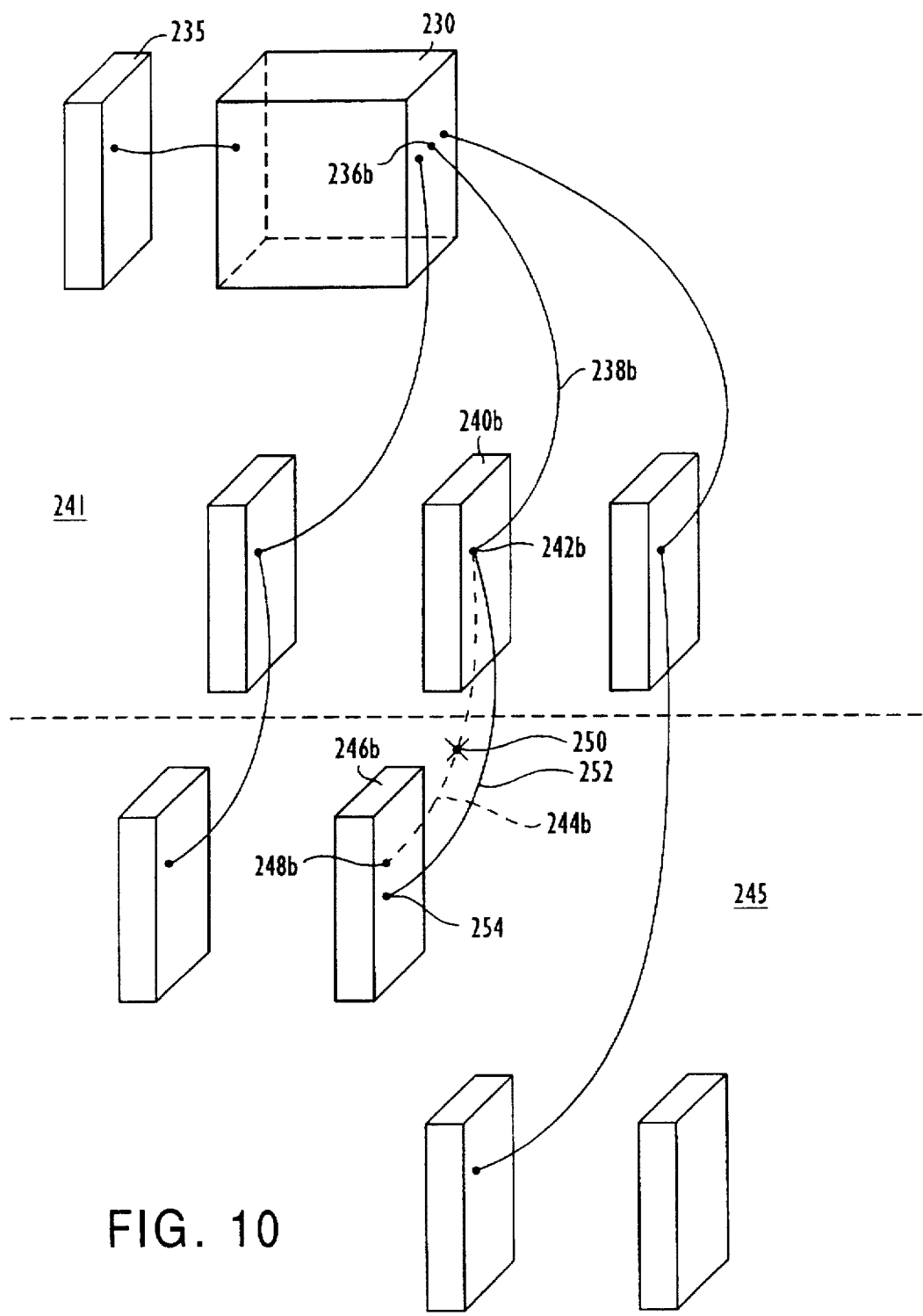
FIG. 10 is a detailed diagram of office equipment facilities for a second combination of customer locations which has altered the first combination of customer locations.
Figure 11:
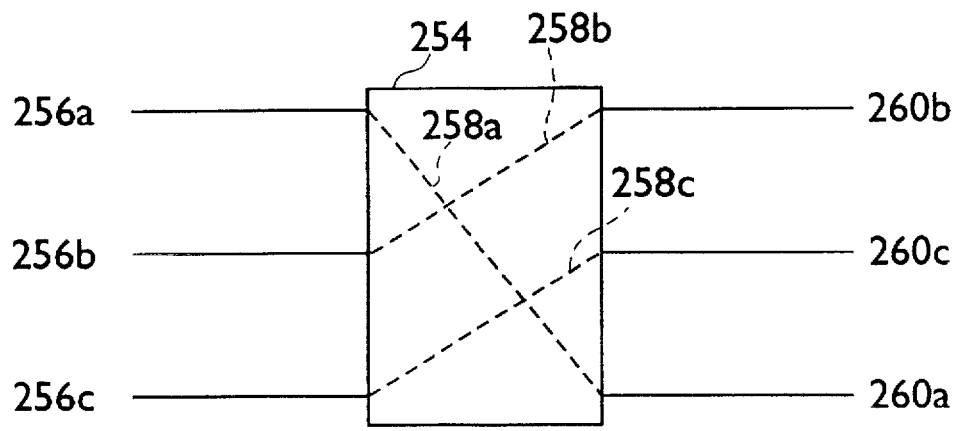
FIG. 11 is a detailed diagram of office equipment facilities for a first combination of customer locations illustrating inefficient use of jumper cables.
Figure 12:
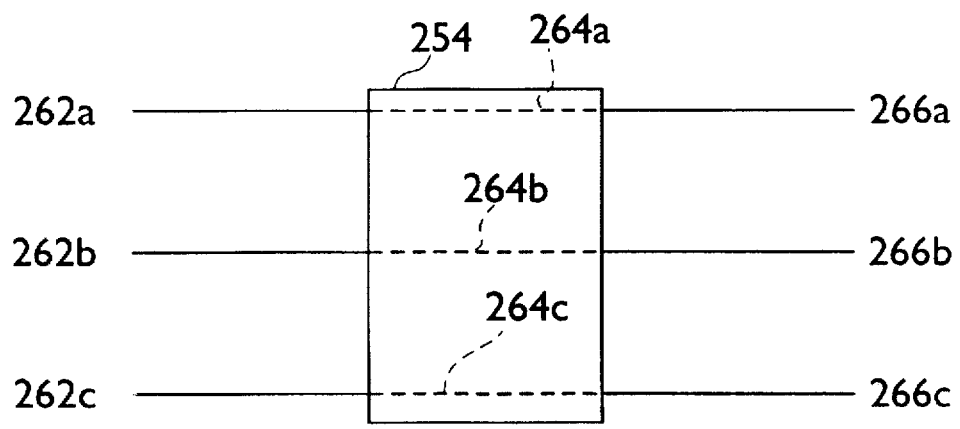
FIG. 12 is a detailed diagram of office equipment facilities for a first combination of customer locations illustrating efficient use of jumper cables by altering existing central office facilities.
Figure 13:
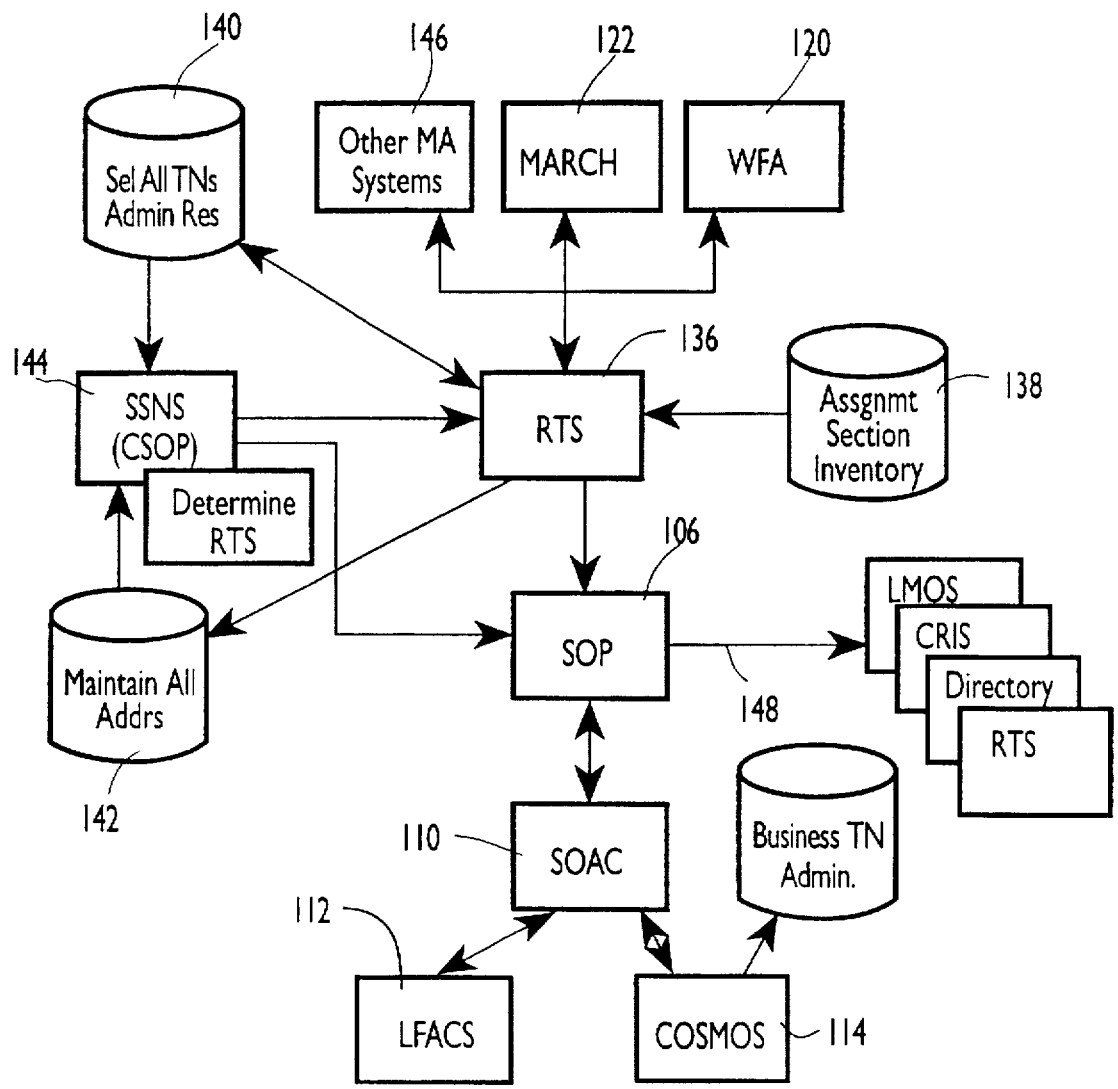
FIG. 13 is a block diagram illustrating the architecture of a related system for administration of a PSTN.
Figure 14:
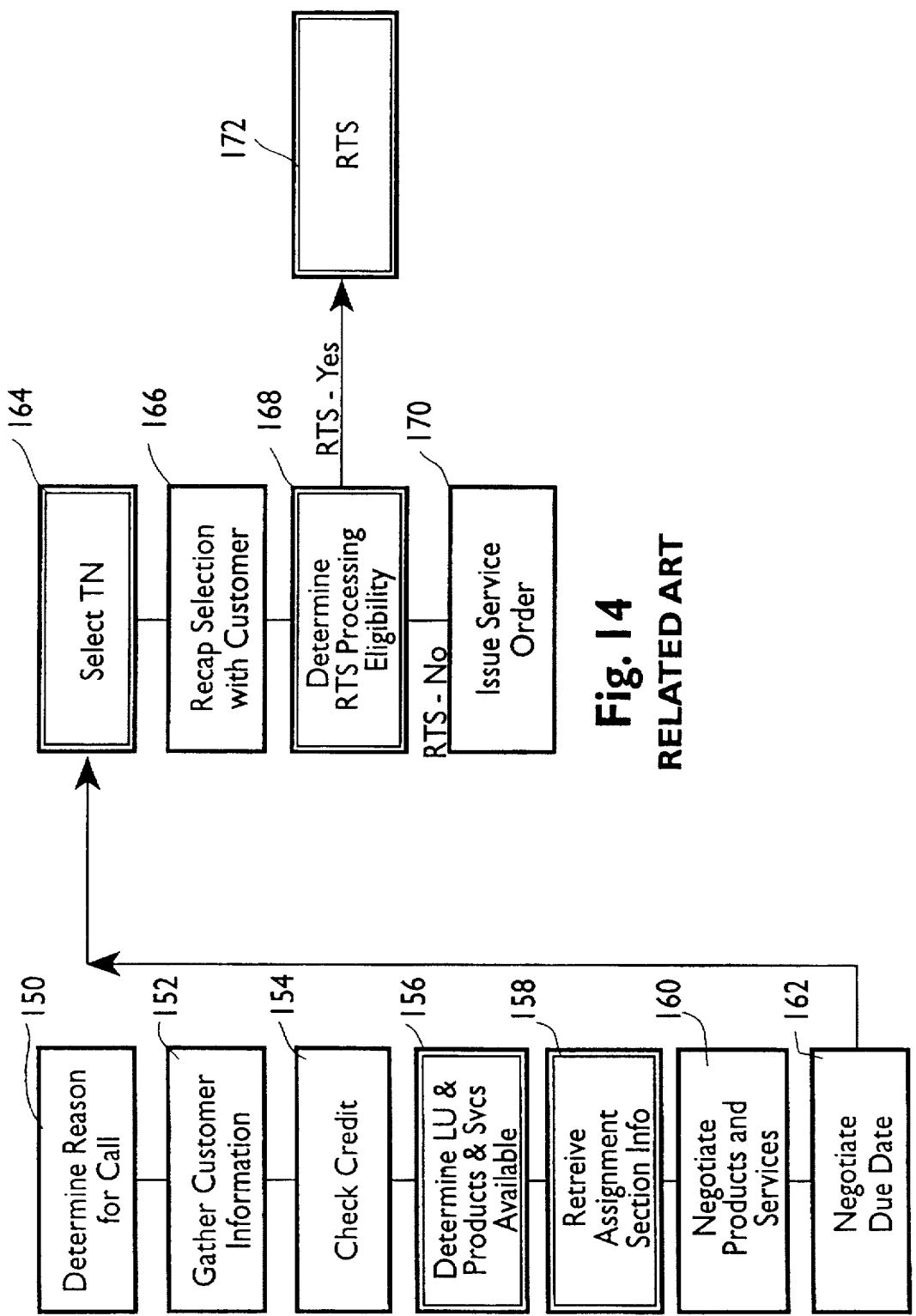
FIGS. 14 and 15 are flow-charts illustrating the methodology of the system illustrated in FIG. 13 in performing service activation.
Figure 15:
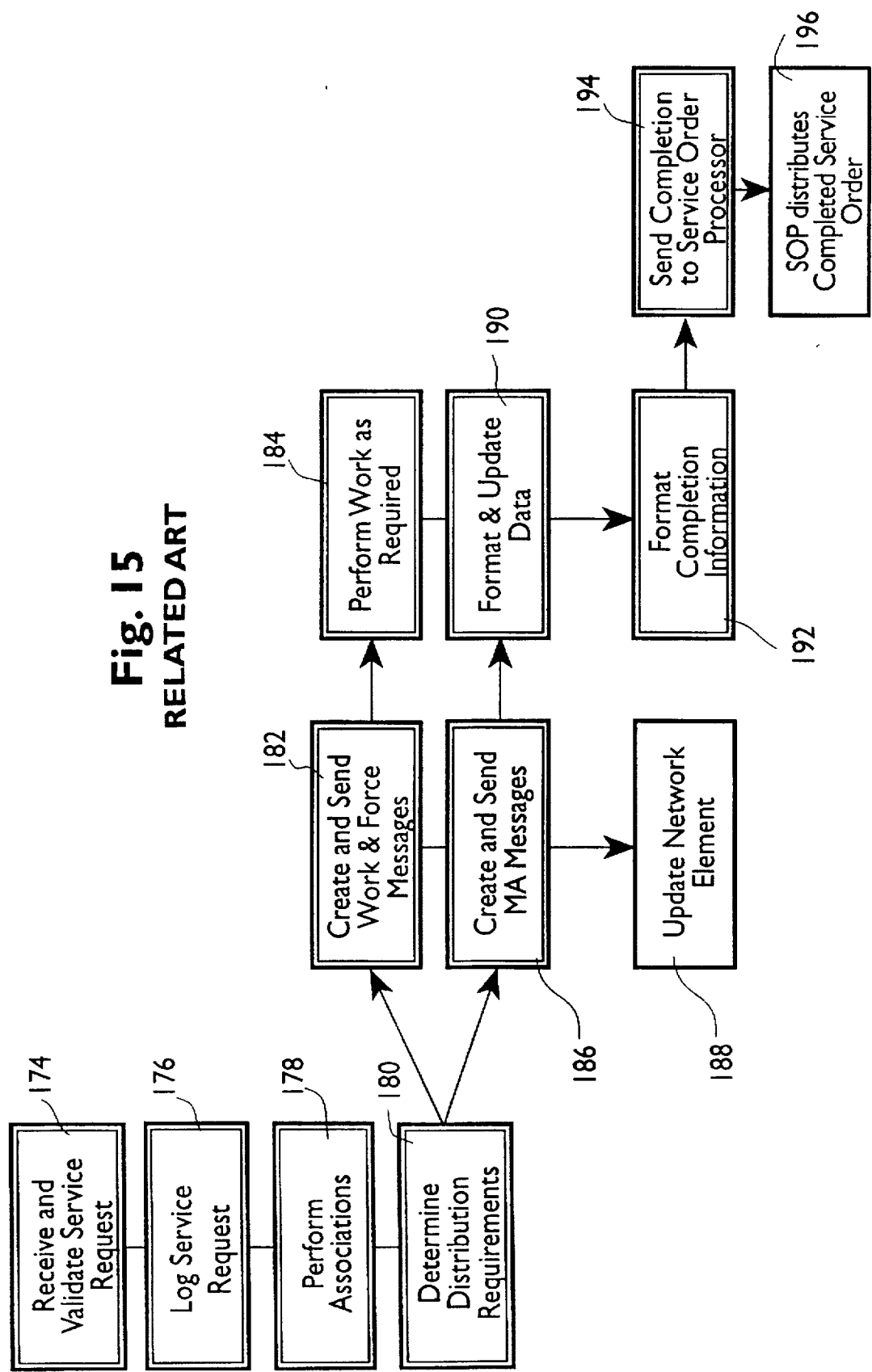
Figure 16:
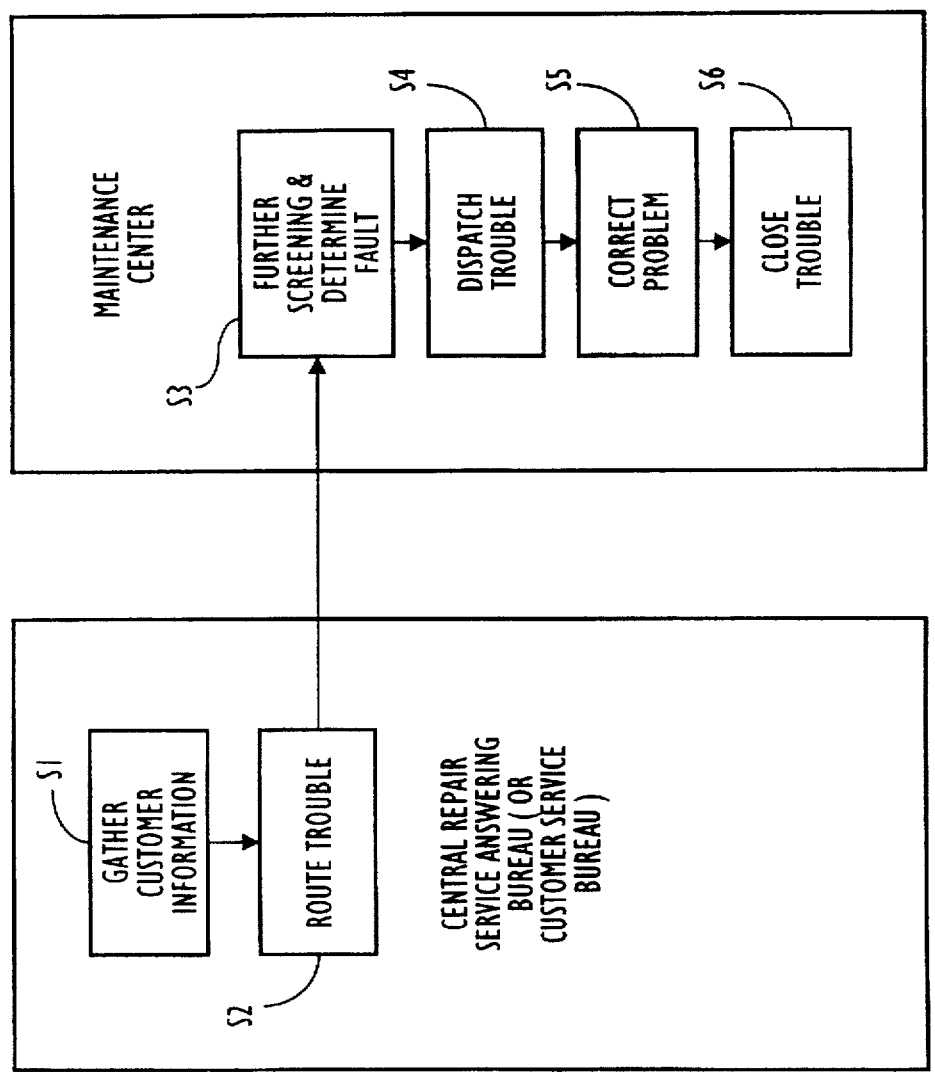
FIGS. 16–17 illustrate the systems and processes involved in the prior art reactive maintenance flow.
Figure 17:
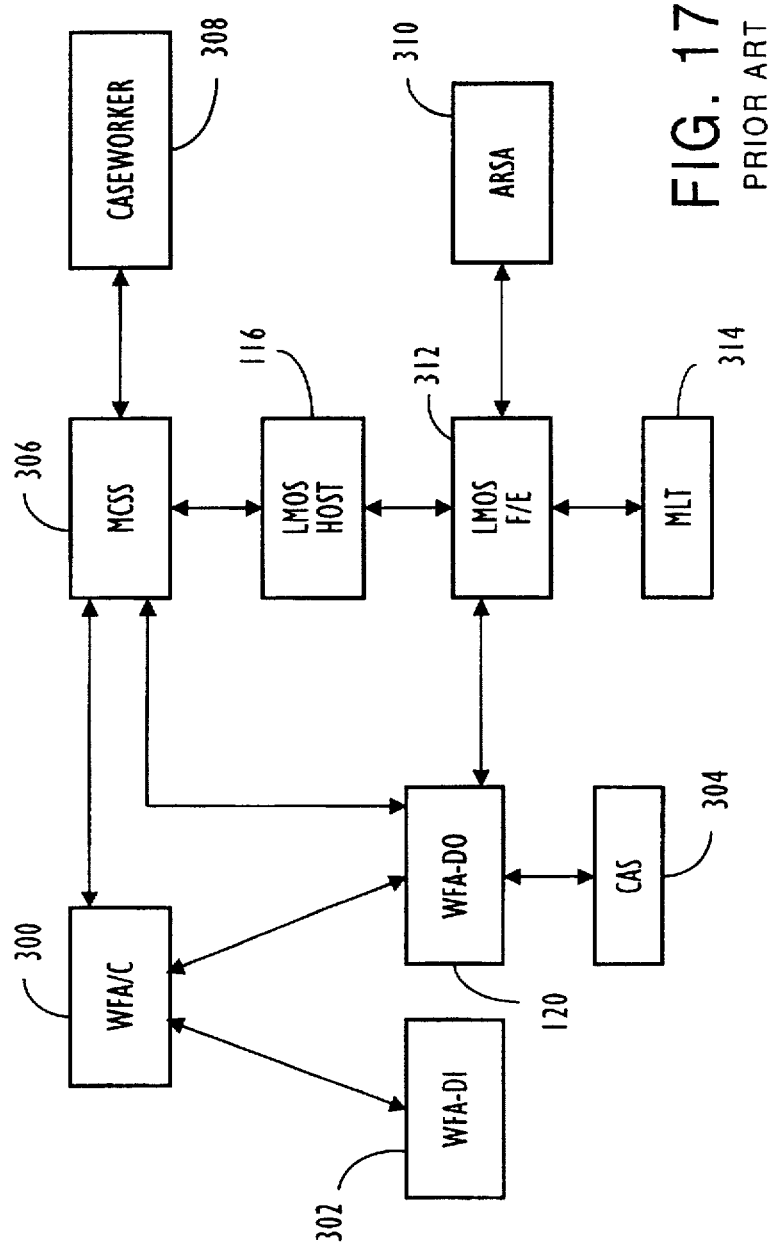
Figure 18:
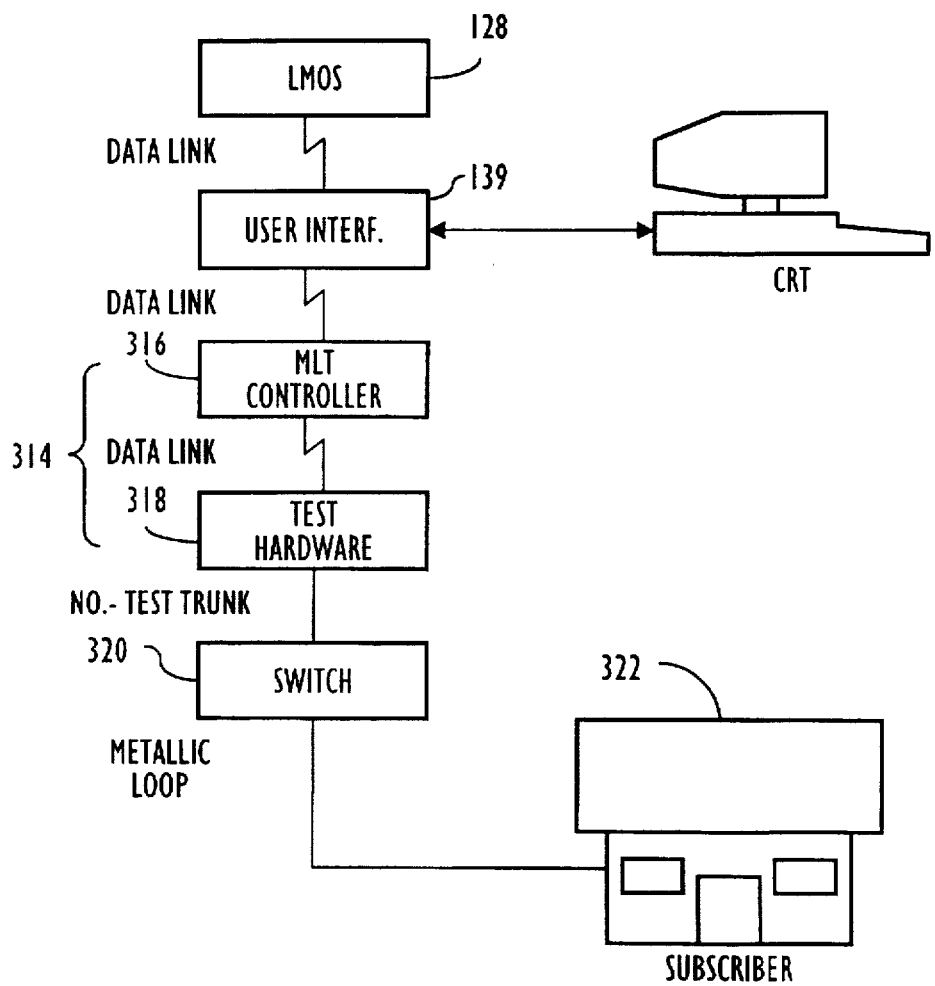
FIG. 18 is a block diagram illustrating the architecture of a standard mechanized loop test (MLT) system.
Figure 19:
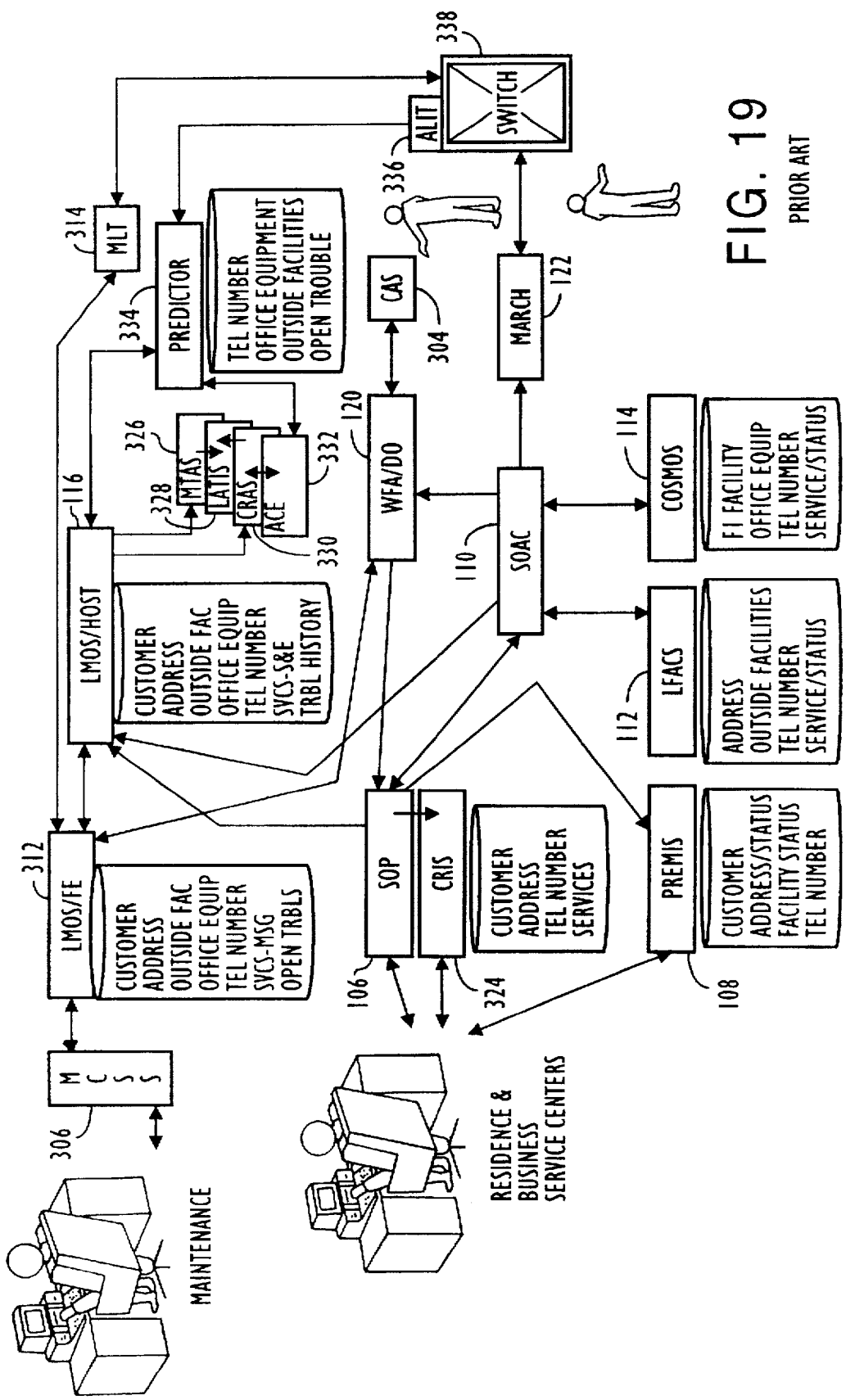
FIG. 19 illustrates one current process for proactively repairing and/or maintaining network facilities.

SA is triggered for each CO after the nightly ALIT run has completed. The first task to be performed by the system is a call to the database contract which retrieves all processing parameters. These user-defined parameters affect the system's functions. The processing parameters are listed in FIGS. 29–14 with their level of maintenance, suggested range and default value. The level of maintenance indicates who has the responsibility and permission to modify each parameter. The level of maintenance is either local or a Regional System Administrator. Parameters that must be set at a local level to maximize correlation benefits are modifiable at this level. Parameters that affect the overall process are modifiable at the regional level. The suggested range of values indicates those values which will not adversely affect the performance of the correlation process.

Retrieve ALIT Results and Switch Alarms

After obtaining processing parameters, Service Analysis requests the retrieval of ALIT test results and associated data using the data contract. This data contract retrieves all ALIT results, new switch alarms, and historical surveillance ALIT results (the number of days of historical surveillance ALIT results is a user-defined parameter) for the time period since the end of the previous cycle.

Given the TN and/or OE from the ALIT result, the data contract then filters the working lines. Filtering eliminates some ALIT results from further SA correlation processing. The following are filtering rules which are invoked prior to sending to ART/IM:

The working line appears on the ignore ALIT table, either by unique TN or within a cable pair range.

The contract will determine if any of the new ALITs had been previously identified as troubles which should be ignored (based on data in the ignore ALIT table). Users want ALITs to be ignored in situations where troubles continue to be identified on lines where the indication is not valid or where faults have previously been identified but not yet repaired. For example, if a construction crew is going to be working on a segment of cable, alarms that will continue to be generated in the interim before repair is complete, should not be acted on. Therefore, the cable pairs are specially marked for this purpose.

The working line has an open trouble ticket

The contract will determine if the current ALIT failure has occurred on a line in which the customer has reported a trouble and the trouble is not yet closed. These lines will be eliminated from further SA processing.

The working line has a remark indicating a trouble inside the house has been found previously, but was not fixed.

The contract will determine if the current ALIT failure has occurred on a line which has a remark indicating a trouble has been located in the customer home and has not been fixed. A customer may know about the trouble, but not wish to pay for it to be fixed. Technicians will record this information and the SA correlation process will eliminate these lines from further evaluation.

When the criteria for ignore ALIT is met in any of these scenarios above or other scenarios, the line is not sent for correlation analysis.

Retrieve Detailed Circuit Information

For each working line remaining in the process after initial filtering, the data contract retrieves detailed circuit information. This data includes:

cable and pairs for each segment of the working line central office side and field side terminations for each segment—for example, the F1 has an OE and an F1 terminal binding post or color code, F2 has an F1 terminal binding post or color code and F2 terminal binding post or color code, etc.

all terminal identities that the cable pair passes through or terminates on, including bridged taps of the pair service address identifier service code/LOB circuit status priority service additional circuit identifiers (such as multi-line hunt group terminal number)

Troubles will be ignored if they are part of a known cable problem. Often, cable troubles are identified but not fixed because digging is required to resolve the problem, and the benefits of digging do not justify the costs. Troubles within the pair range identified by the technician will be ignored by the correlation process.

Retrieve General Facility Detail

After this initial data retrieval, Service Analysis requests more generic data information. Given the cables involved with all unfiltered ALIT indications, Service Analysis requests cable information.

the cable low pair, and cable high pair

The correlation process must know the valid range for each cable in order to determine its grouping priority.

Also, the defective pair information (i.e., date and failure type) and spare pair count for each cable pair range will be obtained for use in the trouble grouping and prioritization processes, respectively.

Service Analysis also requests information about terminals. For each terminal retrieved, the following information is correlated therewith:
- in-count and low binding post
- out-count and low binding post The in-count is the list of different cable pair ranges which terminate in that terminal. The out-count is the cable pair range which leave that terminal. With each count range, the low binding post is also retrieved. The correlation process must know all cables coming into and out of a terminal in order to group trouble indications based on terminals and binding post proximity.

Service Analysis requests information about the service addresses involved with each working circuit. For each address identifier retrieved, the following information will be correlated therewith:
- house number,
- number suffix and prefix,
- street name,
- street suffix and prefix,
- postal code,
- structure,
- elevation and unit (i.e., floor, suite, etc.)

Correlation must know the exact address in order to eliminate or ignore working circuits when troubles occur on more than one line terminating at the same location.

Service Analysis functions differently than other services which call data contracts. Upon completion of each data contract, a service is used to insert the data into the Artificial Intelligence (AI) environment. Schemas (objects) are then built with this data. These schemas are then used in the Service Analysis correlation process.

Pre-MLT—Correlation Processing
Loop Characteristic Filtering

Once the information is in the memory (as objects), the filtering process removes erroneous trouble indications from the correlation process. There are many lines which ALIT identifies as troubled, but which are actually functioning perfectly. These lines contain special conditions which alter the electrical reading of the phone line so that ALIT believes that the line is in trouble. The system filters these lines based on data retrieved in the data contracts and on the processing parameters, excluding them from further processing and generates a report which indicates which of these lines should be added to the Prevent ALIT (PLIT) list at the switch. The filtering includes:

Universal and Integrated Pair Gain systems indicates false trouble on a line. Service Analysis will eliminate lines which have been identified as being served with Universal and Integrated Pair Gain systems.

Video on Demand service indicates false trouble on a line. Service Analysis will eliminate lines which have been identified as having VOD service.

Troubles at the same residence occurring on two different pairs usually indicate false troubles. These ALIT test indications upon further investigation, usually reveal that the cause of the trouble is within the customer's living unit.

Foreign Exchange Service will indicate false trouble on a line. Service Analysis will eliminate lines which have been identified as Interoffice FX (foreign exchange) service.

PBX—Ground Start Equipment indicate false trouble on a line. Service Analysis will eliminate lines which have been identified as having ground start equipment for PBX service.

Coin Lines indicate a false trouble on a line. Service Analysis will eliminate coin lines.

Build Circuit Picture and Grouping

Once it is known which pairs have valid troubles, the system generates a "picture" in memory of how the lines are related. This picture can be likened to a tree structure where pairs might share large limbs but then break off into difference branches. This is a complex process because of the many "multiplicity" terminals in the outside plant. In order to provide contingencies for increased demand on the outside plant, pairs are often spliced at many locations and may appear in multiple terminals. The purpose of this is to provide a large amount of flexibility for provisioning. Unfortunately, however, troubles can occur at locations that are not near the serving address but still seriously affect the customer's phone service. These "extraneous" terminals, which are known as multiplicity terminals, increase the complexity of the trouble grouping problem.

While this network topology is accurate, it is neither as detailed nor as complete as the cable plats that technicians carry with them when fixing troubles. It does, however, highlight the relationships of the various troubled lines. With this information, geographically related groups of troubles are identified. These geographically related groups are grouped based on common F1 terminal. Each group is then individually assessed. Troubles within the F1 terminals group are grouped based on the following rules:

Terminal Grouping
   Using the % of Similar Terminals parameter, troubles are grouped whose loop facilities pass through or terminate in a % of the same terminals.

Cable and Pair Grouping
   Using the Pair Proximity parameter, troubles are grouped whose loop facilities share the same cable and are within a specific range of pairs. SA also indicates whether the cable is an F1, F2, ... Fn cable. For example, in FIG. 31, there is a cable pair group—the F1 troubled pairs are within a 50 pair range. Defective pairs will be used to enhance the cable pair proximity grouping.

Figure 31:
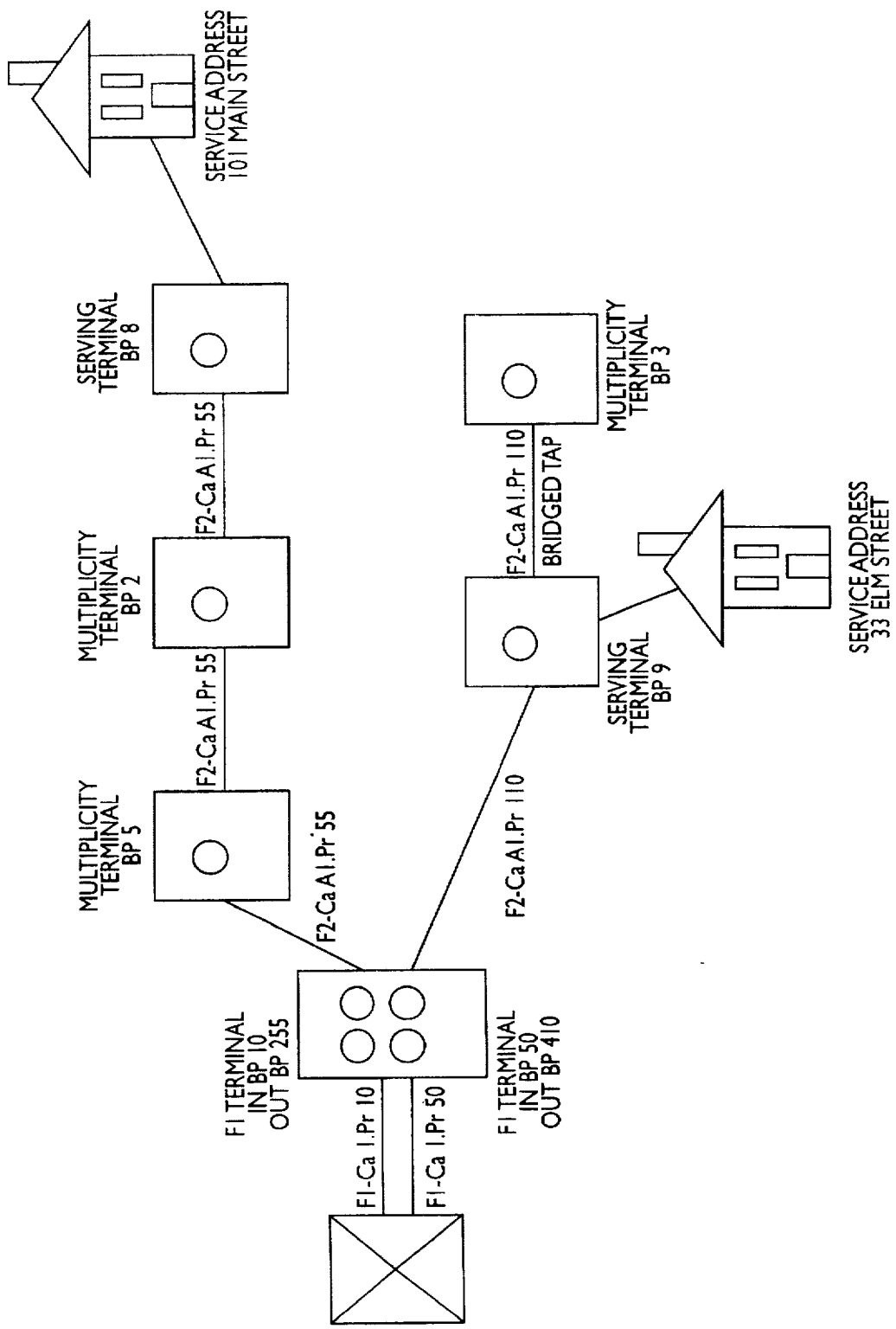
FIG. 31 is a schematic diagram illustrating a sample of the data as stored by the correlation process.
Figure 32:
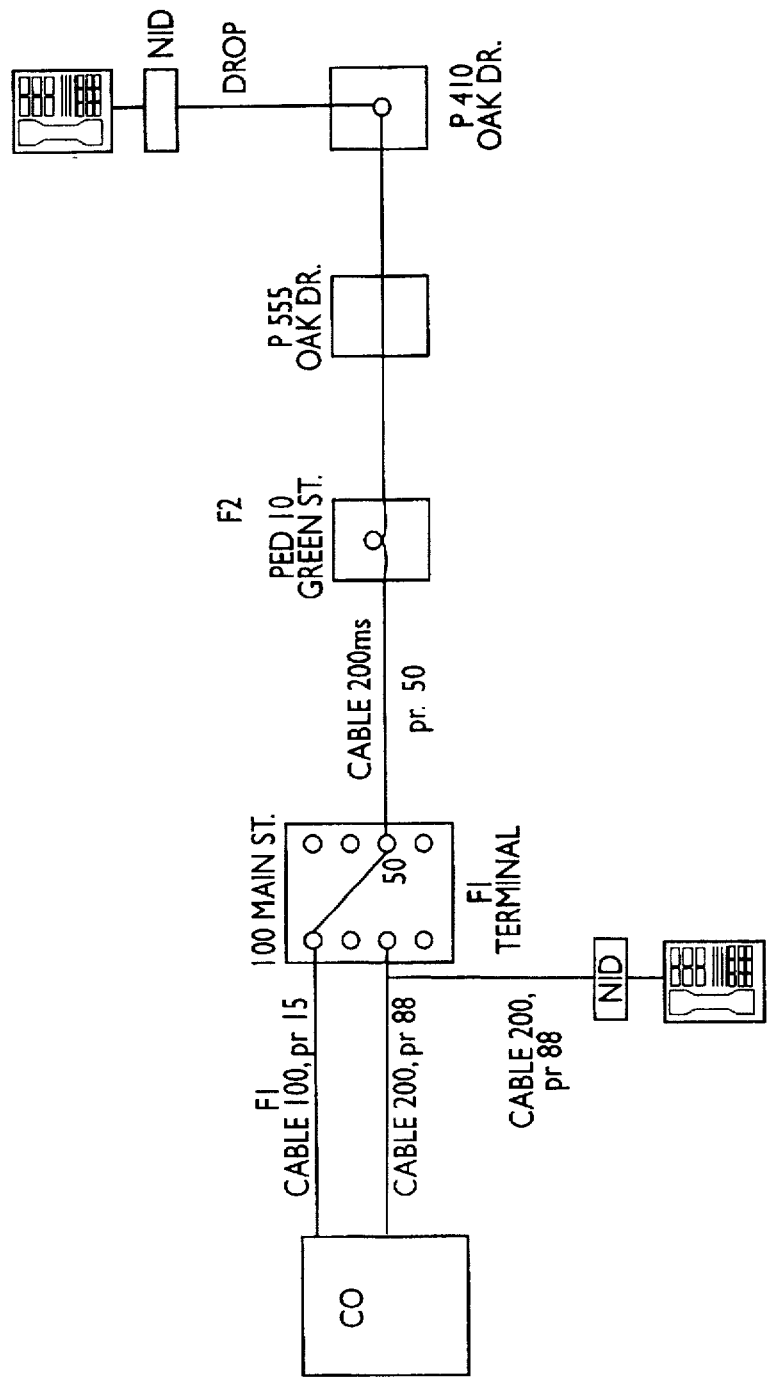
FIG. 32 is a schematic diagram illustrating a sample of the data stored by the prior art.

Terminal Binding Post Grouping
   Using the Binding Post Proximity parameter, group all troubled pairs in the same terminal into binding post proximity groupings within each terminal. Look for binding post numbers that are physically close together. In FIG. 31, the F1 troubled pairs are related within a 50 binding post range on the in side but are not closely related on the out binding post. This grouping is performed in addition to the cable and pair grouping because two distinct logical cable names can physically appear in the same cable sheath (see FIG. 32). Binding post is the only way to determine if these pairs may actually be physically close together.

Address Grouping
   Using the Address Proximity parameter, group all troubles serving addresses within a specific street number range.

Prioritize Groups

Once the troubles are assigned to groups (of size 1 to many), the groups are prioritized. This prioritization process depends on two primary factors, the number of troubles in the group and severity of the individual troubles comprising the group. Two user-defined parameters are involved in this decision: Minimum Trouble Size Group and Minimum Total Priority of a Group. Other factors are taken into account in addition to group size and group severity when determining priority such as the priority of the customer who is being affected by the fault. FIG. 33 illustrates the pre-MLT priority weightings for the service analysis process. When the priorities have been defined, the trouble groups with the highest priority are written to a file for testing.

Some of the correlated groupings will be moved ahead of the other to insure that they will not be omitted from the MLT testing list.

1. For all groupings with at least one foreign electromotive force (FEF) of any type, apply Pre-MLT weighting factors to each member of the group and calculate total for the group.
2. For, two or more trouble indications (SHWL, TRG, SRG) at the same serving terminal, apply Pre-MLT weighting factors to each member of the group, and calculate the total for the group. Three or more trouble indications sharing the same serving terminal will get an extra priority weighting to increase the group priority.
3. Move any groups containing a priority customer or a customer trouble report(s) up in priority over those groupings without priority customers.
4. For all other groups, apply the Pre-MLT weighting factors to each member of the group and calculate the total for the group. The position on the MLT list will be in order of the group's total weighting, but they will follow the members of the first three group categories.

This group ranking will be used to run MLT tests. MLT tests shall be run on the first "n" groupings, where "n" is that number of groupings whose total indicators don't exceed "t", the total permissible MLT tests allowed for the Wire Center, or until the time allotted has expired. The final prioritization shall be determined by totaling new weightings in the Post-MLT SA Process.

Produce Output File for MLT Testing

Once prioritization is complete, the Pre-MLT process writes an output file consisting of Telephone Number and Multi-Line Hunt Group Terminal Number (if applicable) for all troubles within the groups which will be submitted to MLT testing. The total number of MLT tests allowed is driven by the Maximum MLT parameters. Therefore, this output file will only contain information for the highest priority groups up to the maximum number of lines. If all lines in a group cannot be tested due to the limitation on total MLTs allowed, the entire group will be removed from the MLT test list.

The creation of this file completes the Pre-MLT correlation processing. In order to minimize the memory usage on the servers, the system dumps all of the relevant information from memory into a binary file which is read back into memory following the MLT processing. The final step in the pre-MLT process is the creation of a series of diagnostic reports for the system administrator. These reports include information on the number of rules which were activated, the amount of memory that was used, the processing time, etc.

Step T3—MLT Processing

Upon completion of the Pre-MLT processing in Step T2, SA initiates the MLT testing process. The standard submit MLT process reads the output file created by the Pre-MLT SA process, and controls the MLT tests. The MLT testing process will read the MLT file written by the Pre-MLT process and send the telephone number and when applicable a multi-line hunt terminal identification number for trouble verification.

When MLT results are received, the process stores the results in the corporate database. This data includes all results relating to:

* Telephone Number (and terminal number if applicable)
* Office Equipment
* MLT VER Code Value
* Summary Message
* MLT AC Signature
    Resistance Tip to Ring
    Resistance Ring to Ground
    Resistance Tip to Ground
* MLT Ringers
    Tip to Ring (Y/blank)
    Ring to Ground (Y/blank)
    Tip to Ground (Y/blank)
* MLT Thermistor
    Tip to Ring (Y/blank)
    Ring to Ground (Y/blank)
    Tip to Ground (Y/blank)
* MLT DC Signature Resistance/Voltage
    Resistance Tip to Ring
    Resistance Ring to Ground
    Resistance Tip to Ground
    Voltage Ring to Ground
    Voltage Tip to Ground
* MLT Longitudinal Balance
* MLT Loop Length
* Open Distance from Central Office
* Central Office Line Circuit Results
* Capacitive Balance When all tests have been submitted or when the MLT time constraint has elapsed, the MLT-submit process is ended.

Step T4—Post MLT

Upon completion of the Submit MLT process, SA initiates the Post MLT process. This process is also developed using the artificial intelligence product, ART/IM. The Post-MLT process uses the additional data provided by the MLT testing to reassess the trouble groups. Reassessment of trouble groups can be a complex process. Removing certain troubles from a group often results in entire "branches" of the network topology being removed and trouble relationships changed. In addition, the priority of the group can change significantly.

Filtering

First SA (Post-MLT) reads the binary file and reconstructs the network topology in memory. Then SA calls the data contract, to retrieve all MLT results. This contract retrieves all information stored by the MLT process for each line tested during this SA correlation run as well as baseline MLT results.

Once all data is retrieved, SA analyzes the new results. SA runs based on a rule set where the rules are fired (executed) as conditions for each rule are satisfied. As discussed previously, this process does not necessarily happen sequentially. The analyzation process is documented in a step by step manner for ease of understanding all conditions considered in this process. The reassessment process includes an initial filtering step. These filtering rules are:

Remove all trouble with Test OK result from MLT.
    Since MLT is a more rigorous testing tool, things that seem wrong in ALIT may actually receive passing test results from MLT.
Remove all troubles which indicate a Central Office type trouble from their original trouble groups and place them in a Central Office trouble group.
    Due to the MLT test, the system can determine which troubles appear to be caused by problems inside the Central Office. As a result, the system will group all of the troubles which have this characteristic and create a single trouble ticket for inside dispatch.

Remove all troubles with marginally severe results.

If a trouble does not appear sufficiently "bad" using the MLT testing tool, it is removed from the trouble group. It is not efficient for the technicians to be dispatched on low severity troubles as they may have great difficulty in finding the trouble and if it is fixed it may not cause an improvement in the customer's service.

Compare MLT results against "baseline" MLT results and remove troubles which are not "real" troubles.

Characteristic or baseline MLT results will be stored as new lines are installed, or as existing lines are repaired. The "baseline" test indicates the electrical signature of the line when it is in good working condition. If the current test does not deviate beyond a certain range from the baseline, the trouble will be removed from the group. The baseline test is important for customers that have equipment that affects the electrical signature of the line but are not documented in existing systems. For example, modems can cause a customer's line to look faulty even if it is not. With a baseline MLT, the system will see that customer's line appears faulty even when it is working properly and therefore will not create a new repair request.

For example, a POTS Customer with telephone set and no other equipment might have the following baseline data:

| DC Signature | AC Signature | |
|---|---|---|
| KOHMS | VOLTS KOHMS | |
| >1000 | T-R 3 to 40 | T-R |
| >1000 | 0 T-G >80 | T-G |
| >1000 | 0 R-G >80 | R-G |
| BALANCE | LOOP LENGTH→100 FT. | |
| CAP. >98% | | |
| LONG. >63DB | | |

A failure would be indicated if:

The DC resistance fell below 1000 KOHMS in any position (a baseline value between 1000K and 3500K indicates that a short or ground is developing but is not bad enough to cause trouble).

The DC voltage is less than zero in conjunction with a decreasing resistance in the same position, T-G or R-G. This indicates that a cross is developing.

The AC resistance T-R has increased by 1K or more in conjunction with a reduction in CAP. balance of 1% or more and/or a reduction in longitudinal balance of 2 DB or more. This is indicative of a series resistance forming at a binding post or other splice or connection point. Any AC resistance change without a balance degradation is probably due to the customer changing the station equipment arrangement (e.g., removing or adding telephone sets).

Capacitive balance reduction of >2% and/or longitudinal balance reduction of 2 DB without any other changes in baseline data elements. This would be indicative of an open bridged tap or a resistive cross to a non working pair in the same cable.

Loop length increases by more than 300 Ft. without any other changes in the baseline data. This can be caused by a section of water filled PIC cable without pair insulation problems that would cause leakage changes, or crosses.

Additional Data Retrieval

After the filtering process is complete, SA retrieves additional data about the remaining troubles. Using the data contract, SA retrieves all historical trouble tickets (closed) within the data range set by the Number of Days of Historical Trouble Ticket parameter. Although historical trouble ticket information will not be used in re-prioritization (discussed in detail below), this information will be displayed on the trouble ticket with the trouble cause, disposition, technician identifier, and narrative. This may aid the technician in isolating the current trouble.

Using the data contract, SA retrieves defective pair information. Defective pairs are retrieved for each cable pair range in each trouble group. The SA process establishes the cable pair ranges of interest in each trouble group as it groups the various troubles. The defective pairs within the last six months are highlighted on the technician report as they will be more helpful in clearing the trouble. Using the data contract, SA derives spare pair information. Spare pairs are derived for each cable pair range in each trouble group.

Re-Prioritization

SA re-prioritizes trouble groups on the additional information retrieved through the Post-MLT process. The Post-MLT process weighting factors are applied to each indicator within the trouble group. FIG. 34 illustrates the post-MLT priority weightings for the service analysis process. All trouble groups that have a priority greater than the Minimum Trouble Group Size and Minimum Total Priority of a Group values will be automatically created in the database with a status of "suggested".

Creation of Technician Report

When all processing is complete, SA produces reports for each trouble group, which will be given to the dispatch technician. These reports contain details about the individual troubles including pertinent cable ranges and terminal information. The priority, number of defective pairs, number of spare pairs in each cable pair range, and number of spare pairs in the F1 terminal will be printed on this report.

The report contains within its body the F1 cable terminal name, F1 cable and pair ranges serving the terminal, the number of spare pairs within each range, and the F2 cable name. For each trouble indicator it will identify high priority customers, F1 cable name, F1 cable pair, telephone number, F1 binding post (in-out), F2 cable pair, the serving terminal binding post (BP) or color code, the serving terminal identity, the station address, the class of service, the ALIT/alarm results, the most severe MLT results, and rainy day count. It also includes pertinent relationships that may not be obvious from the summary data (i.e., F1 cable pair groupings, or F1 multiple terminals, etc. . . . ).

One of the major causes of trouble in the outside plant is environmental changes. Wet weather in particular is a major cause of network troubles. Often, many troubles occur only when the weather is bad. This is a problem for trouble tracking because the cable or terminal which is causing the trouble may dry out before the technician can begin to search for the fault. In this case, the technician will never be able to find the trouble until the weather gets wet again. The troubles that occur only on wet days will only fail ALIT on wet days. With the historical ALIT data, the system can determine if any of the new troubles have only failed historically on days when there were more than the average number of network faults. If this is the case, that trouble will be marked on the dispatch report as a "rain cause" or "environment cause" trouble. This assessment or observation will warn the technician either to attempt to find the trouble early in the day before the cables dry out or to retest the line before attempting to find the trouble.

Rain cause is determined by evaluating a counter which is stored for each working line, the circuit rain counter. It is initialized to −1. When the ALIT occurs in this circuit on a "rainy day", this counter is incremented by the value of the rain increment parameter. When an ALIT occurs on this circuit on a normal day (not "rainy"), the indicator decrements by the value of the normal increment parameter. If the Circuit Rain Counter becomes negative, it is defaulted to zero.

This rain cause process will cause the Circuit Rain Counter, for circuits that only get ALITs on rainy days, to become quite large. If an ALIT occurs on both rainy and not rainy days the indicator will stay relatively small because it is incremented on rainy days and decrements on not rainy days. Therefore, when evaluating this counter, if it is a high value it is probably a rain cause trouble. A threshold value parameter is stored to ensure that the Circuit Rain Counter exceeds a predetermined value, thereby strongly indicating that the fault is due to environmental conditions. If the Circuit Rain Counter is above this threshold it is considered to be a rain cause trouble.

Other parameters are required for this rain cause indication. A "rainy" day is defined by the percentage of ALITs received on a given day. An average ALIT test failure percentage is kept per switch. This percentage of ALITs is considered to be the "normal" or "not rainy" day. This is maintained as a moving average based on a predetermined history factor. Then the current days status is determined. If (total lines failed/total lines tested+history factor) >threshold, then it is a rainy day and all ALIT rainy day counters re incremented accordingly.

Step T5—Batch Prioritization

The final step in the post-MLT process is the creation of a series of diagnostic reports for the system administrator. These reports include information on the number of rules which fired or activated, the amount of memory that was used, the processing time, etc.

After completion of SA Post-MLT Correlation Process, SA initiates a batch process. This batch process will determine how many of the suggested troubles will be updated to open trouble tickets. The number of "opened" troubles is determined by a local user parameter. Each geographic area may cover multiple wire centers and will have different technician availability's. Therefore, based on priorities, different numbers of trouble ticket groups will be opened. Knowing the number of groups allowed, the process reads the priorities of all "suggested" trouble groups and creates "open" trouble tickets. This process then submits these open trouble ticket groups to WFA/DO for dispatch.

This process also sends the technician's dispatch report, provided by the Post-MLT SA process listing all the area detail for their specific trouble group, to the local garage printer.

The basic processes performed by Service Analysis may be summarized as follows:
(A) Determine Trouble Indicators
  Per call test failures (PCTF)—TN and type failure.
  Automatic line insulation tests (ALIT)—TN, type, failure, level.
  Customer trouble reports—including MLT results.
  Employee Reports.
  Future indicators from fiber network.
(B) Filter out indicators from services that always fail ALIT (should be on PLIT which prevents ALIT processing)
  Ground start PBXs.
  Foreign Exchange Lines (FX).
  Coin.
  Video on demand.
  Pair gain systems w/o ALIT & MLT capabilities.
  Multiple indicators at same address (2 or more lines serving same address)
  Known station problem list.
(C) Generate list for addition to PLIT
(D) Build end to end description of circuit for each indicator
  Include all cables, pairs, terminals in the circuit.
(E) Group indicators that have common network elements
  F1 terminal (cross box)
  F2 terminals with same F1
  F2 terminals with multiple F1's
  F1 cable, pair range
  F1 in binding post range
  F1 out binding post range
  F2 cable, pair range
  F2 terminal binding post range
  Fn as F2 above (n=3,4, . . . )
  Future fiber network common elements
(F) Prioritize Groups for MLT testing (by switch)
  Apply weighting factors to each indicator in group
  Add additional weighting for customer TR or priority customer.
  Total individual weighting factors to get group weighting.
  Generate list for MLT testing (1st on list—highest group weighting, last on list—lowest group weighting).
(G) Test as many groups as MLT testing time permits, or until all groups are tested
  Discard all indicators that test OK (or groups if appropriate)
(H) Add detailed terminal and cable data to circuits
  Defective pairs, spare pairs, pair ranges in terminals.
(I) Prioritize post MLT groups (by dispatch area)
  Use new weighting factors for each indicator in group
  Add additional weighting for low spare pair cable segments.
  Generate list by dispatch area (highest group weighting—top, lowest . . . bottom)
(J) Print group reports
  Summary report
  Detailed Report
  Defective pair report
(K) Statistical analysis
  Do statistical analysis to match MLT test result patterns to most likely type of failure (e.g., cable, terminals)
Service Analysis Features
  Rule based decisions.
  Easily changed w/o invalidating blocks of code.
  Rules fire in parallel as opposed to serial flow of events.
  Fiber network easily covered by establishing rules to deal with fiber cut alarms, equipment circuit pack alarms or any indicators of trouble from the new network.
Use of MLT Base Line (or reference) data for each loop
  The base line information can be used to see faults in early development before the faults become service affecting (e.g., series resistance buildup on tip or ring yields larger AC resistance tip to ring as well as capacitive unbalance).
  The base line information can also be used to detect the presence of resistive faults on station devices with dc signature (e.g., the dc resistance component of the signature will be smaller than the reference value due to the resistance fault in parallel with it).

Corporate Database Information Features

Includes reference or base line data for each loop.

Includes all terminals in loop along with cable and pair ranges appearing in each terminal.

Includes all defective pairs, date made defective, and why, including distance to fault data.

Includes all spare pairs.

Captures bridged tap information.

Service Analysis can be run by a batch process, or asynchronous processing to respond to customer calls in real-time. Caseworkers access Service Analysis on a real-time basis. If the need for an outside dispatch is established, the system will read all associated proactive trouble groups to append to the new customer call. In addition, related closed trouble tickets and defective pairs will be grouped as well to display for the technician.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

GLOSSARY/ACRONYMS

ACE (Automated Cable Expertise)—is a software/hardware expert system that analyzes historical data on outside plant troubles.

AHN—Assigned House Number—Used to identify living units in provisioning systems for non-addressed areas.

AIN—Advanced Intelligent Network.

AIRS—Automatic Inventory Record System—A system used to create and maintain telephone numbers. This system is being replaced by COSMOS.

AR—Assignment Request—Message sent from SOAC to LFACS to request an outside loop facility. Also sent from SOAC to COSMOS requesting an inside central office facility.

ARR—Assignment Request Response—The message sent in response to the Assignment Request from LFACS and COSMOS.

ARSA (Automated Repair Service Answering)—is designed to automate activities in the repair answering centers. This system supports operations persons by direct customer entry of trouble reports and providing status via appropriate user interface devices.

ASTR—Automatic Suspension Termination Restoral—ASTR generates requests to terminate or restore residential service for nonpayment.

BAARS—Bell Atlantic Automated Records System—Engineering design system.

CUS—CUstomer Service System—billing system.

SOP/DOE—Service Order Processor/Direct Order Entry.

BOSS—Billing Order Support System—Used by Residence and Business Service Centers to assist service representatives with billing inquiries and services. Interfaces with CRIS and provides: 1) current monthly bill; 2) previous bill; 3) payments; 4) audit trail of account history (i.e., payment arrangements, discussions regarding service, record of contacts).

BSC—Business Service Center.

CAS—(Craft Access System)—is a software/hardware system that provides outside craft direct access to LMOS and MLT via a portable hand held terminal. In NJB access is also provided to GDS.

CCF—Custom Calling Feature—Defines a particular feature which is part of a customer's service. It can be identified by either a USOC or a FID.

CDDS—Customer Director Delivery System.

CF—Connected Facilities—A provisioning description of a facility that connects cable and pair from the central office to the living unit but is not considered the primary service.

CLASS—Custom Local Area Signaling Service—CLASS services including Caller ID, Repeat Call, Return Call, Call Block and Call Trace.

CNF—Connected Facility—A CNF's loop is a non-working loop that has continuity between the LU and either the Central Office or a Remote Switching Unit. It does not qualify for CT administration but is given preference for assignment at a living unit over spare facilities.

COF—Central Office Facilities.

COSMOS—COmputer System for Mainframe OperationS—Manages the central office facility inventory including OE and TNs.

CP—Cable Pair.

CRAS (Cable Repair Administration System)—software/hardware provides analytical reports on outside plant troubles and technician performance administrative reports.

CRIS—Customer Records Information System—The billing system for exchange services.

Cross-connect—A cross-connect refers to either a physical jumper cable or an electronic connection which connects two cable pair segments together. For example, a specific F1 cable pair may be cross-connected to a F2 cable pair via a jumper cable in a serving terminal. Cross-connects allow flexibility in the manner that a specific loop is assembled.

CRSAB—Centralized Repair Service Answering Bureau—The unit that accepts customer trouble calls, performs cursory testing and passes information to Installation and Maintenance.

CSOP—Common Service Order Processor—Translates service request from SSNS into service order format and reverse.

CT—Connect-Through—A CT'd loop is a non-working loop that has continuity between the living unit (LU) and either the Central Office or a Remote Switching Unit and is designated as CT. LFACS only creates one CT per living unit and it receives preferential status for further assignment at that living unit.

Customer Contact—The business functions performed by representatives of the residence Service Centers or Residence Collection Centers to meet the needs of customers.

DD—Due Date—The date in which a customer's request is scheduled to be completed.

DIP—Dedicated Inside Plant—A DIP refers to a jumper cable which is not removed when services is disconnected. A DIP is created so that the jumper cable may be reused when service is reestablished at the same living unit, thereby saving the manual labor cost required to replace the jumper cable. The "DIP'd" jumper cable will receive a status of "left-in", or LI. COSMOS will create and break DIPs based on preset parameters.

DON—Delayed Order Notice—Message indicating that a service request will be delayed because of the lack of facilities.

DNP—Disconnect for Non-Payment.

DSDC—Distribution Services Design Center—Work group responsible for designs of the outside facilities, also responsible for entering new address and inventory data into LFACS, COSMOS and PREMIS.

DSPC—Distribution Services Planning Center—Monitors the state of the current facilities in order to plan for the creation of new facilities.

EAMI—Exchange Access Mechanized Input system—A batch process (tape) of customer accounts who have selected specific inter-exchange carriers to be their long distance provider. Data is used to update the CRIS billing systems and the switch.

ESOI—Error Service Order Image—Message sent from SOAC to the SOP if the service order fails defined edits or other conditions.

ET—Enhanced Teams—A uniform call distribution network that evenly distributes customer calls to appropriate RSCs and BSCs.

EWO—Engineering Work Order—Work request to modify network facilities, created by engineering and sent to construction for network modifications.

FA—Facility Address.

FACS—Facilities Assignment and Control System—Includes SOAC, LFACS, COSMOS, LOMS and WM.

FCC—Frame Control Center—Work group responsible for the coordination of inside network facility activities such as placing jumpers between OE and the F1 cable pair.

FCIF—Flexible Computer Interface Format—A data interface language that can be used to exchange data (messages) between two applications/processes. The FCIF language is independent of the communication protocol. It is the current Bellcore standard for defining OS-to-OS interfaces.

FID—Field IDentifier—Used on service orders that indicates more data will follow. A label on a service order that prefaces service order information. FIDs are alpha or alphanumeric codes that identify retained information on an account, indicate physical or record activity, generate or negate non-recurring charges, specify recurring charges, document work done by various departments and identify facilities used to provide service.

FIDO—Fast Input Directory Order (system)—A computer system used by Service Representatives to order secondary or foreign telephone directories (directories outside of the customer's calling area).

First Net Order—A pending service order that is in its original state, as created by the Service Representative.

FITL—Fiber in the Loop.

F1, F2, F3, etc. cable pair—The F1 cable pair is the first segment of cable which comprises the outside plant loop. The F1 originates in the central office and terminates at a distribution terminal or serving terminal. In the case where a customer is served beyond the distribution terminal this is referred to as the "feeder" pair.

The F2 cable pair is the second segment of cable in the outside plant loop facility. The F2 originates at the distribution terminal where the F1 cable pair ends and will normally terminate at the serving terminal. The F2 pair is sometimes referred to as the "distribution" pair.

There are cases where the loop may be assembled from more than two sets of facilities (F1 and F2) these would be referred to as F3, F4, etc.

FMO—Future Method of Operation—The manner in which functions and processes will be performed in the future.

FOM—FACS Operations Management—Centralized work group involved in resolving RMAs that cannot be resolved by the local centers.

FX—Foreign Exchange—Assignment of a telephone number and local calling area that differs from the customer's serving wire center.

GSG—Geographic Site Guide.

GUI—Graphical User Interface.

ICC—Installation Control Center, work center involved with the dispatch of outside technicians and the management of service requests involving outside network work or customer wiring work.

IISA—Integrated Information Systems Architecture.

I&M—Installation and Maintenance—The work group responsible for scheduling and performing installation and maintenance activities. This work can be performed anywhere from the customer premise to the central office.

IMOSS—ISDN Marketing and Operations Support System.

Interchangeable Exchange—A group of NXXs that offer identical services and calling areas within a given wire center and are available for telephone number assignment.

ISCP—Integrated Service Control Point—Network element in the AIN network.

IXC—Inter-exchange Carrier—A carrier authorized by the Federal Communications Commission (FCC) to provide interLATA, interstate and/or international long distance communications services; a carrier authorized by a state Public Utility Commission (PUC) to provide long distance communications service but not local exchange service within state boundaries. Also referred to as "IC", "IEC", or "IXC".

LA—Listed Address—Appears in the LST section of the service order to identify a telephone service as appearing in the White Pages directory, with Director Assistance or on company records only. The List Address is not necessarily the physical location of the service.

LAC—Loop Assignment Center—Same as MLAC, normally referred to an MLAC after the center has been converted to FACS.

LATA—Local Access and Transport Area.

LATIS (Loop Activity Terminal Information System)—construction maintenance system, runs off-line in batch mode. Reports are generated to show where operating costs are occurring in the outside plant (loop) network.

LCC—Line Class Code—Identifies to the switch a particular class of service. It can be identified by a USOC, FID, or some combination of the two. The FID would modify the USOC by qualifying the class of service with specific attributes such as 700/900 blocking.

LDM—Logical Data Model.

LEIS—Loop Engineering Information System—Operations system used by the DSDC to monitor the outside plant network for network modifications of growth.

LET—Line Equipment Transfer—The transfer of central office line equipment to support area transfers or load balancing.

LFACS—Loop Facility Assignment and Control System—A member of the FACS (Facilities and Assignment Control System) family of applications, LFACS is a Bellcore designed system that inventories and assigns all loop facilities from a customer's premises to the main distributing frame in the central office.

LI—Left-In, status given to jumpers in the central office connecting the F1 cable pair with an OE.

LMOS—Loop Maintenance Operations System—An AT&T developed system used to maintain line records and identify network troubles.

LOMS—LAC Operations Management System—Services orders that do not automatically flow through the provisioning process "fall out" of automatic processing and are managed by LOMS. LOMS assists the MLAC in management of RMAs (Requests for Manual Assistance).

LST—Line and Station Transfer—Rearrangement of outside network facilities to support service activation.

LU—Living Unit—The exact physical location of phone service (i.e., a house, business, garage, apartment, etc.). Living Unit information is stored in PREMIS.

MARCH (Memory Administration Recent Change System) (formerly MIZAR)—is a software product that accepts input from the SOAC component of FACS, interprets the information and formulates the switch specific message that is ultimately sent to the switch to activate the customers' service request.

MCRF—Mechanized Credit Reference File. A system used by C&P for credit verification. It will be discontinued and replaced with the more robust SSRDF.

MCSS (Maintenance Contact Support System)—supports caseworker in the receipt and processing of customer trouble reports.

MISOS/DOE—Minimal Input Service Order System/Direct Order Entry—The Service Order Processor used by New Jersey Bell.

MLAC—Mechanized Loop Assignment Center—The MLAC is responsible for the administration of service orders through the provisioning process. Service orders which cannot automatically flow through the provisioning systems are resolved at the MLAC.

MLHG—Multi-Line Hunt Group.

MSP—Multi Services Platform—Operations system used to support the Ultra-Forward service, also designed to support other new services needing switch updates.

MTAS (Mechanized Trouble Analysis System)—analysis of customer trouble history data.

MVP—Multi-Variety Package—Centrex service for residential and small business customers.

NAC—Network Administration Center—The NAC is responsible for monitoring and administering operations on the central office switches. This includes monitoring the availability of OE and ensuring that the switches are properly load balanced.

The NAC is also responsible for telephone number administration. This includes the management of TN inventory and the distribution of TNs to the BSC or RSC for assignment.

NID—Network Interface Device—The NID serves as the interface between outside plant facilities and the living unit (LU). This is also referred to as the "point of demarcation". This is on the customer's side of the network and protector.

NMA (Network Monitoring & Analysis—Facilities)—system communicates with remote telemetry equipment located in COs and provides alarm status on the facility network to Facility Management Administration Centers (FMAC).

NPA—Numbering Plan Area—The area code of the telephone number. For example, in the number (703) 555-1367, 703 is the NPA.

NXX—Also known as the NNX—The telephone number exchange. For example, in the number (703) 555-1367, 555 is the exchange.

OE—Office Equipment—The office equipment is the switch port that is used to connect the F1 cable pair with the switch. It is the physical hardware within the central office that provides originating and terminating call functionality. It includes line terminations, signaling (including dial-tone) and supervision and call completion.

OM—Order Manager—Operations support system that supports implementation of SDT in the current environment by modifying service order to create or disconnect the SDT line. Other implementations of the OM have created a second order to perform this function.

OSCA—Open Systems Computing Architecture—Addresses the way systems should be constructed for data independencies and optimum modularity.

OSP—Outside Plant—Includes the cable pair segments, terminals and cross connects which are combined to create a complete outside loop. This outside loop connects a customer living unit with a central office serving the customer.

PCF—Partially Connected Facility—A PCF'd facility is a non-working loop that is connected to a living unit but is not connected completely back to the Central Office or a Remote Switching Unit.

PIC—Primary Interexchange Carrier—A FID in the Service and Equipment section of the service order that describes the long distance carrier selected to carry interLATA, interstate and/or international toll traffic for a customer.

PICX—The unique three character code that denotes an inter-exchange carrier selected by the customer.

POTS—Plain Old Telephone Service—Basic telephone service for the transmission of human speech.

PREDICTOR—provides the software/hardware that receives maintenance messages from switching machines and detects incipient cable, coin, and other troubles before they become service affecting or widespread.

PREMIS—Premise Information System—A Bellcore developed stand-alone component of FACS. PREMIS provides interactive support to RSCs, and BSCs, and Loop Assignment Centers. For the RSCs and BSCs, PREMIS offers: address verification, SAG and Living Unit information, negotiation aid, commitment dates, service order assistance, telephone number assignment, credit information, interexchange carrier selection.

PREMIS Maintenance Center (PMC)—The work group responsible for updating the PREMIS system.

PMO—Present Method of Operation—The manner in which functions and processes are performed today. Current Environment.

PTN—Preferred Telephone Number—A special telephone number selected by the customer; or a telephone number selected by the NAC to fulfill a customer's request for an easy number. (Easy TNs are described as those numbers that have at least two of the same number in the extension.)

PUC—Public Utility Commission—The governing body in each state that sets, changes, and removes restrictions and regulations on utility companies. The PUC is in place to protect consumer's interests.

RAO—Revenue Accounting Office—A unit that administers payment management and billing systems support.

RBOC—Regional Bell Operating Company.

RCC—Residence Collection Center—A unit that manages billing and collections activities. Collection agents work in the RCCs. Each company has multiple RCCs spread throughout its territory.

RCMAC—Recent Change Memory Administration Center—Work group responsible for memory administration changes to the central office switch.

Recap—On change orders and restorals, the process by which the service order processor will place the nonchanging features and services on the service order based on information stored in the customer record in CRIS. Also, the business function performed by the Service Representative to ensure that the customer order was accurately recorded.

RFACCS—Regional Final Accounts Credit and Collections System—A system used by the RCCs to manage final account billing and collections. Used to verify credit.

RIDES—Remote Intelligent Distribution Element Support —Support system for activation of fiber network elements in the loop.

RIDS—An acronym for the SSNS process that will search for Restrictions, Incompatibilities, or Dependencies with basic, toll, and optional services selected by a customer.

RMAS—Remote Memory Administration System—Support system for creating recent change messages and interacting with the central office switch for line memory changes.

RSC—Residence Service Center—A unit that provides customers with entry to the Telco. The RSCs handle inquiries, complaints, requests for service and billing and payment assistance. Service Representatives work in the RSCs. Each company has multiple RSCs spread throughout its territory.

RTS—Ready-to-Serve—The concept in which facilities are stabilized and dedicated to living units in order to provide service to the customer when requested.

SA—Service Address—A FID in the LST section of the service order that describes the physical location of the service.

SAG—Street Address Guide—Defines parameters for defining a customer's service, including but not limited to NPA, NXX, wire center, rate zone, and terminating traffic area. SAG information is stored in PREMIS.

SalesCue—A subset of SSNS. SalesCue assists reps by recommending products and services to sell to customers based on demographics and life-style clues obtained during the contact.

SDT—Soft Dial Tone—Restricted dial tone that is placed on the customers line that provides restricted calling to the business office to place service orders and to 911 for emergencies.

Second Net Order—A pending service order that has been through the provisioning process and has facilities assigned.

Service on Demand—The concept which provides service to the customer on the date that he requests. Also referred to as "When do you Want it" service.

SOAC—Service Order Analysis and Control—The controller portion of the FACS family of systems.

SOACS—Service Order Administration and Control System—The Service Order Processor used by C&P Telephone.

SOI—Service Order Image—Orders which SOAC determines will require manual intervention in MARCH are sent as order images, including all data on the service order.

SOP—Service Order Processor (Generic)—A system for creating, editing and distributing service orders to downstream processes and systems.

SOP/DOE—Service Order Procedure/Direct Order Entry.

SSNS—Sales Service Negotiation System—A graphical user interface system that presents information to service representatives from a variety of systems and platforms in a window format to assist negotiation of services and inquiries. Manages the contact between service negotiators and customers. It collects the information necessary to build a service order that downstream systems can process for services and equipment provisioning, customer management, and billing.

SSRDF—Social Security/Repetitive Debt File—A credit verification system.

TCAT—Telephone Number Category—A three character code describing the overall service that the customer will receive. Used during TN selection with PREMIS.

Third Net Order—An order that has been through the provisioning and memory administration processes. Often referred to as a "completed" order.

TN—Telephone Number—A ten digit number comprised of an area code (NPA), an exchange (NXX), and an extension.

TP—Translation Packet—SOAC creates TPs from the service order it receives from the service order processor. SOAC checks the USOCs/FIDs, determines that the order should flow through MARCH, strips the memory administration codes off the order, and formats the TPs which it sends to MARCH.

TQM—Total Quality Management.

ULBB—User Layer Building Block—For example, the presentation layer of SSNS that service reps use.

USOC—Universal Service Order Code—An alphanumeric coding scheme that identifies products and services that have been ordered by a customer.

VMAP—Voice Mail Adjunct Processor.

VOD—Video On Demand.

WDYWI—When Do You Want It—Service on Demand.

WFA (Work and Force Administration) provides an improved capability for managing installation and maintenance services of new services and technologies. Work Administration analyzes work to be done, determines resources required, manages the allocation of work to work groups, and tracks completion of work steps. Force administration determines the availability of specific human resources, assigns specific work to craft, tracks details of work completion reports work status, and handles inquiries on work status.

WFA/Control (Work and Force Administration—Control) —automates work request administration and resource administration functions. Enhanced to include exception handling. It combines the work functions of multiple work centers into one Customer Service Network Operation Center (CSNOC).

WFA/DI (Work and Force Administration—Dispatch In)—automates work request admin and the force admin functions for CO craft personnel. It is an administrative tool used to price, load and track work in the CO. It also provides a provisioning document containing information necessary to install designed services.

WFA/DO—Work and Force Administration/Dispatch Out—WFA/DO is responsible for determining the need for dispatching, scheduling the dispatch, and managing of jobs for service orders which require a dispatch. This includes both outside plant installation and customer premises work. It automates work request admin and the force admin functions for outside plant forces. It provides an automated tool for the mechanization of the local loop dispatch process. WFA/DO mechanizes several labor intensive dispatch and completion functions by automatically routing, pricing mapping, scheduling and loading work within a dispatch center.

WM—Work Manager—Operations system that manages data traffic between SOAC and COSMOS and between SOAC and MARCH.

We claim:

1. In an administration system for a public switched telephone network which includes an attendant station for receiving service requests and collecting customer information, credit verification service order processor (SOP) for creating and distributing service orders for processing by downstream processing systems such as Service Order Analysis and Control (SOAC) system, a Computer System for Mainframe Operations (COSMOS) system, SWITCH system, Loop Facility Assignment and Control System (LFACS) system, and Adjunct Processor (AP) having storage for storing data including Living Unit (LU) data, network facility data and Telephone Number (TN) data, a first test system testing a communication line in a communication cable associated with the customer in accordance with a first test producing trouble indicators indicating a potentially defective communication line, a second test system testing groups of the trouble indicators associated with the communication line in accordance with a second test, and a data processor generating an end to end description of the communication line to be tested, prioritizing the groups that are potentially defective indicating the potentially defective communication line generating prioritized groups, and generating a report to be used for examining the potentially defective communication line using the prioritized groups, a method of proactively and reactively analyzing the working status of customer network facilities in response to a customer request reporting a customer trouble, comprising the steps of:

(a) receiving the customer request;

(b) retrieving related customer profile information including at least one of billing, service order, circuit test history, and trouble history;

(c) obtaining a description of the customer trouble and entering a trouble type associated therewith;

(d) building a trouble report;

(e) testing the communication line and generating test results;

(f) determining, responsive to first criteria, whether additional information is needed, or whether the trouble report can be closed out, or whether the trouble report should be dispatched to a customer work group, and if so, transmitting the trouble report for review by the customer work group;

(g) transmitting the trouble report to the customer work group using trouble routing criteria, mapping the trouble report to a maintenance area, determining a trouble priority, and assigning a trouble report status;

(h) grouping at least one of related open work requests and proactively determined troubles with the trouble report based on grouping rules including similarity of trouble, similarity of geographic area, and available time, the proactively determined troubles being determined in accordance with the following steps:

(h1) performing a first level test of the communication line in the communication cable associated with the customer producing trouble indicators indicating a potentially defective communication line;

(h2) filtering the trouble indicators from predetermined communication services associated with the communication line that provide potentially false trouble indicators producing filtered trouble indicators;

(h3) generating a list of the filtered trouble indicators to be considered when determining whether the communication line is potentially defective;

(h4) generating an end to end description of the communication line to be tested;

(h5) grouping the filtered trouble indicators that have common network elements in groups;

(h6) prioritizing the groups for performing a second level test of the communication line;

(h7) testing the groups prioritized for the communication line;

(h8) discarding the groups that are in a satisfactory status responsive to predetermined criteria;

(h9) prioritizing the groups that are potentially defective indicating the potentially defective communication line generating prioritized groups of the proactively determined troubles;

(i) building a work load for a technician responsive to the related open work requests, the trouble report, the proactively determined troubles and technician information including work schedule, job type, work areas, and job skills;

(j) accessing information stored in operation support systems including at least one of the SOP, the SOAC system, the COSMOS system, the SWITCH system, the LFACS system, the AP, the first test system, the second test system, and the data processor as needed;

(k) repairing and testing the communication line associated with the trouble report to verify that the communication line is working;

(l) notifying the customer that the trouble report has been resolved and the trouble is closed out;

(m) resolving the at least one of the related open work requests and the proactively determined troubles;

(n) generating a completion message responsive to said repairing step (k) and said resolving step (m); and (o) transmitting the completion message to at least one of the SOP, the SOAC system, the COSMOS system, the SWITCH system, the LFACS system, the AP, the first test system, the second test system, and the data processor as needed.

2. A method of proactively and reactively analyzing the working status of customer network facilities according to claim 1, wherein said testing step (e) further comprises the step of performing a test of the communication line producing additional trouble indicators, at least one of the trouble indicators and the additional trouble indicators including at least one of:

(e1) a per call test failure (PCTF) indicator;

(e2) an automatic line insulation test indicator;

(e3) a customer trouble report including a mechanized loop test indicator;

(e4) an employee report indicator; and (e5) a fiber network type indicator.

3. A method of proactively and reactively analyzing the working status of customer network facilities according to claim 2, wherein said testing step (e) further comprises the step of filtering the additional trouble indicators generating a list of additional potentially false trouble indicators associated with the communication line, at least one of the potentially false trouble indicators and the additional potentially false trouble indicators including at least one of:

a ground start PBX;

a foreign exchange line;

a coin line;

a video on demand line;

a pair gain system without mechanized loop test or automatic line insulation test capabilities;

a multiple indicator at same address; and a known station problem list.

4. A method of proactively and reactively analyzing the working status of customer network facilities according to claim 1, wherein at least one of said testing step (e) and generating step (h4) further comprises the step of generating an end to end description of the communication line for each communication line to be tested including all cables, pairs, and terminals in the communication line.

5. A method of proactively and reactively analyzing the working status of customer network facilities according to claim 2, wherein said grouping step (h) further comprises the step of grouping the trouble indicators that have common network elements including at least one of:

F1 terminal;

F2 terminals with same F1 terminal;

F2 terminals with multiple F1 terminals;

F1 terminal cable and pair range;

F1 terminal in binding post range;

F1 terminal out binding post range;

F2 terminal cable and pair range;

F2 terminal in binding post range;

F2 terminal out binding post range; and fiber network common elements.

6. A method of proactively and reactively analyzing the working status of customer network facilities according to claim 1, wherein the work requests are one of stapled and linked to the trouble report.

7. A method of proactively and reactively analyzing the working status of customer network facilities according to claim 1, wherein said grouping step (h) further comprises the step of prioritizing the groups that are potentially defective indicating the potentially defective communication line using at least one of: additional weighting for low spare pair cable segments, and a dispatch list prioritizing the potentially defective communication line by dispatch area, available time and priority.

8. A method of proactively and reactively analyzing the working status of customer network facilities according to claim 1, wherein said determining step (f) further comprises the step of determining whether the trouble report should be dispatched to a customer work group responsive to related information regarding similar and related troubles that have been experienced contemporaneously with other network facilities related to the communication line.

9. A method of proactively and reactively analyzing the working status of customer network facilities according to claim 1, wherein said determining step (f) further comprises the step of determining whether the trouble report should be dispatched to a customer work group responsive to related proactive and reactive troubles that have been experienced contemporaneously by other customers on other communication lines related to the communication line.

10. A method of proactively and reactively analyzing the working status of customer network facilities according to claim 1, wherein said determining step (f) further comprises the step of determining whether the trouble report should be dispatched to a customer work group responsive to baseline information of the communication line accessed on a real-time basis.

11. A method of proactively and reactively analyzing the working status of customer network facilities according to claim 1, further comprising the step of informing technicians that have already been dispatched to repair a defective network facility to repair other related troubles in the substantially same geographic area.

12. In an administration system for a public switched telephone network which includes an attendant station for receiving service requests and collecting customer information, credit verification service order processor (SOP) for creating and distributing service orders for processing by downstream processing systems such as Service Order Analysis and Control (SOAC) system, a Computer System for Mainframe Operations (COSMOS) system, SWITCH system, Loop Facility Assignment and Control System (LFACS) system, and Adjunct Processor (AP) having storage for storing data including Living Unit (LU) data, network facility data and Telephone Number (TN) data, a combination proactive and reactive maintenance system for analyzing the working status of customer network facilities in response to a customer request reporting a customer trouble, comprising:

an attendant station receiving the customer request, retrieving related customer profile information, obtaining a description of the customer trouble and entering a trouble type associated therewith corresponding to a first communication line representing a reactively determined trouble, and building a first trouble report;

a first test system testing a second communication line in the communication cable associated with the customer producing trouble indicators indicating a potentially defective first communication line representing a potentially proactively determined trouble, and building a second trouble report;

a second test system, responsively connected to said first test system and to said attendant station, said second test system testing groups of the trouble indicators associated with the second communication line, testing the first communication line associated with the trouble report and generating test results, and determining, responsive to criteria, whether additional information is needed, or whether at least one of the first and second trouble reports can be closed out, or whether at least one of the first and second trouble reports should be dispatched to a customer work group, and if so, transmitting the at least one of the first and second trouble reports for review by the customer work group and existing related proactive and reactive trouble reports to the customer work group using trouble routing criteria;

a data processor, operatively connected to said first and second test systems, filtering the trouble indicators received from said first test system from predetermined communication services associated with the communication line that provide potentially false trouble indicators producing filtered trouble indicators, generating a list of the filtered trouble indicators to be considered when determining whether the communication line is potentially defective, generating an end to end description of the communication line to be tested, wherein said data processor discards the groups tested by said second test system that are in a satisfactory status, prioritizes the groups that are potentially defective indicating the potentially defective communication line generating prioritized groups, and generates a report to be used for examining the potentially defective communication line using the prioritized groups to determine whether the potentially proactively determined troubles are considered proactively determined troubles; and a work request processing and dispatch system, responsively connected to said attendant station, grouping related open work requests with at least one of the first and second trouble reports and the existing related reactive and proactive trouble reports based on grouping rules including similarity of trouble, similarity of geographic area, and available time, building a work load for a technician.

13. A combination proactive and reactive maintenance system analyzing the working status of customer network facilities according to claim 12, wherein said second test system performs a test of at least one of the first and second communication lines producing additional trouble indicators, the trouble indicators and the additional trouble indicators including at least one of:

(e1) a per call test failure (PCTF) indicator;

(e2) an automatic line insulation test indicator;

(e3) a customer trouble report including a mechanized loop test indicator;

(e4) an employee report indicator; and (e5) a fiber network type indicator.

14. A combination proactive and reactive maintenance system analyzing the working status of customer network facilities according to claim 13, wherein said second test system filters the additional trouble indicators generating a list of additional potentially false trouble indicators associated with at least one of the first and second the communication lines, the trouble indicators and the additional potentially false trouble indicators including at least one of:

a ground start PBX;

a foreign exchange line;

a coin line;

a video on demand line;

a pair gain system without mechanized loop test or automatic line insulation test capabilities;

a multiple indicator at same address; and a known station problem list.

15. A combination proactive and reactive maintenance system analyzing the working status of customer network facilities according to claim 12, wherein said second test system generates an end to end description of the communication line for each communication line to be tested including all cables, pairs, and terminals in the communication line.

16. A combination proactive and reactive maintenance system analyzing the working status of customer network facilities according to claim 13, wherein said work request processing and dispatch system groups at least one of the trouble indicators and the additional trouble indicators that have common network elements including at least one of:

F1 terminal;

F2 terminals with same F1 terminal;

F2 terminals with multiple F1 terminals;

F1 terminal cable and pair range;

F1 terminal in binding post range;

F1 terminal out binding post range;

F2 terminal cable and pair range;

F2 terminal in binding post range;

F2 terminal out binding post range; and fiber network common elements.

17. A combination proactive and reactive maintenance system analyzing the working status of customer network facilities according to claim 12, wherein the work requests are one of stapled and linked to at least one of the first and second trouble reports.

18. A combination proactive and reactive maintenance system analyzing the working status of customer network facilities according to claim 12, wherein said work request processing and dispatch system prioritizes the groups that are potentially defective indicating that at least one of the first and second communication lines are potentially defective using at least one of: additional weighting for low spare pair cable segments, and a dispatch list prioritizing the potentially defective communication line by dispatch area, available time and priority.

19. A combination proactive and reactive maintenance system analyzing the working status of customer network facilities according to claim 12, wherein using at least one of said first and second test systems, a caseworker determines whether the trouble report should be dispatched to a customer work group responsive to related information regarding similar and related troubles that have been experienced contemporaneously with other network facilities related to at least one of the first and second communication lines.

20. A combination proactive and reactive maintenance system analyzing the working status of customer network facilities according to claim 12, wherein using at least one of said first and second test systems, a caseworker determines whether the trouble report should be dispatched to a customer work group responsive to related proactive and reactive troubles that have been experienced contemporaneously by other customers on other communication lines related to at least one of the first and second communication lines.

21. A combination proactive and reactive maintenance system analyzing the working status of customer network facilities according to claim 12, wherein using at least one of said first and second test systems, a caseworker determines whether the trouble report should be dispatched to a customer work group responsive to baseline information of at least one of the first and second communication lines accessed on a real-time basis.

22. A combination proactive and reactive maintenance system analyzing the working status of customer network facilities according to claim 12, wherein a caseworker informs technicians that have already been dispatched to repair a defective network facility to repair other related troubles in the substantially same geographic area.

23. In an administration system for a public switched telephone network which includes an attendant station for receiving service requests and collecting customer information, credit verification, service order processor (SOP) for creating and distributing service orders for processing by downstream processing systems such as Service Order Analysis and Control (SOAC) system, a Computer System for Mainframe Operations (COSMOS) system, SWITCH system, Loop Facility Assignment and Control System (LFACS) system, and Adjunct Processor (AP) having storage for storing data including Living Unit (LU) data, network facility data and Telephone Number (TN) data, a first test system testing a communication line in a communication cable associated with the customer in accordance with a first test producing trouble indicators indicating a potentially defective communication line, a second test system testing groups of the trouble indicators associated with the communication line in accordance with a second test, and a data processor generating an end to end description of the communication line to be tested, prioritizing the groups that are potentially defective indicating the potentially defective communication line generating prioritized groups, and generating a report to be used for examining the potentially defective communication line using the prioritized groups, a method of proactively and reactively analyzing the working status of customer network facilities in response to a customer request reporting a customer trouble, comprising the steps of:

(a) receiving the customer request;

(b) retrieving related customer profile information;

(c) obtaining a description of the customer trouble and entering a trouble type associated therewith;

(d) building a trouble report;

(e) testing the communication line and generating test results;

(f) determining, responsive to criteria, whether additional information is needed, or whether the trouble report can be closed out, or whether the trouble report should be dispatched to a customer work group, and if so, transmitting the trouble report for review by the customer work group using trouble routing criteria;

(g) grouping related open work requests and proactively determined troubles with the trouble report based on grouping rules including at least one of similarity of trouble, similarity of geographic area, and available time, the proactively determined troubles being determined in accordance with the following steps:

(g1) performing a first level test of the communication line in the communication cable associated with the customer producing trouble indicators indicating a potentially defective communication line;

(g2) generating an end to end description of the potentially defective communication line;

(g3) performing a second level test of the potentially defective communication line to identify whether the potentially defective communication line contains the proactively determined troubles;

(h) building a work load for a technician responsive to the related open work requests, the trouble report, the proactively determined troubles and technician information including work schedule, job type, work areas, and job skills.

24. In an administration system for a public switched telephone network which includes an attendant station for receiving service requests and collecting customer information, credit verification service order processor (SOP) for creating and distributing service orders for processing by downstream processing systems such as Service Order Analysis and Control (SOAC) system, a Computer System for Mainframe Operations (COSMOS) system, SWITCH system, Loop Facility Assignment and Control System (LFACS) system, and Adjunct Processor (AP) having storage for storing data including Living Unit (LU) data, network facility data and Telephone Number (TN) data, a combination proactive and reactive maintenance system for analyzing the working status of customer network facilities in response to a customer request reporting a customer trouble, comprising:

an attendant station receiving the customer request, retrieving related customer profile information, obtaining a description of the customer trouble and entering a trouble type associated therewith corresponding to a first communication line representing a reactively determined trouble, and building a first trouble report;

a first test system testing a second communication line in the communication cable associated with the customer producing trouble indicators indicating a potentially defective first communication line representing a potentially proactively determined trouble, and building a second trouble report;

a second test system, responsively connected to said first test system and to said attendant station, said second test system testing at least one of the first and second communication lines and determining, responsive to criteria, whether at least one of the first and second trouble reports should be dispatched to a customer work group, and if so, transmitting the at least one of the first and second trouble reports for review by the customer work group together with existing related proactive and reactive trouble reports to the customer work group using trouble routing criteria;

a data processor, operatively connected to said first and second test systems, generating an end to end description of the at least one of the first and second communication lines to be tested by said second test system responsive to the reactively determined trouble and the potentially proactively determined trouble to determine whether the at least one of the first and second communication lines require at least one of inspection and repair; and a work request processing and dispatch system, responsively connected to said attendant station, grouping related open work requests with at least one of the first and second trouble reports and the existing related reactive and proactive trouble reports based on grouping rules including similarity of trouble, similarity of geographic area, and available time, building a work load for a technician.

* * * * *